United States Patent [19]

Milisavljevic

[11] Patent Number: 4,714,420

[45] Date of Patent: Dec. 22, 1987

[54] PLANT FOR THE CONTINUOUS AND AUTOMATED MANUFACTURING OF AGGLOMERATED SINTERED, VULCANIZED AND PRESSED ARTICLES

[75] Inventor: Milorad S. Milisavljevic, Lucerne, Switzerland

[73] Assignee: PTP Patentierte Technologische Prozesse AG, Lucerne, Switzerland

[21] Appl. No.: 770,865

[22] PCT Filed: Dec. 14, 1983

[86] PCT No.: PCT/CH83/00142

§ 371 Date: Aug. 19, 1985

§ 102(e) Date: Aug. 19, 1985

[87] PCT Pub. No.: WO84/02493

PCT Pub. Date: Jul. 5, 1984

[30] Foreign Application Priority Data

Dec. 20, 1982 [CH] Switzerland ............... 7401/82

[51] Int. Cl.[4] ............................................. B29C 33/34
[52] U.S. Cl. ......................................... 425/161; 425/38;
425/185; 425/259; 425/361; 425/438
[58] Field of Search ............... 425/161, 258, 259, 190,
425/182–185, 438, 262, 361, 576, 449, 539, 540,
28 R, 35, 38

[56] References Cited

U.S. PATENT DOCUMENTS

| 2,190,859 | 2/1940 | Binder | 425/259 |
| 2,218,456 | 10/1940 | Soubier et al. | 425/185 |
| 2,526,797 | 10/1950 | Ashbaugh | 425/576 |
| 2,651,952 | 9/1953 | Leavenworth | 425/161 X |
| 2,682,695 | 7/1954 | Ramsey | 425/262 |
| 2,937,428 | 5/1960 | Pocidalo | 425/161 X |
| 3,179,041 | 4/1965 | Luthi et al. | 425/259 X |
| 3,621,517 | 11/1971 | Nishikawa et al. | 425/161 |
| 3,836,299 | 9/1974 | Houston et al. | 425/259 X |
| 4,167,380 | 9/1979 | Stuben et al. | 425/259 X |

FOREIGN PATENT DOCUMENTS 2285969 4/1976 France.
2397285 2/1979 France.

Primary Examiner—Richard L. Chiesa
Attorney, Agent, or Firm—Karl F. Ross; Herbert Dubno

[57] ABSTRACT

A plant for the continuous and agglomerated manufacturing of articles obtained at least in part by compression of material. The plant comprises a carousel of working sectors equal to a number of fixed sectors with which the carousel operates. A frame supports the entire plant to allow the movement of the transfer elements for the mold and the products with respect to the working units.

57 Claims, 43 Drawing Figures

PLANT FOR THE CONTINUOUS AND AUTOMATED MANUFACTURING OF AGGLOMERATED SINTERED, VULCANIZED AND PRESSED ARTICLES

FIELD OF THE INVENTION

This invention relates to an installation for the continuous and automated production of sintered, vulcanized or pressed articles or items.

BACKGROUND OF THE INVENTION

The technique currently applied for the production of sintered, vulcanized or pressed articles or products varies according to the mixture and the characteristics of the substance or material used for the production, and particularly depends on the handling necessary for the processing of this mixture into finished products of the quality desired. Under these circumstances the technique suitable for the manufacture of a single product or article demands various or different methods of production. This means that a very large number of specific machines, devices and tools is necessary which must be developed in order to meet the specific technical requirements for the manufacture of each article or product. To illustrate the relevant aspect of the technique, here is a short description of the main phases common to the production of a large number of finished products. These may be defined by the following general stages:

preparation of the mixture,
processing of the mixture into a finished product, especially by pressing or compressing and handling.
completion of the above mentioned products.

The preparation of the mixed raw materials for the manufacture of non-metallic products consists of a chemical and mechanical conditioning of the material component, the proportions and mixture of which, with possible filling material, leads to a homogeneous mass of a high consistency. Subsequently the mixture can be transferred to the desired form which however must be such that the progress of the stipulated chemical reaction is guaranteed depending on the temperature and the pressure applied. The preparative phase of the mixture only requires a comparatively small investment, as it can be realized with simple equipment. However, the preparation of this mixture has to be done with utmost care and attention so that the finished products or articles will be of a suitable quality.

The process of metallic material means in most cases that their forms must be changed, brought about by the forming, drawing, pressing and so on, of metallic alloys supplied by a distributor with the help of conventional presses adapted to the articles to be produced. The stage at which the mixture is processed into finished products or articles plays a dominant role in the entire technological process. However, the construction of the equipment used for the processing of this this mixture. In most cases the manufacturing process is distributed among various workshops each of which is responsible for an exactly defined phase of the technological process. In order to increase the production capacity it is therefore necessary to acquire a large number of expensive machines and to employ a large number of qualified workers. What is more, the space requirement of the numerous machines increases the costs of the infra-structure and thus the general costs of investment.

The equipment or installations for a continuous and automated production of certain asbestos products, for instance, for the production of cardboard or asbestos paper, incorporate an installation similar to a paper machine specifically adapted to asbestos. A paper machine working with a speed of more than 600 meters/min. for the production of normal paper proves to be somewhat inefficient for the production of asbestos paper, because in this case it has to work with a speed of between a maximum of 23 to 40 meters/min. The running of such a machine shows even more disadvantages concerning mainly the costs, energy consumption and the large consumption of water which has to be drained and evaporated.

The production of asbestos cement products up to now has been realized by space consuming and expensive machines. The process applied for the production of tubes requires much space and specific equipment on account of their length. What is more, the mixture must be put on cylinders of the desired diameter and desired length which have to be removed mechanically after the drying process.

Thermoplastic synthetics which are chemically stabilized and enriched with auxiliary components and which are available in the form of a mixture which can be molded when warm, can easily be converted into finished products in a continuous process by extruders, syringes, calandering or cylinders. These mixtures consisting of synthetics as well as those formed of thermosetting plastics can also be produced by means of pressing, but with less productivity. However, the use of presses cannot be avoided where stiff mixtures are to be converted or formed.

The products consisting of natural rubber or of synthetic rubber are very numerous and manifold regarding their form and composition.

The technological process for the conversion of these mixtures containing synthetic or natural rubber used in particular for the production of tires is very complex.

The current state of the technique may be summarized as follows:

The attributes and characteristics of the specific material, mixtures and alloys determine the choice of the conversion process whereas the forms and characteristics of the finished products determine the choice of handling. The conversion method and the handling which are applied during the conversion represent the technological process and determine the choice of the machines and the equipment suitable for each specific case.

OBJECTS OF THE INVENTION

It is the object of this invention to provide one single plant or installation enabling the realization of a technological process which allows the conversion of material, mixtures and alloys of different chemical compositions and characteristics into finished products, whereby each of them is handled according to a specific technical process in which certain elements of the installation are simply adapted to the technological process applied and to the particular form of the products or articles to be manufactured. As the invention proposes a single plant or installation for the realization of technological processes for the continuous and automated production of articles, the costs of infra-structure can be reduced and the productivity of the installation increased.

SUMMARY OF THE INVENTION

The invention comprises an installation or plant for the automated and continuous of, for instance, agglomerated, sintered, vulcanized articles which are molded by converting and pressing materials such as minerals, synthetics, mixtures, alloys and so on. It has at least arrangement to compress material which has been fed into a mold by feeding apparatus, or at least a device for the thermal, chemical or mechanical handling of the pressed articles and at least a device to remove the products or articles from the mold. This installation is characterized by the feeding equipment being fixed on a frame carrying the whole installation or plant in order to feed the material into one or more dynamic units fixed on the frame around the feeder; whereby each dynamic unit is divided into various sectors each of which has elements forming a press and/or a handling device and/or a substance for removing articles from the mold. Each of these devices is fixed on the frame of the installation and has a carousel which is fixed on the frame of the installation and has as its task to transfer the mold elements or a mold and the formed articles or items in this dynamic unit from one sector of a dynamic unit to the next.

The invention therefore proposes a compact installation where all substances are fixed on a single frame thus allowing the completion of articles by the forming or handling of a material which is fed by a single central feeder. According to another characteristic of the invention the mold or the molds for the articles to be manufactured are formed by mold elements of the carousel in the sector of a working unit namely the press forming element and the pressing tools of this press forming elements during the feeding process of the raw material into the molds.

According to another characteristic of the invention the connection between the feeder and the mold which is formed by the press forming element and the mold elements and which is closed at the end of the feeding, is automatically reestablished as soon as the pressure which is exerted on the material to be fed into the mold approximate the pressure at which this material agglomerates by driving back the superfluous quantity of the mixture, and is automatically closed when the pressure falls below the agglomerating pressure.

Consequently it is possible to feed the mold up to a comparatively high pressure without the risk of the material hardening in the feeders thus achieving a complete filling even of a complicated mold. It is, therefore, possible to compress the material without risking an over-compactness outside the mold. Consequently, in the following cycle the material remaining in the feeders can be fed into the new mold without difficulty, as this material is being kept in a moldable condition.

The frame of the installation can have a central cylinder containing the feeding device and various platforms are arranged around the cylinder at different heights, whereby these platforms are held around the edge by a vertical supporting frame, and whereby the working units of the installation are fixed on the platforms. Advantageously the distance between the platforms is adjustable, for instance in order to be able to adapt the installation to various dimensions of the articles to be produced.

Furthermore the feeding element has a least one opening for the distribution of the material which is formed and divided corresponding to the cross section of the outer mantle of the feeder, whereby at least one of these distribution openings ends in the sector of a working unit, which possesses a press forming element.

Moreover, the carousel and the mold elements which is carries, are adapted to the articles such as, for instance, brake linings, tubes of asbestos cement, tires and so on.

BRIEF DESCRIPTION OF THE DRAWING

In the drawing FIGS. 1A, 1B, 1C, 1D, 1F, 1G, 1H and 1I which combined together, represent in sections along the lines 1F, 1C, 1D and 1E of FIG. 3 a first style of execution of the installation in position before the beginning of the compression procedure, which is adapted to the preparation of a mixture and to the manufacture of a sintered product, for instance drum brake linings.

SPECIFIC DESCRIPTION

Figure 1A:
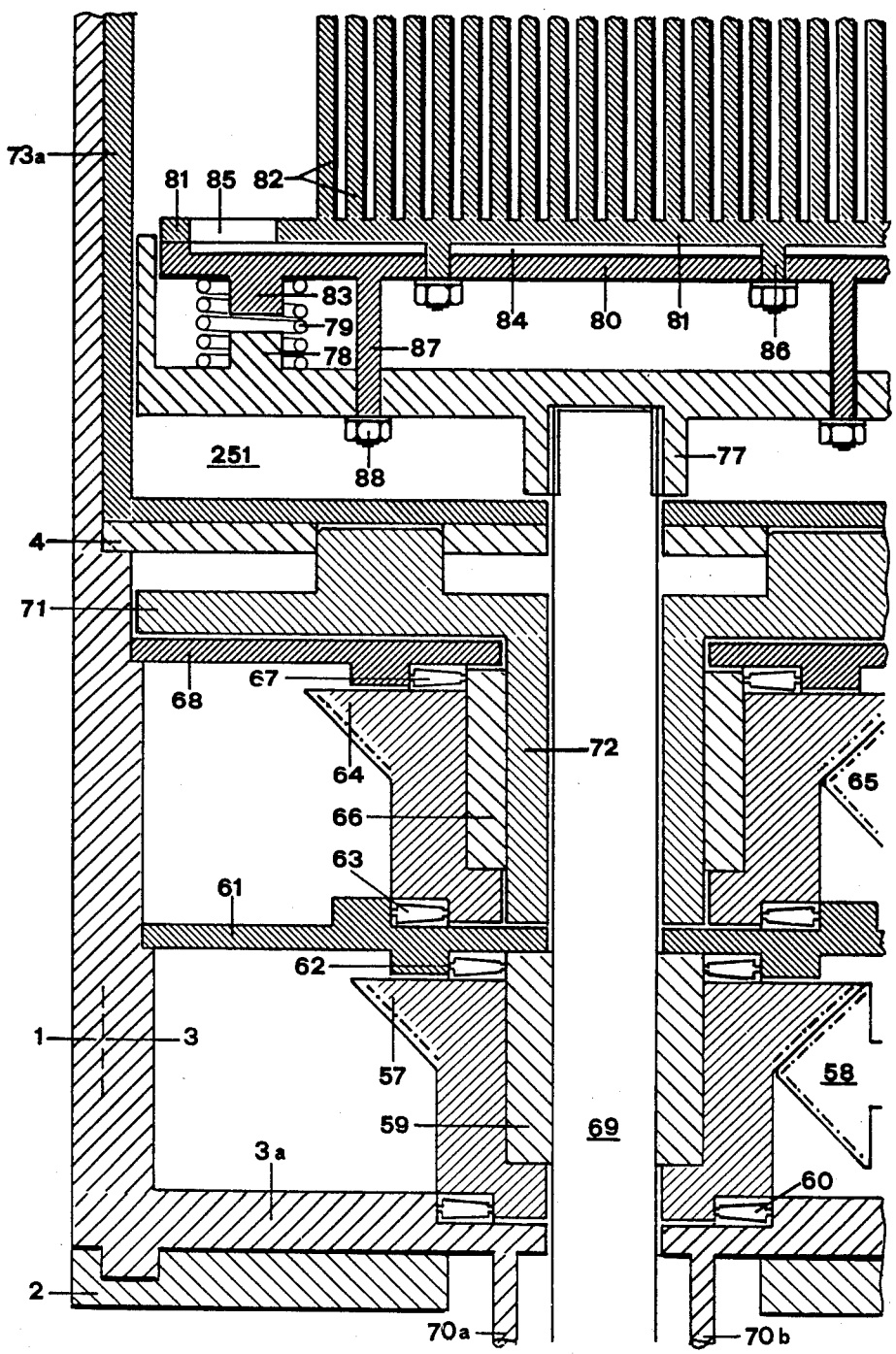
Figure 1B:
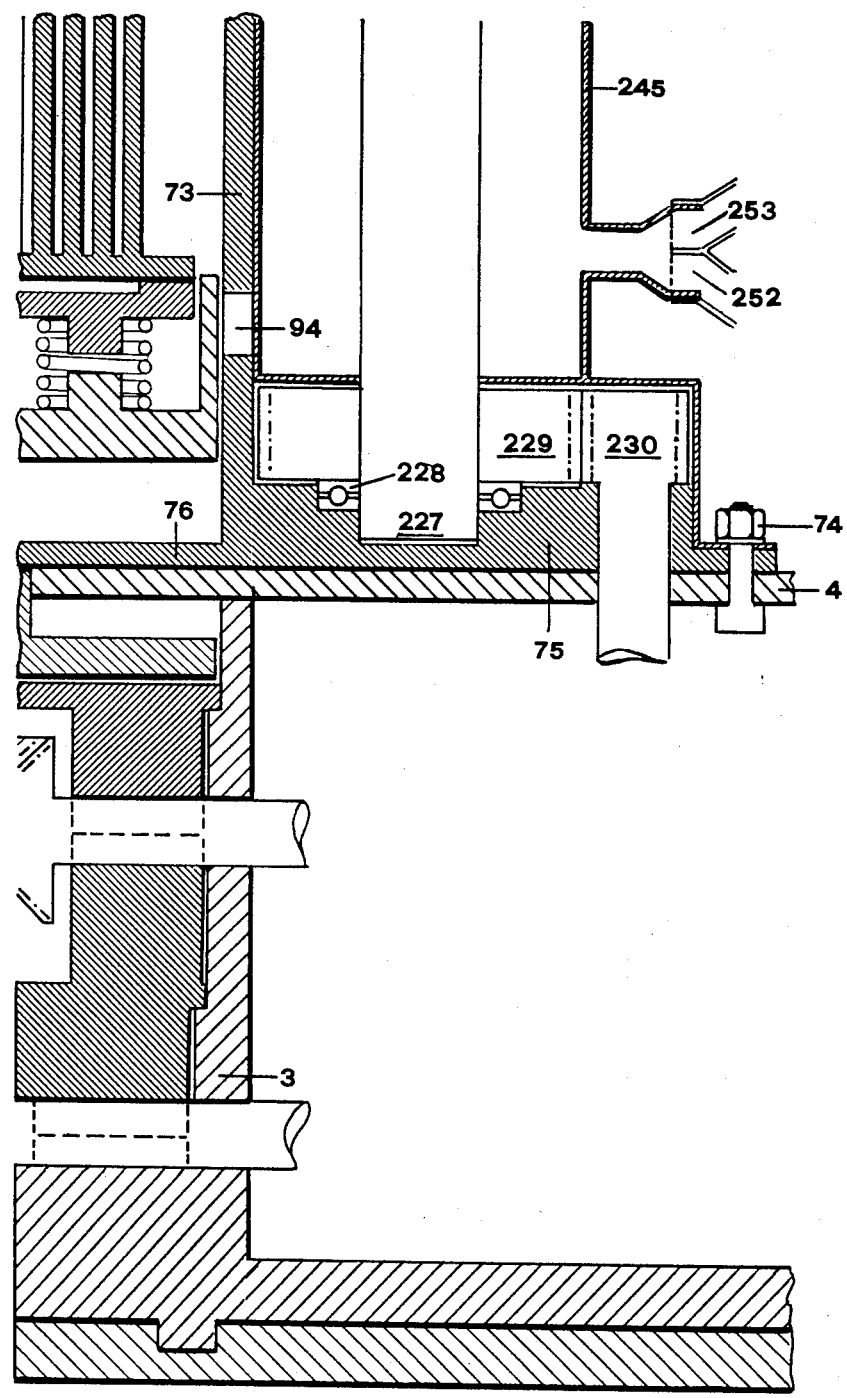
Figure 1C:
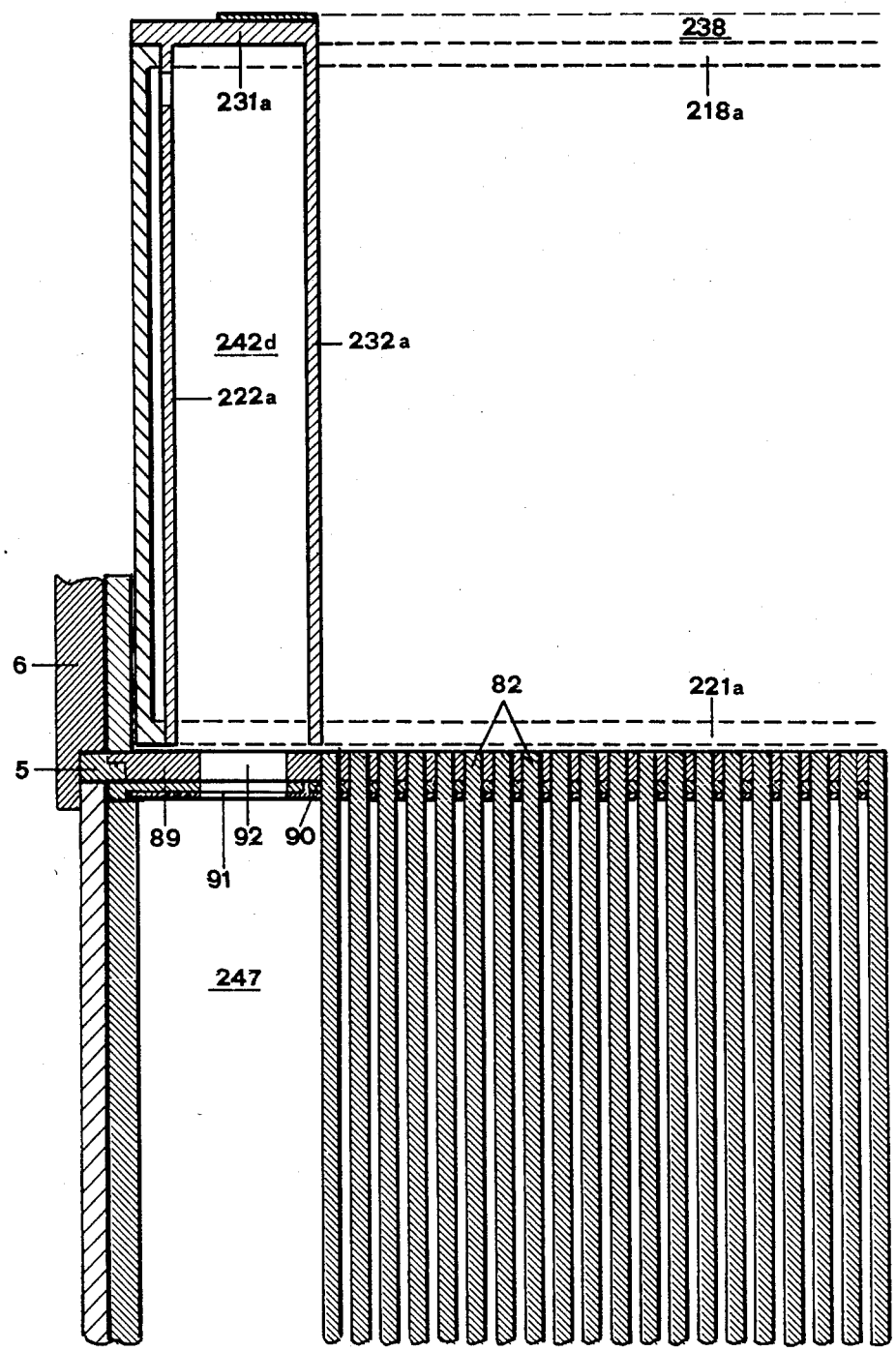
Figure 1D:
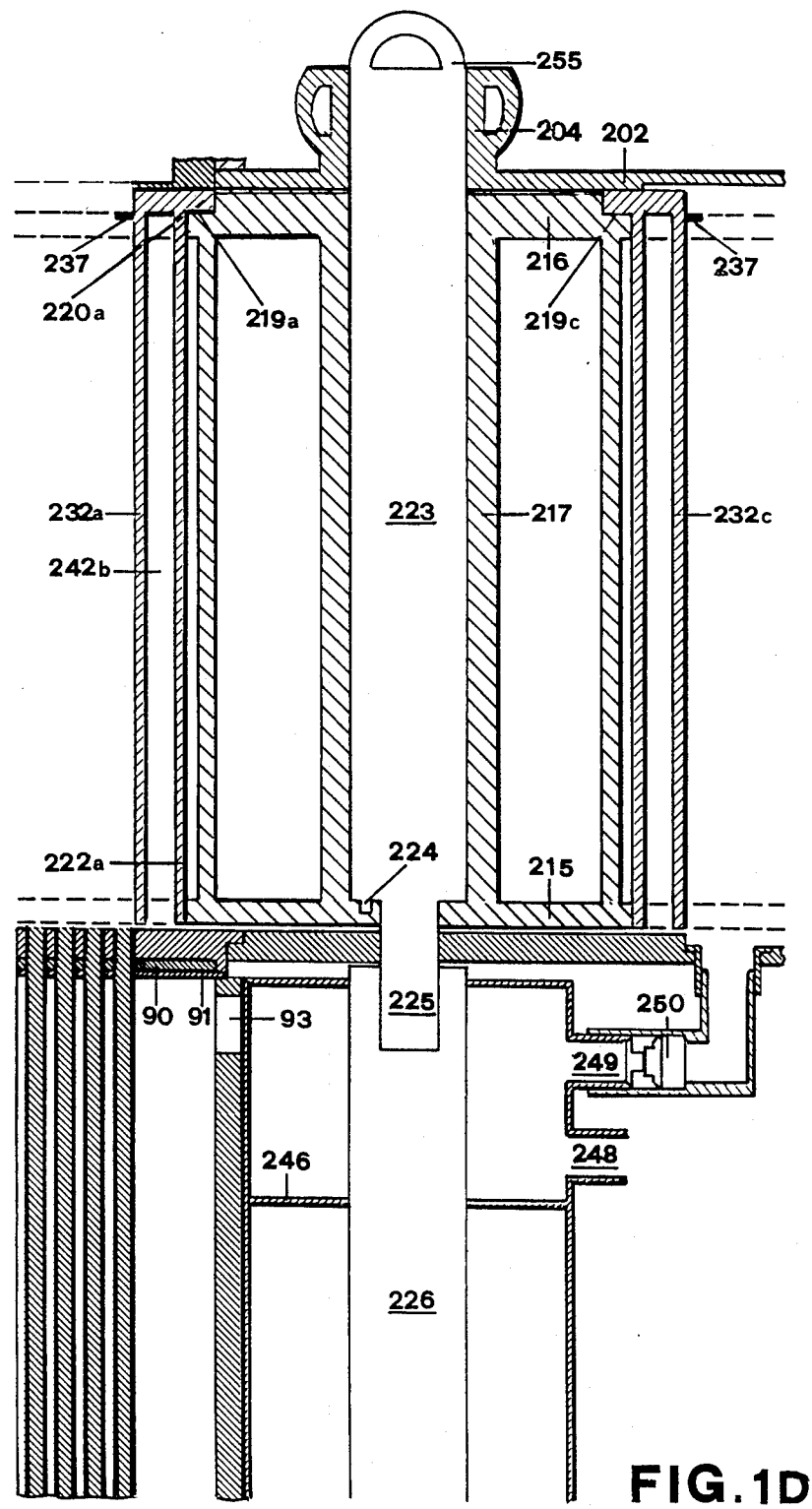
Figure 1E:
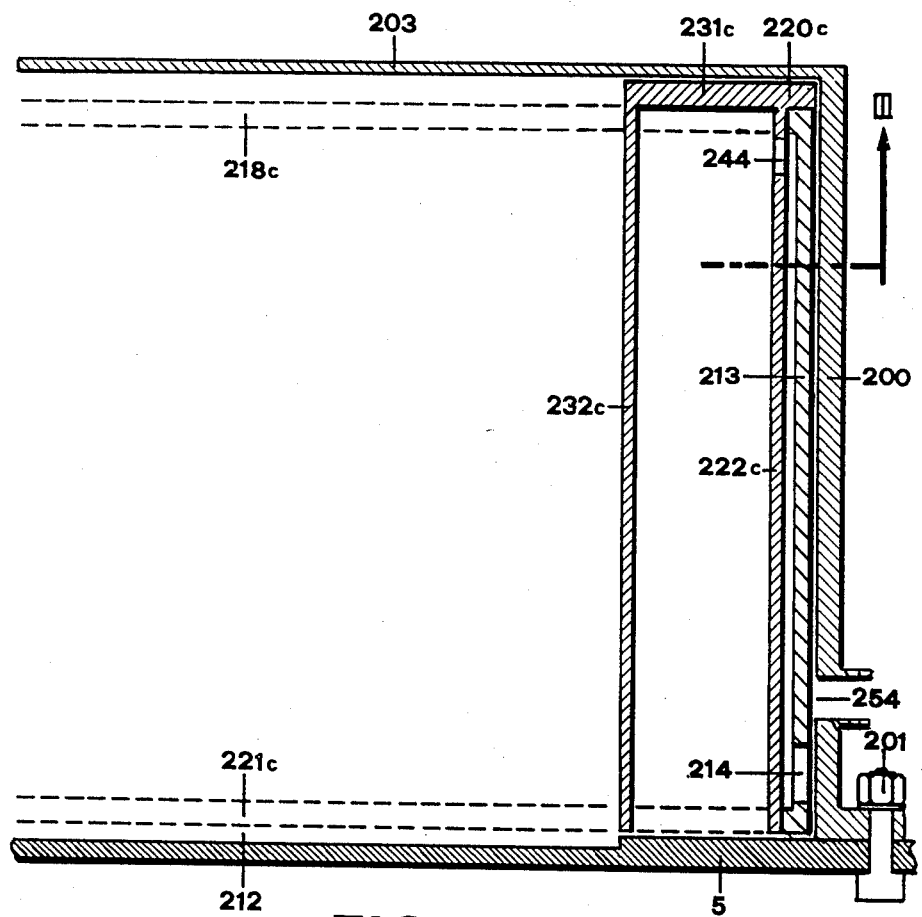

The installation according to the invention has basically the following elements:
- one frame including generally a central cylinder 1 and several platforms 2, 4, 5, 7 which are positioned above each other and attached to the cylinder;
- one central installation part which is formed by an element to feed the material and which is fixed advantageously to the cylinder 1;
- at least one working unit arranged around the feeding element. Each working unit is divided into sectors one of which possesses a press forming element. This element consists of an auxiliary press and a main press. This press forming element is attached to the platforms of the installation frame. One or more sectors of the working unit are equipped with elements for chemical, physical, thermical elements, and so on of the items molded in the first sector and include, for instance, feeding devices by various means of treatment or heating. A further sector of the working unit contains elements for the removal and dispatch of the pressed articles from the installation.

Furthermore each working unit has a carousel the use of which is to transfer the form or the elements of the forms (mold elements) and the pressed items from one sector to another in each working unit.

In order to give a clear representation in the following the individual elements of the installation as well as the various variances especially of the carousel are described, whereby the production of a special item is illustrated.

As most of the elements of this installation are of different variants and are being used for the production of articles of many different kinds, these elements in all variants are represented by the same reference marks.

Referring to FIGS. 1A-1H and 2A-2G, in the following the frame and the skeleton of the installation are described. This frame possesses;

One central cylinder 1 without bottom or cover, attached to the first platform or a counter plate 2, which is anchored to the floor on which the reinforcement of a certain number of twin cylinders 3 is attached, corresponding to the numbers of the working units which are equally spaced on the edge of the central cylinder 1 and are supported, together with their bottom 3a, on the counter plate 2. Each of these cylinders contains the auxiliary press of the press forming elements of each working unit.

One circular fixed first platform 4 which is common to all working units of the installation and which rests on a broadening of the central cylinder 1 and is supported on its edge of an outer (not illustrated) frame, for instance a vertical supporting construction, which is built around the installation above its entire height and attached to the bottom.

A second round fixed platform 5, which lies on the horizontal surface of the central cylinder 1 and is also supported by a circumferential edge on the outer supporting construction.

A cylindrical body 6 which is extended as far as the highest point of the installation, and the lower part of which is fitted into the central cylinder 1, and at the same time is supported on the second round platform 5, whereas its upper part is attached to a third platform 7.

The third platform 7 is circular and fixed, and has openings for the elements of the upper part of the installation to keep this in a vertical steady position and to serve as a frame or holding device. This third platform is held by an outer supporting construction (not illustrated).

Advantageously the platforms 4, 5, 7 are attached to the central cylinders 1, 6 and on the lower framing construction in such a manner that the distance between the platform is changeable in order to adapt the installation to the production of different articles or items.

Figure 1F:
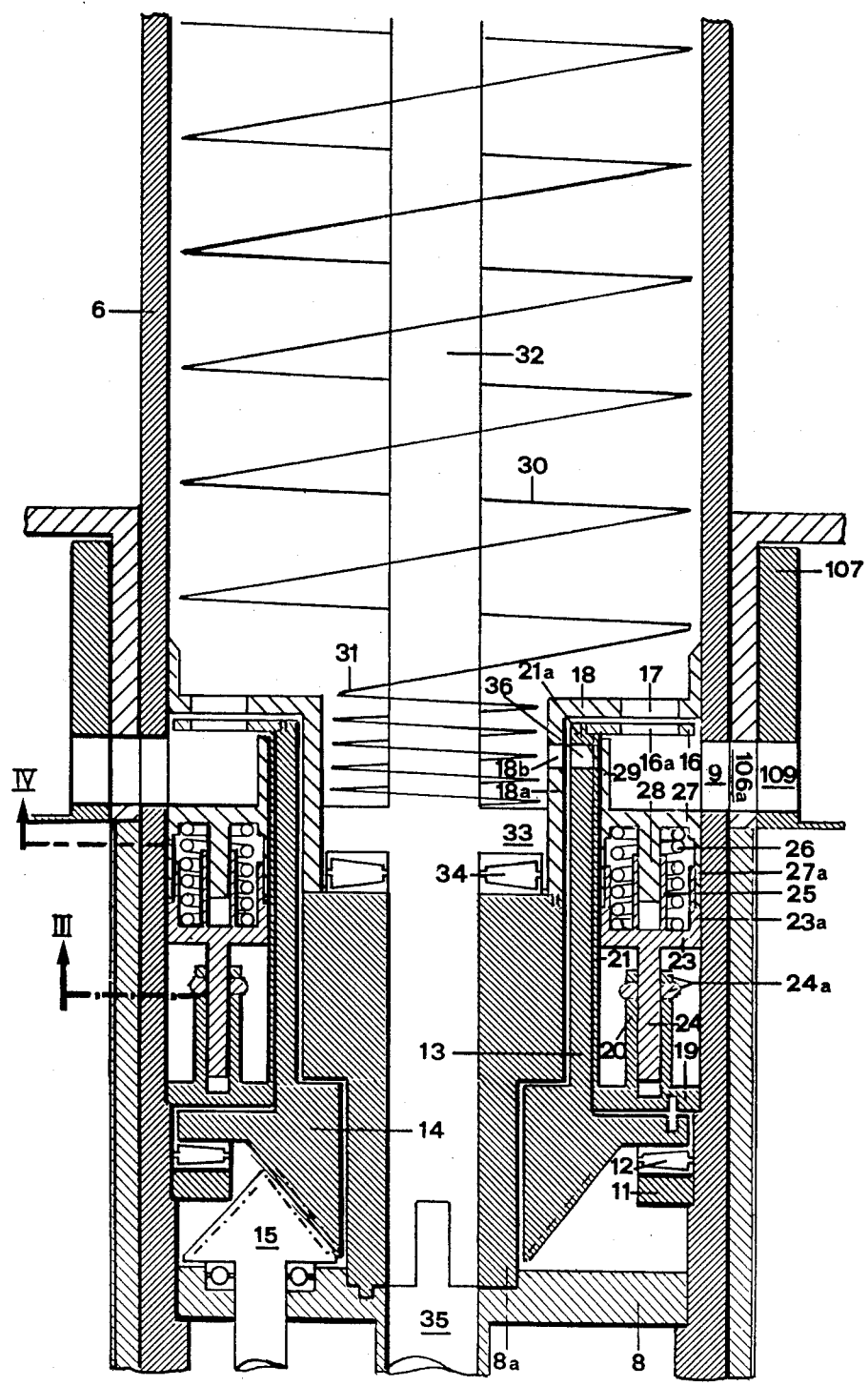
Figure 1G:
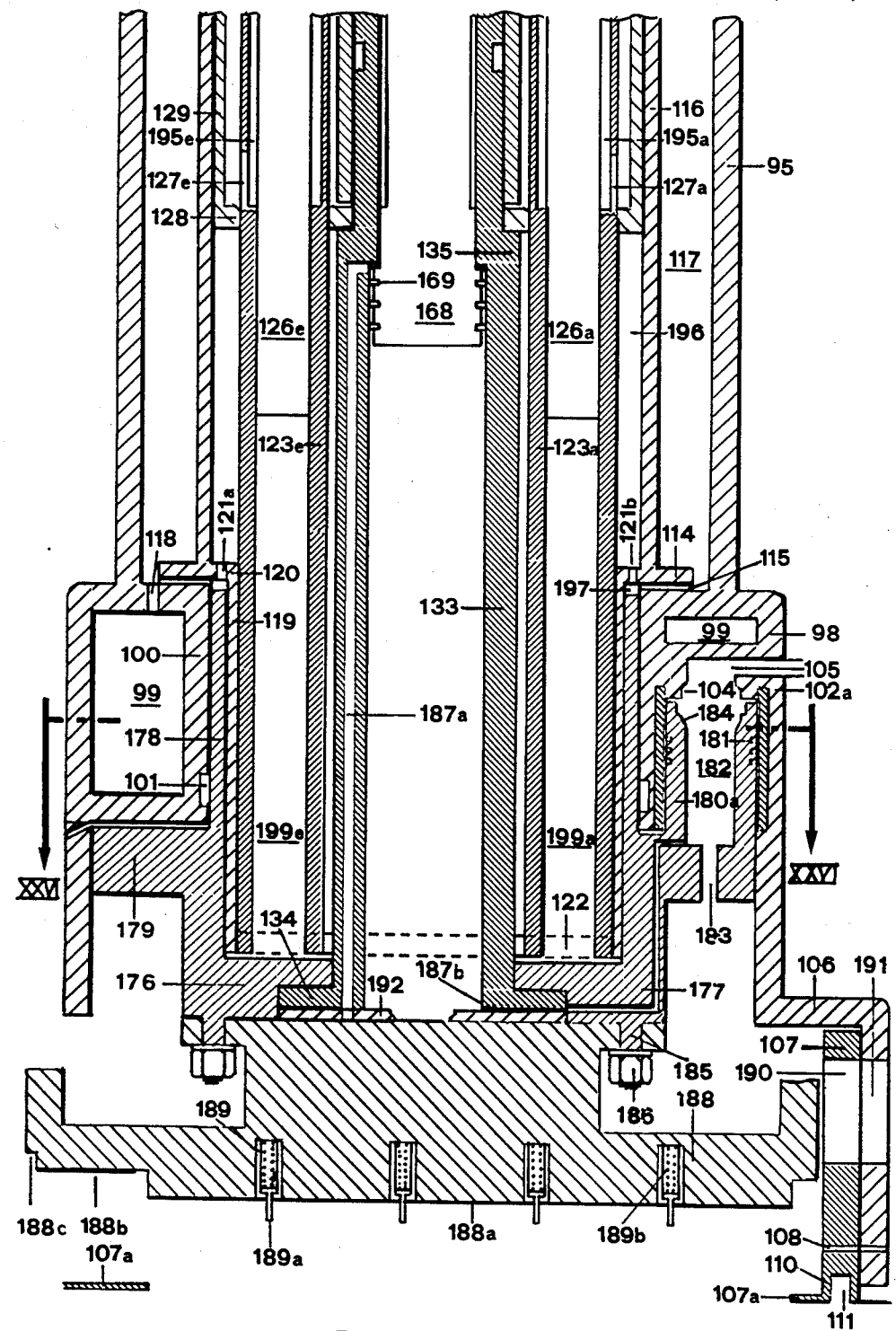
Figure 1H:
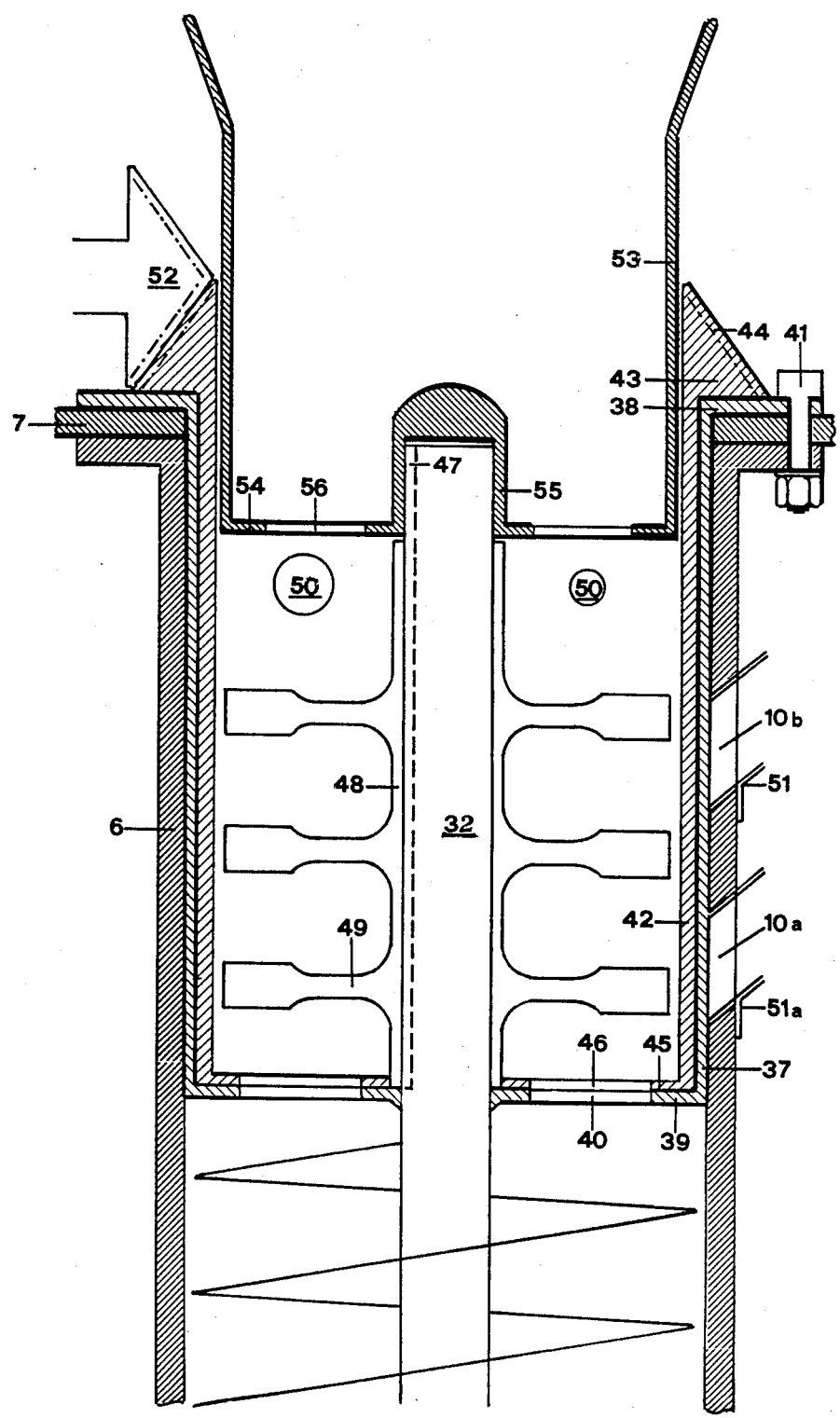
Figure 1I:
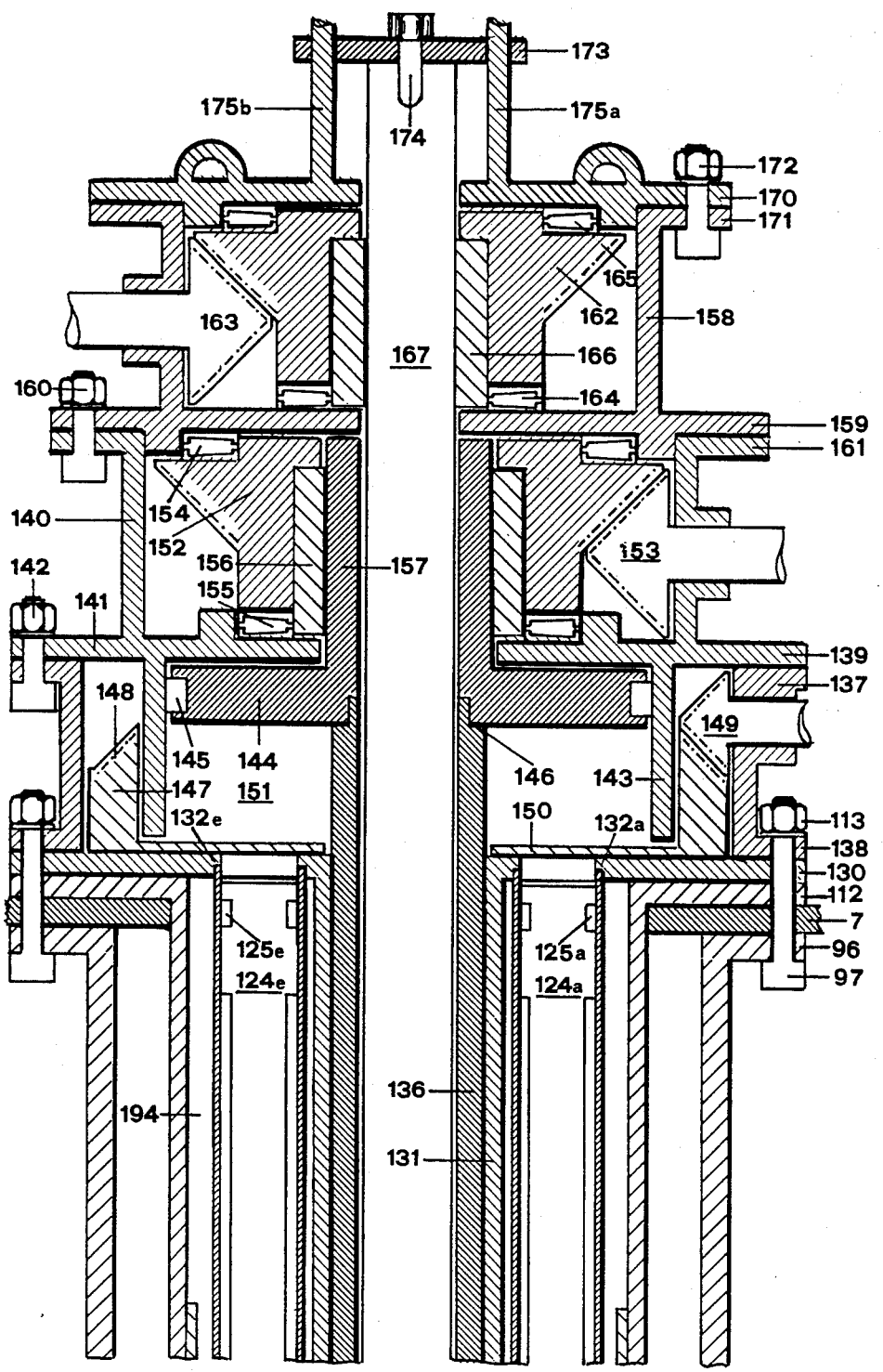
Figure 2A:
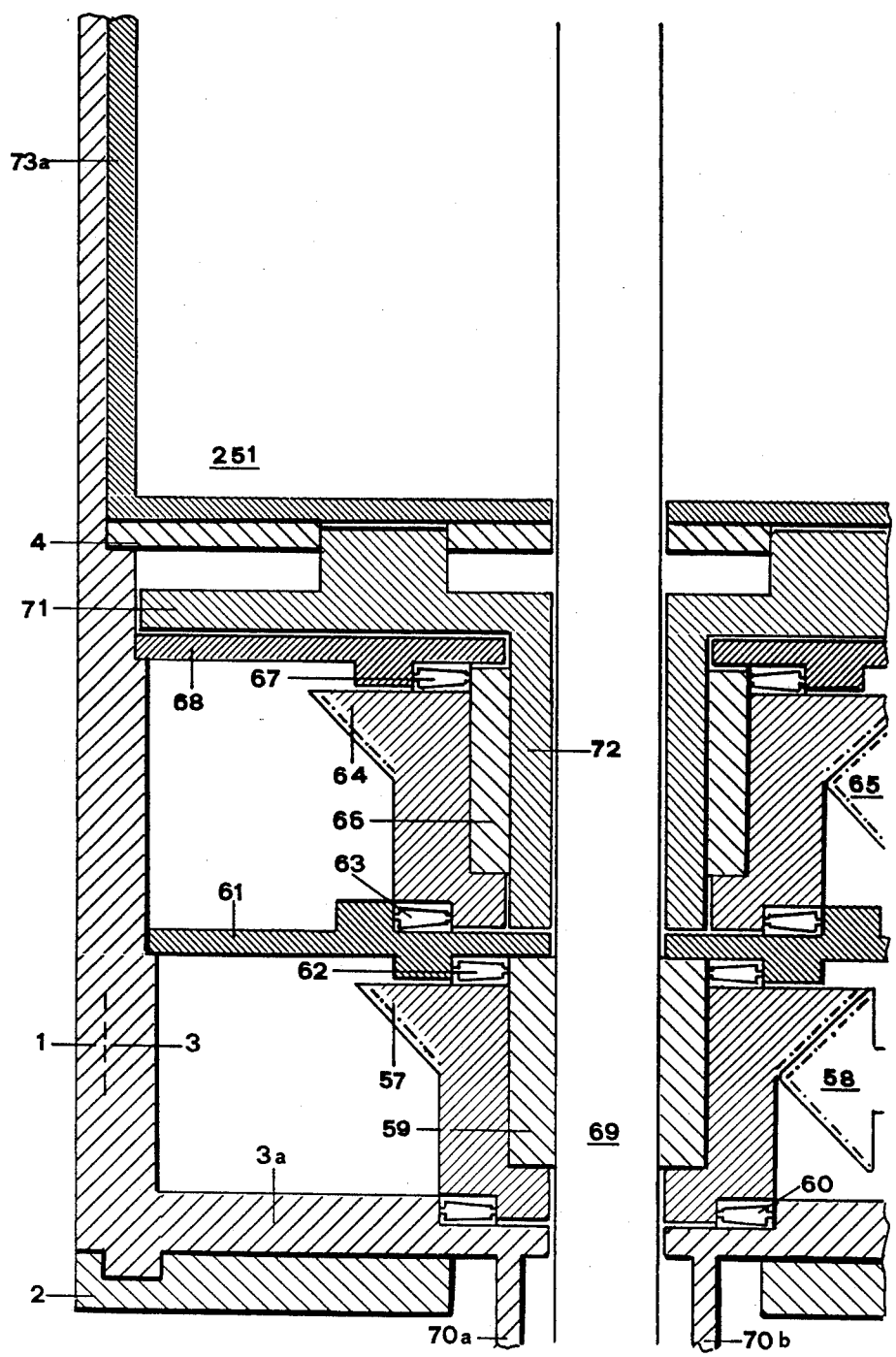
FIGS. 2A, 2B, 2C, 2D, 2E, 2F, 2G together with FIGS. 1F and 1H represent in sections along the lines 1F, IIC, IID, of FIG. 4 the installation shown in FIG. 1A–1I containing pressed drum brake linings during heat treatment, whereas the other sector is at completion stage of the compression in that sector which has press forming elements.
Figure 2B:
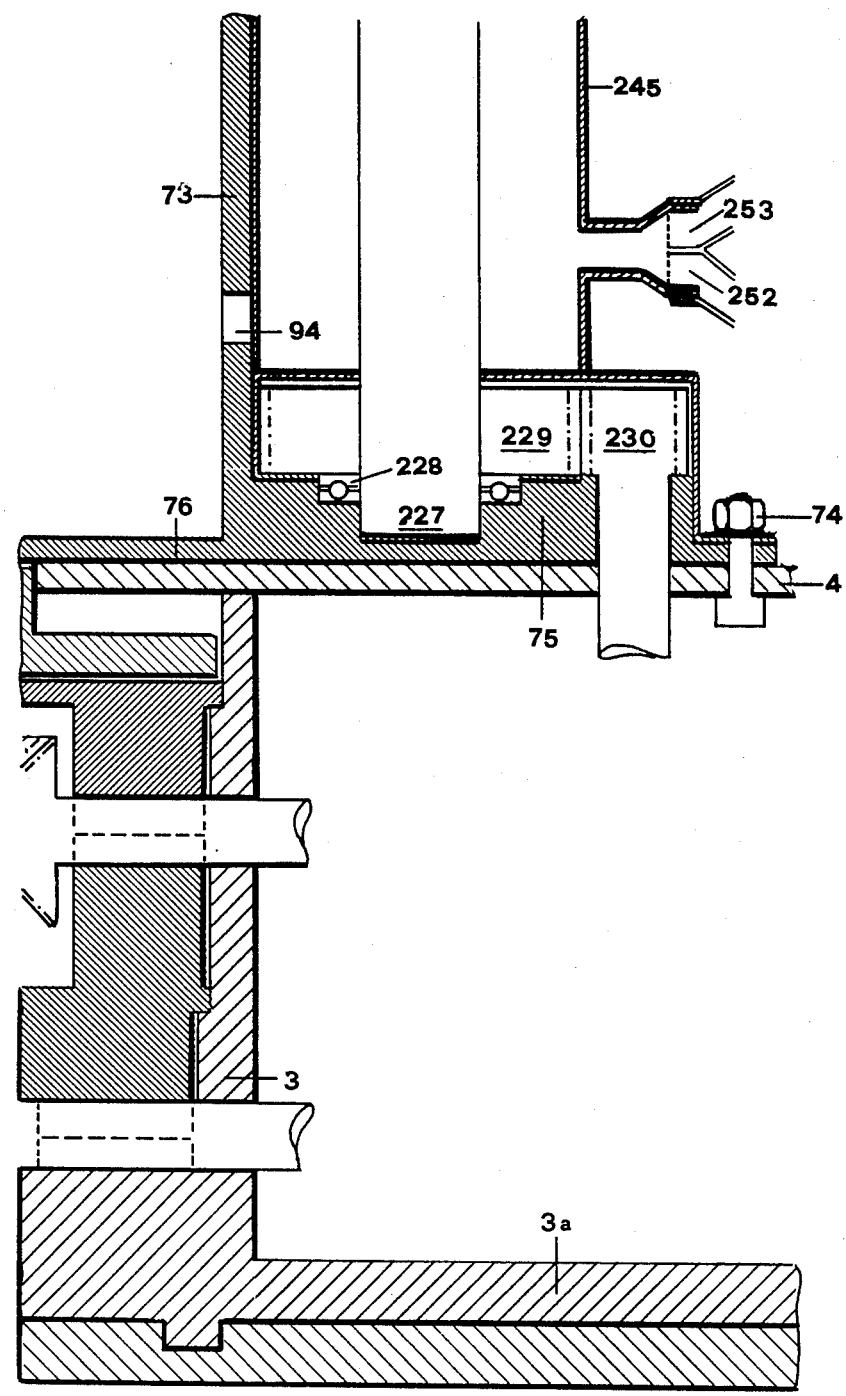
Figure 2C:
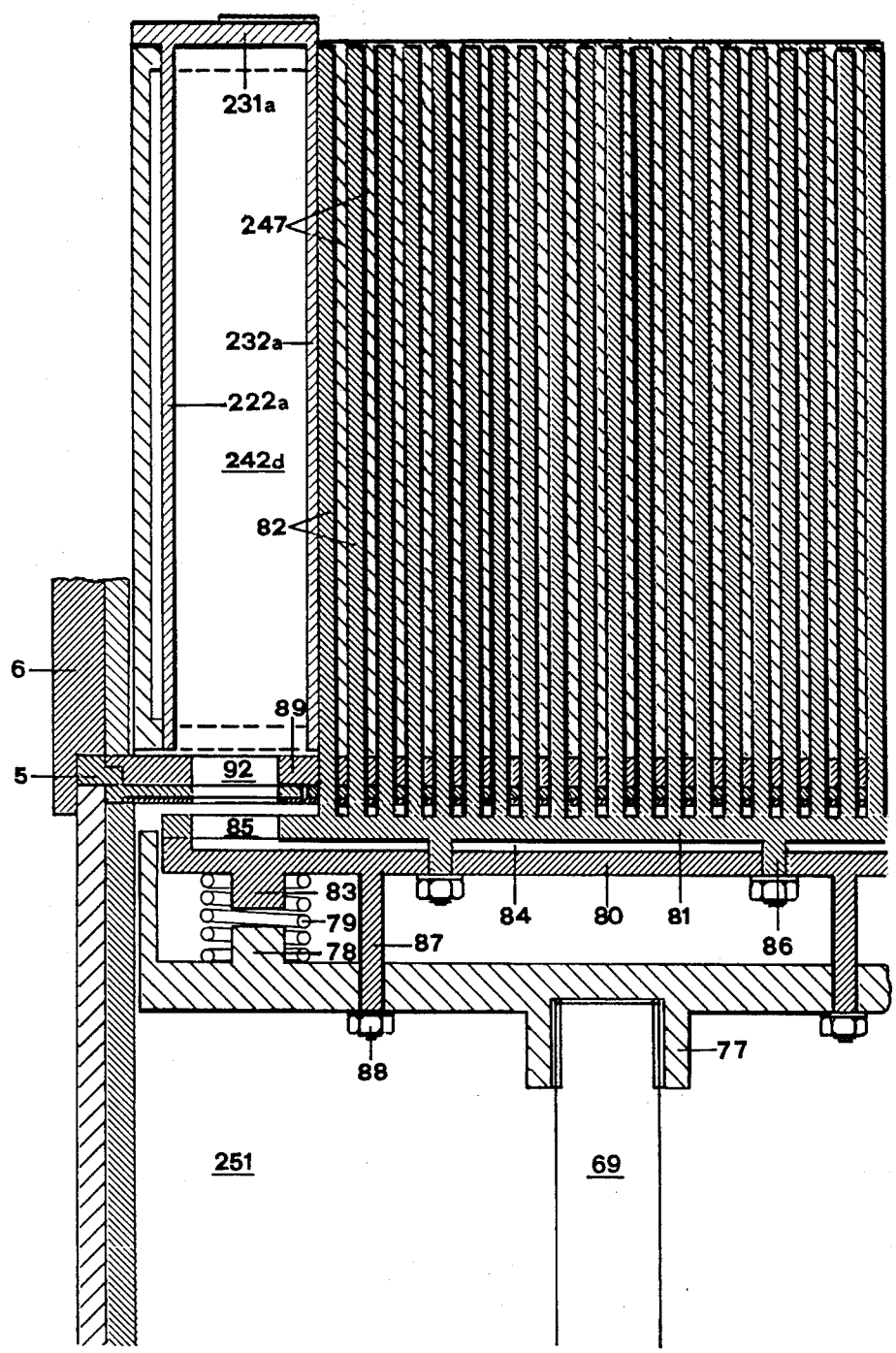
Figure 2D:
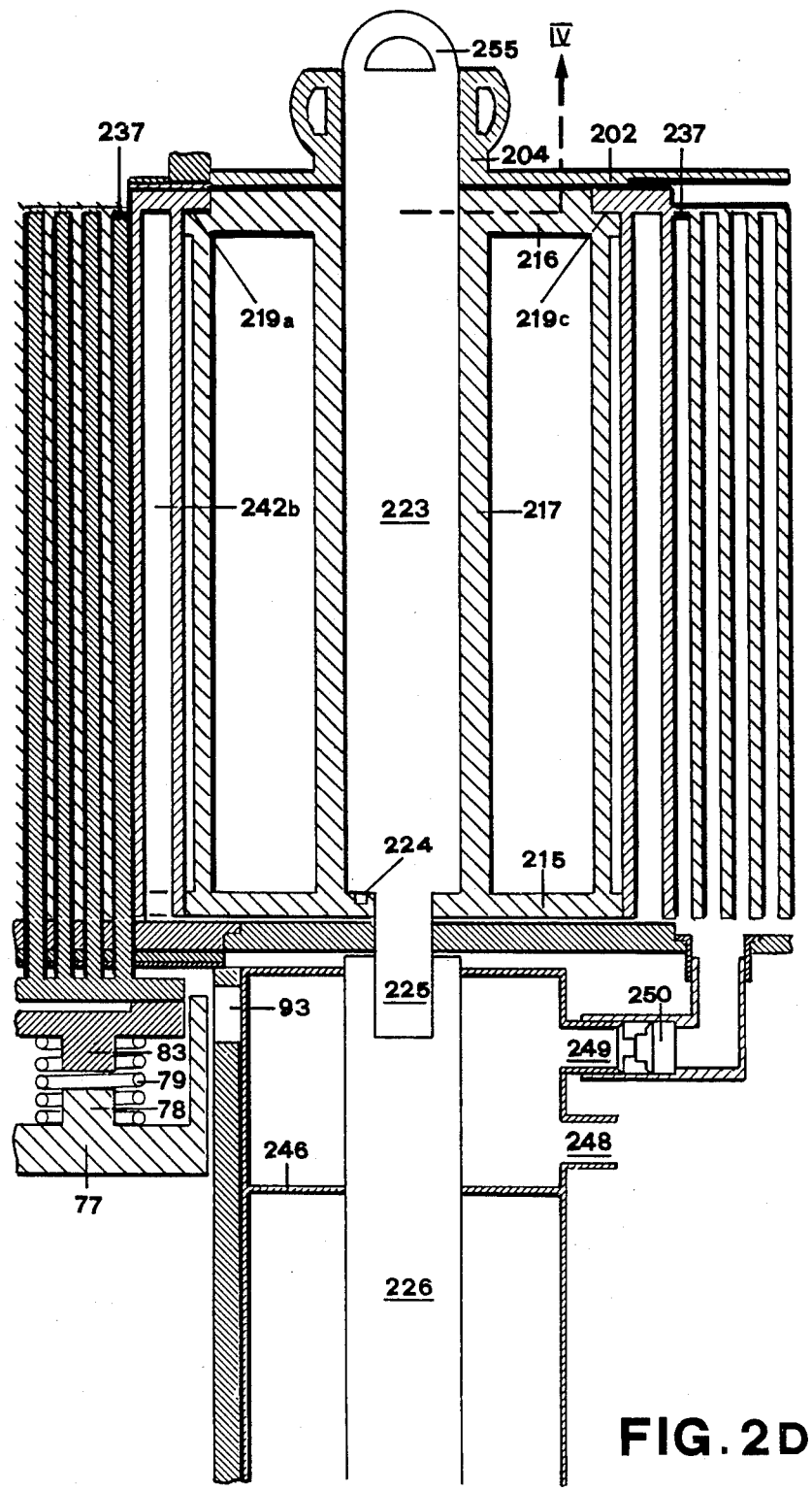
Figure 2E:
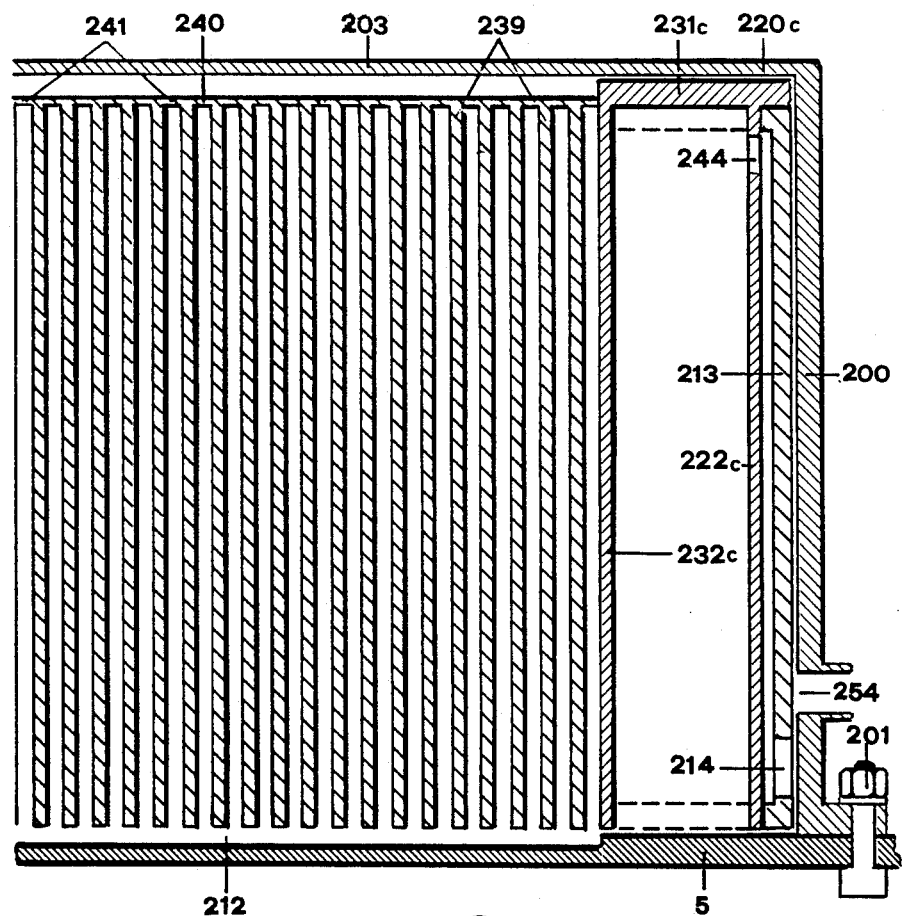
Figure 2F:
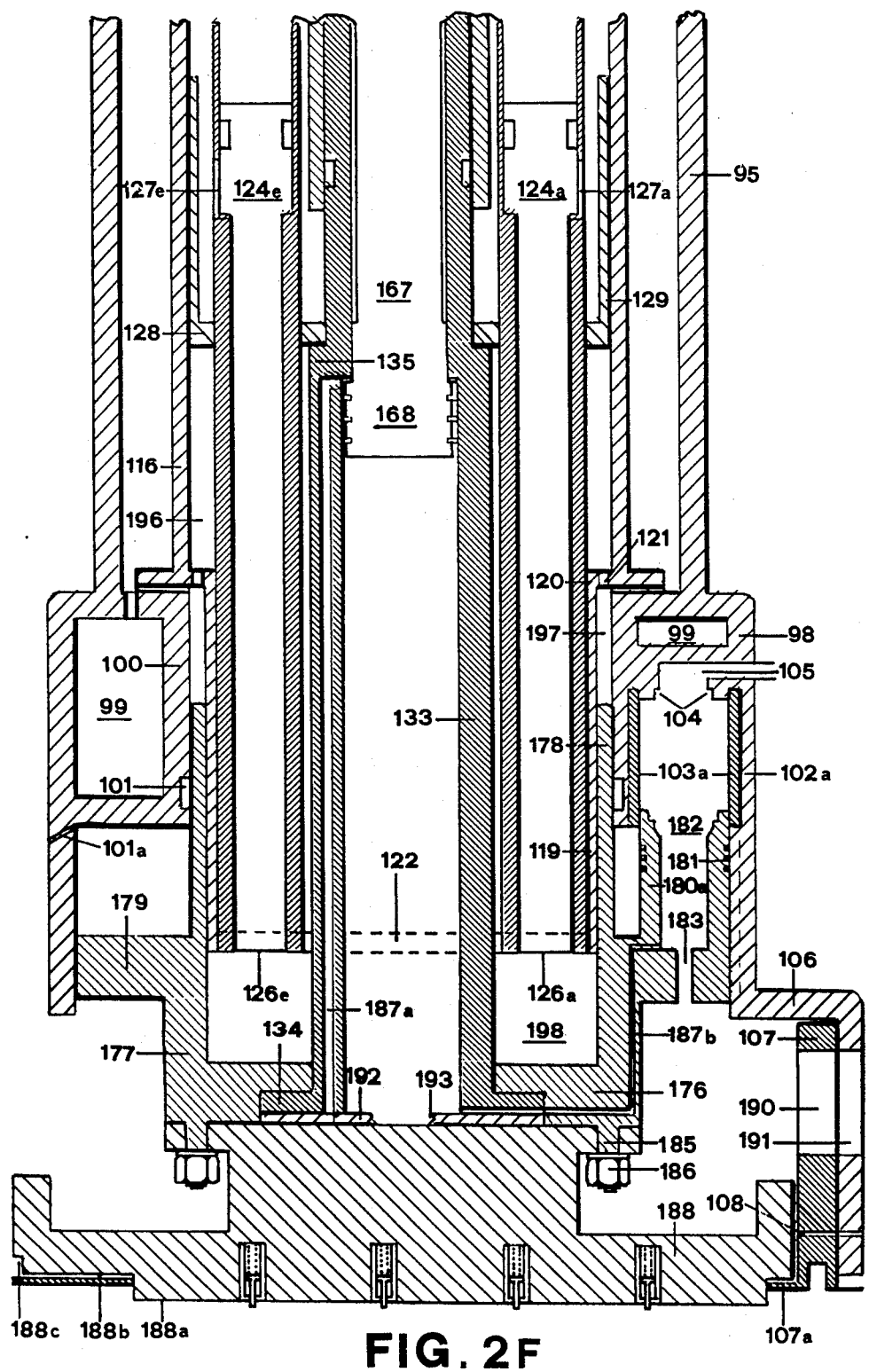
Figure 2G:
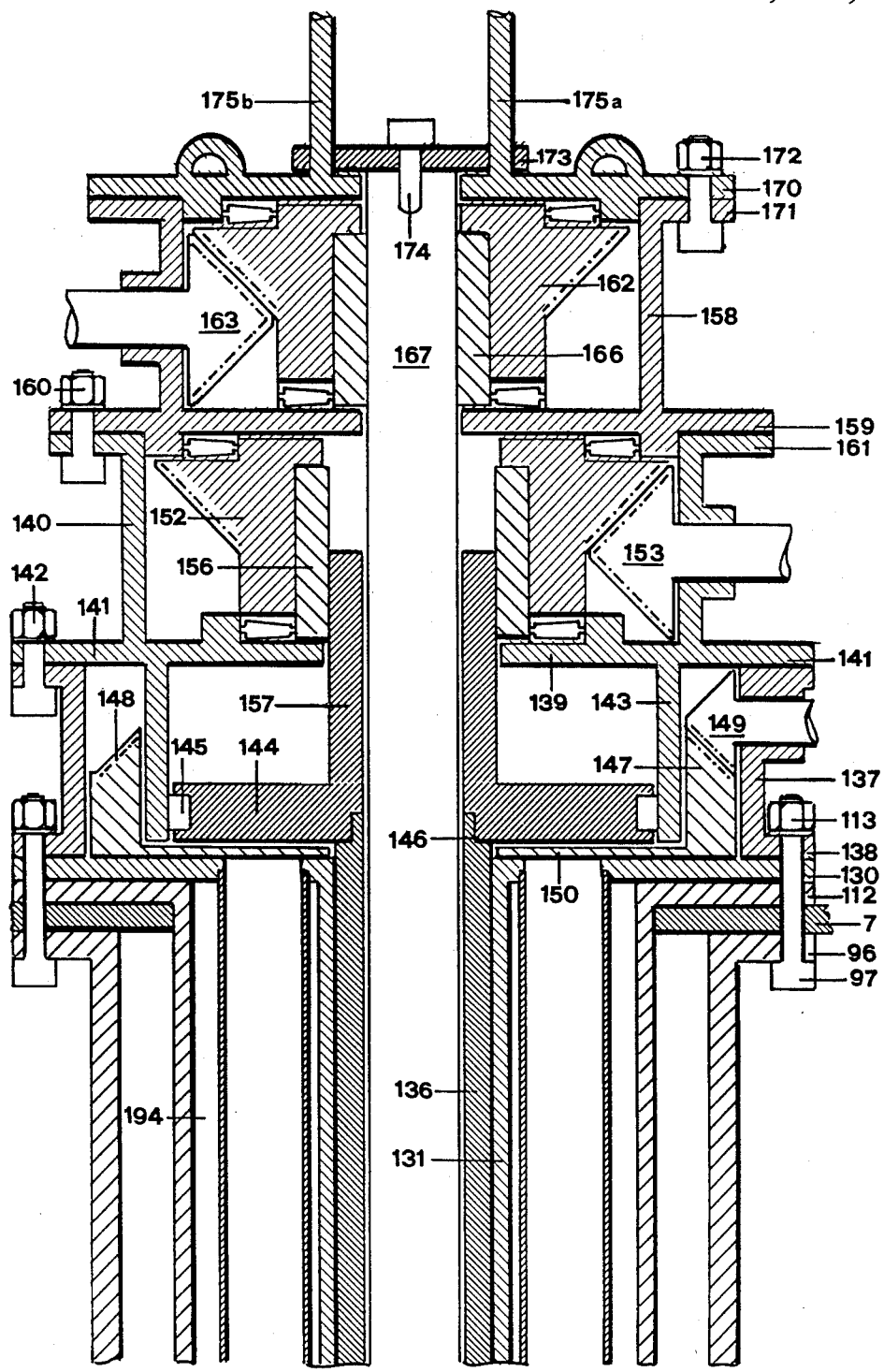

In the following, a first variant of the feeding device into the working units as shown in FIGS. 1F and 1H is described. This feeding aggregate contains various elements included in the cylindrical body 6 forming the outer wall of this element and in which a fixed bottom 8 is provided.

This bottom is held by a contraction of the inner wall of the cylindrical body 6. The bottom has in its middle a vertical support 8a which is attached by a key in order to form a holding device for the elements of the central part of the installation, and to hold it in position.

The outer wall of cylinder 6 has at least one opening 9, which advantageously is rectangular and leads into each working unit which is arranged around the feeding device in order to allow the material or the mixture of the feeding device to pass into the mold of the sector corresponding to the working unit. Furthermore, the casing 6 has openings 10a, 10b in its upper part which are connected with sources of mixtures previously prepared. The openings are useful when several materials or mixtures are being fed into the mold, as will be described in detail for the second variance.

The feeding device of the installation arranged successively from top to bottom in its outer casing 6, has at least one funnel 53 or a feeding channel for the material or mixtures, at least one mixing device, at least a mixture feeder and at least a regulating device dosing and transporting the material. Each regulating device is allocated to at least one distributor opening 9 arranged in the upper cylinder 6.

The supply funnel is formed by a cylinder 53 which is fixed onto platform 7 by holding devices not illustrated and which shows a bottom base 54 which is provided in the middle with a box 55 in which the upper part of a common driving shaft 32 of the mixing device is carried, and which is connected with the wall of the cylinder 53, for instance by two axes 56 forming a cross. This enables the input of the basic material into the mixer.

This mixer has a double bottom or base which shows a first fixed cylinder 37 which is suspended in the outer casing 6 by the broadened upper part 39. This broadened part is positioned on the third platform 7 and is attached by screw nuts 41. The driving shaft 32 passes through the center of the base 39 of the first cylinder, and is common both to this mixer and to the feeding aggregate with mixture, and is provided with arc-shaped openings 40, arranged concentrically and equally spaced around shaft 32. Furthermore, the mixer has a second movable cylinder 42 which is carried on the round platform 7 with its broadened part 43, suspended in the interior of the first cylinder 37 and turned by a toothed border or crown formed on the edge of the broadened part 43 and in contact with a toothed wheel. Bottom or base 45 of the movable second cylinder 42 is provided with a series of arc-shaped openings 40 in bottom or base 39 thus forming a mixing bottom which opens periodically by the turning of bottom or base 45 with reference to bottom or base 39 to unload the mixture into the mixture supplier which is positioned underneath. Advantageously the driving shaft 32 is provided with a groove 47 in the upper part corresponding to the mixer. On this part a mixer settler provided with wings is attached which is formed by an axis 48, wings 49 and a key in contact with groove 47. By this means the material supplied by channel 53 is mixed in the mixer for a set length of time before going into the mixture supplier. It is possible to add auxiliary material by openings 50. These materials may be dosed by dosing devices not illustrated.

This mixture supplier is provided with a feed screw 30 attached to the driving shaft 32 and resting on a roller contact bearing 34 by its plate 33, with one purpose of permitting the continuous transport of the mixture from the mixer to the output openings 17, 16a, under low pressure of the double bottom or base which opens with a gliding movement. The feed screw is rotated in a chamber which is formed by the cylindrical body 6. The double bottom or base of the mixture supplier is formed by a fixed bottom or base 18 with a cylindrical part 18a forming a casing which stretches co-axially down to the reversing shaft 32, as well as a movable bottom or base 16 which possesses a cylindrical part 13 which extends downwards around the casing 18a and ends in a toothed wheel 14 which is in contact with a driving toothed wheel 15. As it turns, cylinder 13 is supported by a fixed ring 11 which is attached to a narrowed part of the lower wall of the cylindrical body 6 and carried by a roller contact bearing 12.

That part which forms the movable bottom or base 16 possesses arc-shaped openings 16a, which correspond to the openings 17 in the fixed bottom or base 18, and the cylinder 13 in its upper part has openings 36 which are coordinated to the openings 18b of the casing of the fixed bottom or base 18. In this manner the mixture is carried by the rotating of the bottom or base 16 and the cylinder 13 as well as by the feed screw 30 at low pressure and unloaded into the dosing chamber of a regulation device for dosing and transporting of the feeding device.

Furthermore, the reversing shaft 32 carries in its lower area, at the height of the casing 18a of bottom or base 18 opposite the openings 18b, a feed screw 31 with a reversed leading against the feed screw 30 in order to push up the mixture transporting by the opening 18b into the chamber of the mixture supplier. The feeding element preferably has a regulation device per working unit for dosing and transporting the mixture. This device is fixed in the upper part of the cylinder 6 before the double bottom or base of the feed supplier is assembled.

This regulation device for dosing and transport is formed by a fixed ring 19, which is carried by a narrowing in the inner wall of the casing 6 of the feeding device. In the middle of the ring's surface is a certain number of bar stock carriers, one for each dosing and transporting regulation device, and consequently at least one for each working unit fixed around the feeding device. The ring 19 has a fixed cylinder 21 welded on its inner wall, which is positioned on cylinder 13 of the movable bottom or base 16 of the feed supplier in order to stabilize the latter in a vertical position.

The upper part of the movable cylinder 21 has radial walls, which extend sideways up to the wall of the cylinder 6 and as high as the upper limit of the rectangular shaped opening 9 thus forming four vertical divisions 22a, 22b, 22c, 22d.

In each of these vertical divisions is a ground-segment shaped bottom or base 23, carrying a threaded rod 24 underneath which is provided with a regulating screw nut 24a and screwed into the bar stock carrier 20 carried by the ring 19. Each bottom 23 has vertical slides 23a which can slide along the vertical walls of the divisions 22 and the outer casing 6.

On the surface of each bottom or base is a bar stock carrier 25, onto which an oscillator 27e, f, g, h is fixed, formed by a horizontal arc-shaped plate and a rod leading into the rod bar carrier 25. The plate 27 is supported by a coil spring 26 at the bottom edge of the coordinated rectangular opening 9, which is positioned between the horizontal plate 27 and the bottom 23 around the rod bar carrier 25. In this manner the horizontal plate 27 with the movable bottom 16 of the mixture supplier defines a dosing chamber with a changeable volume. Furthermore, each oscillator has a part 29 forming a casing or a back welded to the inner edge of the plate 27 and which extends to the dosing chamber to be tightly supported on the outside wall of the fixed cylinder 21 on the fixed ring 19, covering the opening 21a of this cylinder 21 coordinated to the openings 36 and 18b of the cylinders 18a and 13, respectively. Moreover, each horizontal plate 27 has a bottom peripheral part forming a casing 27a, b, c, d which is positioned between the walls of the fixed divisions and the bottom wall of the cylindrical body 6. The plate 27, the casing 27a, the rod 28 and the back 29 oscillate by the action of the pressure of the coil spring 26 and the mixture contained in the dosing chamber above the plate 27. Thereby the back 29 opens and periodically covers the opening 21, thus enabling the transport of the mixture into the mixture suppliers through the openings 36 and 18b every time the pressure of the mixture in the dosing chamber is greater than the power of the coil spring 26.

The work of the regulating device for dosing and transporting goes in two phases. As soon as the openings in arc-shaped 16a and 17 of the double bottom of the mixture supplier are aligned, one above the other, the mixture is fed into the dosing chamber under low pressure and into the mold through the dividing opening 9. When the way is closed, the mixture is subject to the pressure of the coil spring 26 by the oscillator 27.

When the pressure which is exerted on the mixture fed into the mold by the feeding device is greater than an adjustable medium pressure, which basically corresponds to the tension of the coil spring 26, the oscillator 27 sinks, whereby the transport openings 21a, 36, 18b are opened. Consequently, the pressure prevailing in the dosing chamber of the regulating device for dosing and transport and in the dividing device 9 and the feeding openings and the conductions connecting the latter with the mold, cannot be higher than the fixed medium pressure above which the material or the mixture agglomerates. Therefore, the mixture always stays in a workable condition and can be reused for the following working phase.

Figure 13:
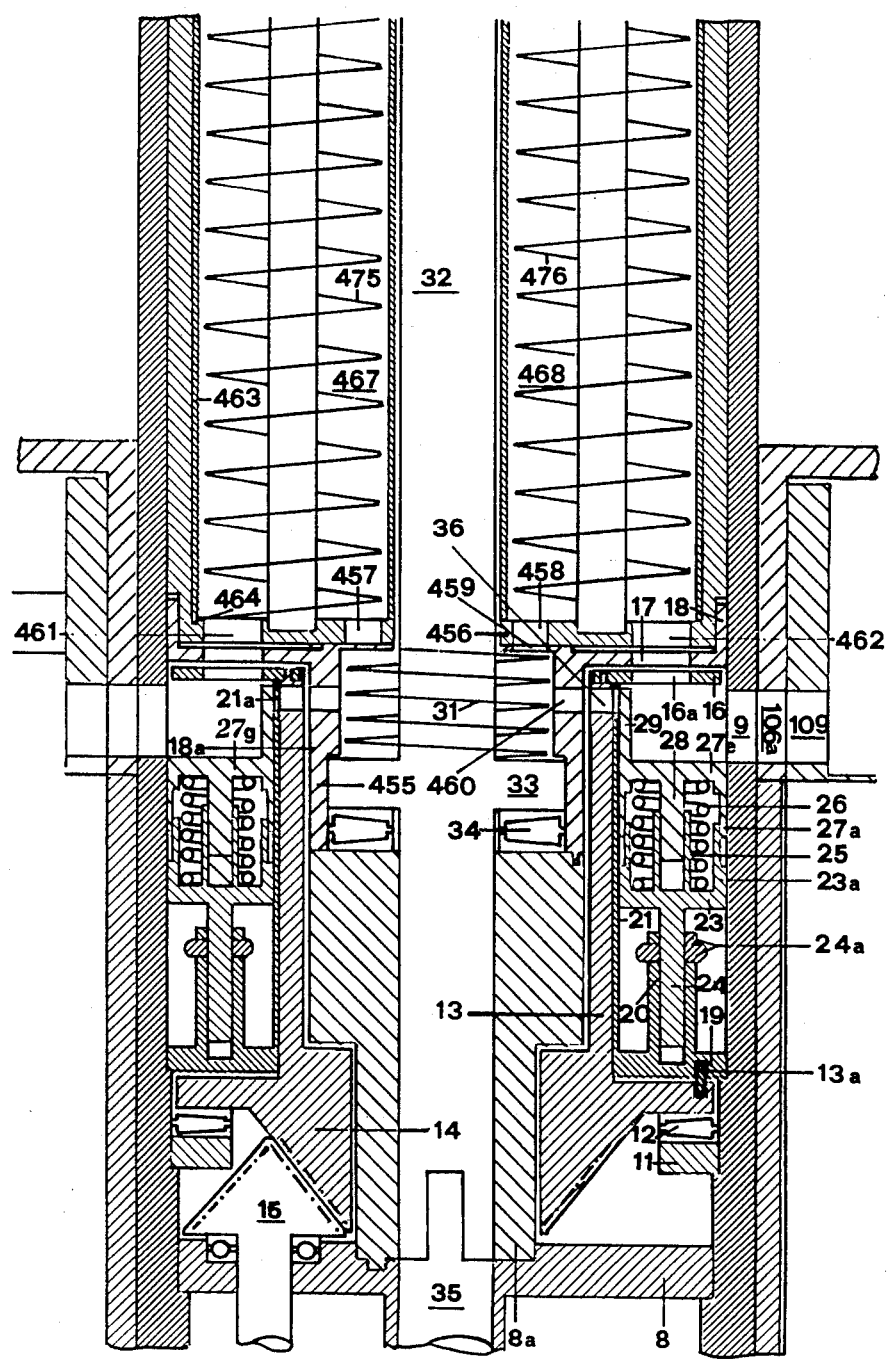
FIGS. 13 and 14 together represent a vertical section taken along line XIV—XIV of FIG. 15 showing a second style of execution of the feeding substance of the installation.
Figure 14:
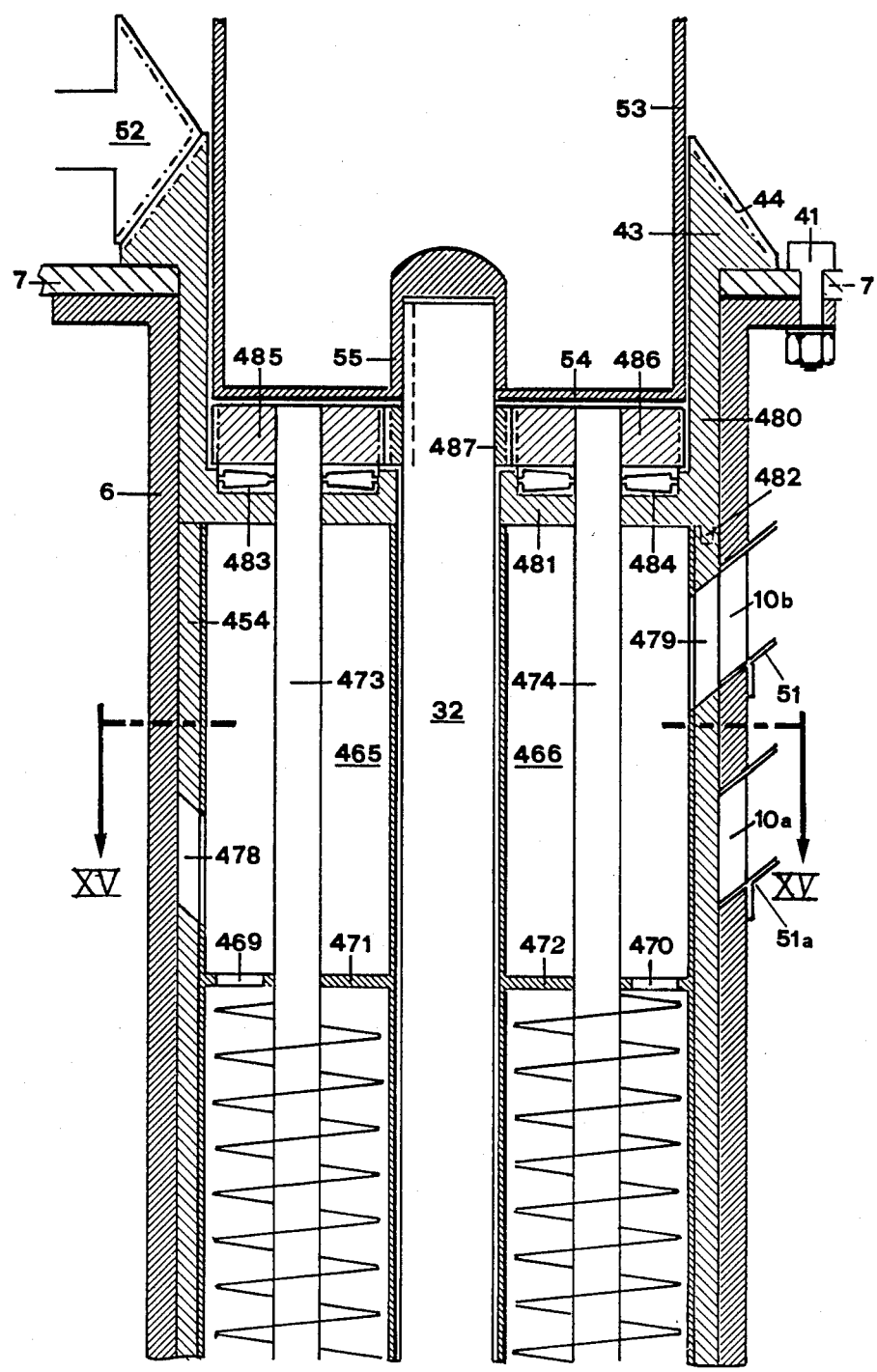

With reference to FIGS. 13, 14, 15a a second style of execution of the invented feeding device is described. This style of execution allows the feeding of two mixture of different compositions. The second style of execution of the feeding device contains the same elements as the first style of execution, namely a mixer, a mixture supplier and a regulating device for dosing and driving back. It is a modification of the first style of execution in the following respects:

The mixture supplier provided with a feed screw and the double-bottomed mixer are replaced by an outer cylinder 454 which is tightly inserted in the outer cylindrical casing 6 and has a bottom 456 which is provided with at least one opening 459 for transporting the mixture and which is carried by the fixed bottom 18 of the mixture supplier. The casing 18a of the bottom 18 is provided with openings 460 for transporting the mixture, and is supported by means of its bottom part 455 on the vertical frame 8a fixed on the fixed bottom 8 by a key. All these elements are penetrated by the common reversing shaft 32. The bottom 456 is provided with two arc-shaped openings for the dosing of the mixtures 461, 461 as well as two openings for the driving back of the mixtures 457 and 458.

The bottom 456 is screwed in tightly to an inner cylinder 463 which is fixed by a wedge system 464 and has at least two mixture containers 465, 466 in its upper part and below these the same number of mixture containers 467, 468 fitted with feed screws, each of which is connected with the mixture containers 465, 466 by openings 469 and 470, respectively. These openings are cut into a bottom 471, 474, and a reversing 473, 474 passes through the middle to drive the feed screw of each mixture feeder. The central wall of this mixture container and mixture feeder is formed by a cylinder 477 which is positioned co-axially to the cylinder 163 and fixed around the mutual reversing shaft 32 serving as a guide to this reversing shaft.

Furthermore, this feeding substance has openings 478, 479 which penetrate the wall of the inner cylinder 463 and the outer cylinder 54 in order to adjust themselves continuously and synchronously according to the working cycle, with a corresponding opening 10a, 10b which is provided in the wall of the cylindrical body 6 and which is connected with a suitable mixture source by a mixture feeding tube 51, 51a.

The regulation devices for dosing and driving back remain unchanged compared with the first style of execution. However, the way they work is noticeably different. In fact, the regulation devices for dosing and driving back are screwed firmly into the movable cylinder 13 by an inserted wedge 13a. Consequently, the feeding of two mixtures is done by their own dosing and driving back 16, 27, the connection of which with the respective feed screw mixture feeder 467, 468 is completed by suitable turning of the bottom 456 of the outer cylinder 454. The stop devices of this cylinder 454 are programmed in such a manner that the arc-shaped dosing openings of the mixture 461, 462 are opened at the beginning of the feeding and are again closed at the end of the feeding, at the same time opening the openings 457, 458 for driving back the surplus mixture.

Concerning the feeding channel, during this style of execution it contains a movable cylinder 480, which is tightly pressed into the fixed cylindrical body 6 and is supported on the fixed platform 7 with its extension 43 thus forming a toothed ring provided with a guiding toothed wheel 52 whereby its bottom 481, fixed by a wedge 482 to the outer cylinder 454 and penetrated by the reversing shaft 472, 474 takes up roller bearings 483, 484 which form the coating of the toothed wheels (485), (486) connected tightly with the reversing shaft 473, 474. Both these toothed wheels are in contact with the toothed wheel 487 which is positioned on the mutual reversing shaft 32 with the help of a key.

The turning of the mutual reversing shaft 32 thus brings about the turning of the shafts 473, 474 in order to guarantee the dosing and driving back of the mixture and the fed material into the regulating devices, whereas the toothed wheel 52 drives the outer cylinder 454, in order to turn the compartments around the shaft 32, thus connecting the second division with the regulating device for dosing and driving back which previously was connected with the first division.

As described before, every working unit is arranged around the feeding device and divided into sectors. In at least one of these sectors press forming elements are fixed which is described with reference to FIGS. 1A–1E, 1G–1I, 2A–2G–26 as follows:

One press forming system consists of an auxiliary press and a main press arranged on platforms 2, 4, 5 and 7 opposite each other in order to form a space between their respective pressing apparatus which allows the mold elements of the carousel of the working unit to pass through.

The auxiliary press has a lower feed screw press positioned in a twin cylinder 3 of the frame which shows a toothed wheel 57 in contact with a driving toothed wheel 58, whereby a driving screw 59 is fixed into a hole bored into the toothed wheel 57.

This toothed wheel is carried by a lower roller contact bearing 60 in the bottom of the twin cylinder 3, and an upper roller contact bearing 62. A plate 61 which lies on a first inside contraction of the twin cylinder 3 and is carried by the upper roller contact bearing, serves as a support for the upper screw press which has also a toothed wheel 64 in contact with a pinion drive 65, and a driving screw 66 fixed into a hole bored into the toothed wheel 64. The lower part of this toothed wheel is carried by a roller contact bearing 63 and the upper part by another roller contact bearing 67. The latter is inserted between the toothed wheel 64 and a fixed plate 68 which is carried by an inner contraction of the twin cylinder 3.

The lower feed screw press operates the up and down movement of a thread axis 69 which is prevented from turning by a yoke (not illustrated), positioned on at least two guide gliding rails 70a, 70b which are tightly connected with bottom 3a of twin cylinder 3. The upper screw press which is interchangeable and adjustable according to the articles to be produced, drives a plate 71 by the thread axis 72 in contact with the driving screw 66.

The auxiliary press also has a piston 77 which for instance is fixed by screws on the thread axis 69 and forms the pressing tool of the auxiliary press. Gliding on this piston 77 lies a plate 80 with the help of two pilot pins 87 at a distance from the lower side of the plate 80. The free end of these pins 87 has screw nuts 88 forming stops in order to limit the upward movement of the plate 80.

Furthermore the plate 80 is held at a certain distance from the plate 77 by spring bolts 79 arranged around guide bushes 78, 83 which are tightly connected with piston 77 and plate 80. In this manner plate 80 can oscillate on the piston 77 under pressure.

This plate 80 is degradable, equipped with mold elements which together with those carried by the carousel define the form of the manufactured articles. These mold elements are interchangeable according to the articles to be produced and are described in detail in the description of the carousel and the operating manner of the installation for the production of predetermined articles.

The auxiliary press plays a dominant role during a compressing phase of the articles, in particular of vertical molds.

Generally, the lower screw press controls the upward and downward movement of the mold elements which are carried by the piston 77 and the plate 80 to allocate same to those mold elements which are carried by the carousel and will be described in their turn. Furthermore it is involved in the build up of a medium pressure exerted on the material or the mixture in the mold and controls by vertical oscillation of plate 80 to piston 77 the quantity of the mixture fed into the mold. Furthermore, the screw press brings about a forced circulation of hot air into all working units for the manufacture of certain products as described later, for instance brake linings, running synchronously with the working cycles in order to accelerate the drying and handling or treating of the formed products, and to guarantee the education of air and steam in the mixture during the compressing phase at a medium pressure, and its cooling.

The upper screw press supports a substance for forming products of a complicated form, and effectuates the borings, pressing, and so on. It also carries a reversing shaft in order to operate tools to mold or perforate the articles before these are manufactured during the compression phase by the main press to be described later on, and the lower screw press of this auxiliary press. Other functions of the upper screw press become evident from the description of the manufacture of specific products or items.

The main press which is opposite the auxiliary press, is fixed onto the stationary platform 7. It may be formed by any press which advantageously allows the exertion of a progressively growing pressure onto a product in order to finally treat the material into mold with a high pressure.

Advantageously this press can be operated as a hydraulic, pneumatic or combined pneumatic explosion press.

Considering the above described style of execution of this invention which is only to be understood as an example, this press has an outer cylinder 95 forming the outer mantle of the press and which is fixed by a broadening 96 on the stationary round platform 7 by spread nuts 97. The lower part of the wall has two broadenings on top of each other. It includes a first upper broadening 98 which extends up to the middle of the press in the form of a ring-shaped cooling water reservoir 99 which has an inner wall 100, provided with a stopping-up stuffing box 101 and an opening 101a for the recovery of the fluid medium, and contains in its outer region a cooling water inlet (not illustrated).

This first broadening has at least one hole bored into its lower part to define the cylinders 102a, 102b, 102c which are distributed around the edge of the press and each have an inserted mantle 103a, b, c, which will be later on described in detail in the description of this press as combined pneumatic-explosion press.

A second lower broadening 106 defined a cylinder in which an uncovered mixture or material container 107 is provided and which has a bottom 107a cut according to an opening which corresponds to the upper opening of the subjcent mold. The side walls of the container 107 show openings 108 connecting these with the surrounding atmosphere by the wall of the broadening 106, and a rectangular opening 109 in alignment with the respective openings 106a of the broadening 106. Advantageously, the bottom 107a has a ringside groove 11o, in which there is a piece of a felt in order to wash the casting mold above, which is carried by the platform of the working unit. This groove is connected with the cooling water reservoir by a great number of small channels (not illustrated), the latter being connected with the upper cooling water container 117 by a passage 118 which is arranged between the outer mantle 95 and the upper part of the intermediates cylinder 116 and is isolated against the hydraulic container 196 by the broadening 114 and the lining 115. Inside the intermediate cylinder 116 is a central cylinder which shows a piston 168 equipped with packing ring 169 and a wave bar 167 which is firmly flunged by a yoke 173 on the guiding bars 175a, 175b, so that it cannot rotate, and fixed by a nut 174 onto the bar 167. The piston is fixed on a movable cylinder 133 which has neither bottom nor cover and has in its lower part a broadening 134, openings for the circulation of fresh air 187a, 187b, and a contraction 135 about half way up. The latter serves to support a movable intermediate plate 128, above which the upper contracted part of the cylinder 133 glides tightly into the interior of a guiding cylinder 131. The latter is fixed on the platform 7 through a broadening in the form of an upper fixed plate 130. The upper end 136 of cylinder 133 is in constant contact with the piston of an oil pressure pump in the inside of an outside cylinder 137, which by its lower broadening 138 lies on the surface of plate 130 of the broadening of cylinder 131, and is fixed on platform 7 by nuts 113. The body of this pressure oil pump is formed by a cover 139 which at the same time forms the bottom of a cage 140 which is fixed on cylinder 137 by its broadening 141, and by nuts 142. This pump furthermore has a driving cylinder 143, forming a box for compressed oil in which a piston 144 glides. The latter has piston rings 145, its center part lies on a contraction 146 of the upper contracted part 136 of the movable central cylinder 133. The piston of the oil pump is driven by a lower feed screw press which is enclosed by cage 140, and formed by a toothed wheel 152 which is in contact with a pinion drive 153. The latter is carried by roll bearings 154, 155 at its upper and lower sides and has a central boring in which a nut driving screw 156 is inserted which is in contact with a screw shaft 157 tightly connected with piston 144. The main press has also several hydraulic cylinders in a crown-shaped arrangement around the central cylinder 133 and the guiding cylinder 131, for instance open ended cylinders 123a-123h which all have the same diameter and which house in their upper part the heads of 8 free differential pistons 124a-124h each of which has a packing 125a-125h, and in their lower part with reduced diameters are the bars 126a-125h of the differential pistons which perform the task of plunger pistons. Each of these hydraulic cylinders which is welded in its specific opening which is formed within a first common fixed lower plate 128 supported by the contraction 135 of the central cylinder 133 in order to be inserted in its boring 132a-132h of the upper fixed plate 130 which belongs to the guiding cylinder 131. The movable plate 128 which forms the bottom of a guiding cylinder 129, glides in the inside of the upper part of an intermediate cylinder 116 which is co-axially built in the outer mantle 95 and is supported by means of its upper broadening 112 by platform 7. In this manner the plate 128 and its guiding cylinder 129 can glide freely, but tightly fitting into the upper part of the intermediate cylinder 116. The hydraulic cylinders 123a-123h are successively fed by the hydraulic container 151 through one single opening. The latter is positioned over the rotatable bottom 150 of cylinder 147 and turned by a driving toothed wheel 149 which is in contact with a toothed surface 148 of the vertical wall 147 of this cylinder.

Furthermore this main press has an upper feed screw press above the lower feed screw press which controls the oil pressure pump and enclosed in an upper cage 150 the lower broadening of which is fixed to the upper broadening 161 of cage 140 by nuts 160. This press has a toothed wheel 162 in contact with a driving pinion 163 supported by the lower and upper roll bearings 164, 165 on the lower broadening 159 and by a cover 170 fixed on the upper broadening 171 of cage 158 by nuts 172. The toothed wheel 162 has a central boring in which a driving nut screw is inserted in contact with a screw shaft 167 which is held by the yoke 173 so that it cannot rotate. This upper feeding screw press allows the piston 168 to move upwards or downwards inside the cylinder 133.

This main press has furthermore a driving piston 176, which has a central opening in which by means of its broadening the movable central cylinder 133 is inserted. This piston glides flush into the lower contracted regions 119, 120 of the intermediate cylinder 116. The lower part 177 of this piston has a broadening 179 forming a tightly connected ring which glides on the lower wall of the first broadening 98 of the outer cylinder 95. The piston 176 has mounting pistons 185, which protrude from its lower level and serve to fix a tool piston 189 or its interchangeable pressing piston which is fixed by the nuts 186 through the operating openings 190, 191. These have a suitable mold for the production of the articles and can carry mold elements; thus they are fit to form the mold together with the mold elements of the carousel and the previously defined mold elements.

Furthermore, the tool piston 188 has a circumferential level gliding along the walls of cylinder 107, partially covering the opening 109 so that feeding with material may take place when the tool piston is in its lower position. The lower surface of this piston has a central disk 188a with dimensions which are adapted to the upper opening of the molds and stepped circumferential level 188b, 188c in order to enable the surplus mixture or material not contained in the mold to be driven back into the feeding device through the openings 109, 106a and 9 without being exposed to a high pressure. Thereby the risk of an agglomeration of the material contained between the circumferential level of the tool piston and the upper side of the casting mold is prevented.

The main press has consequently all the items necessary for its operation and, in the case of being used as a hydraulic press, allows the exertion of a small, medium and a high pressure successively on the material or mixture contained in the cylinder 107 and the form underneath. Thereby the piston 144 is pressed into the oil reservoir 151 by operating the lower feed screw press and successively feeds compressed oil into the hydraulic cylinders 123a-123h by a single opening in the rotatable bottom 150 of the compressed oil distributor. At the same time the mechanical energy resulting from the lower feed screw press is transferred to the motor piston 176 above the central movable cylinder 133. Consequently, when all free differential pistons are moving consequently downwards to their specified lower dead center, the intensity of the press exerted onto the head of each differential piston in turn during the whole downward movement of the motor piston is controllable by adjusting the pressure exerted by the oil pump.

Thereby the main press has the following advantages:
It allows the exertion of a large force of pressure corresponding to its space requirement as the ultimate pressure is formed by adding the different pressures which are produced in each hydraulic cylinder, central cylinder, and container with changeable volume 194, 196, 197, 198. The latter is fed with compressed oil by the movement of the free pistons in each hydraulic cylinder and the bars of the pistons 126a-126h of these free pistons forming the plunger piston;
a continuous pressure is brought about by the successive feeding of the hydraulic cylinders 123a-123h;
an important stroke of the motor or driving piston 176 with respect to the height of the press and thus a high feeding efficiency of the molds:
the possibility of using the press as a hydraulic press with a soft operating manner, as the speed of the increase of pressure can be controlled by the feeding speed of the hydraulic cylinder, whereby the use of this press as a hydraulic pneumatic, as described in the following, is possible.

Moreover, the main press is an important element for the operating manner of the installation according to the invention. The tools of the press can easily be replaced; in order to be adapted to the forms of the articles to be produced. It has a very good accessibility to the various control devices, a good adaptability to the working rhythm and the handling procedure of the articles to be produced, for instance by adapting the piston-stroke around its starting point, the downwards and return speed of the driving piston, the programming of its operation as well as the acceleration, the slowing-down, the deceleration, the stopping, the duration and the degree of the pressure, the automatic, synchronical fastening of the mold or the items to be pressed, and finally a simple assembly of the interchangeable items or part of the tools and the prefabricated accessories complementary to the nature of the basic material.

Figure 27:
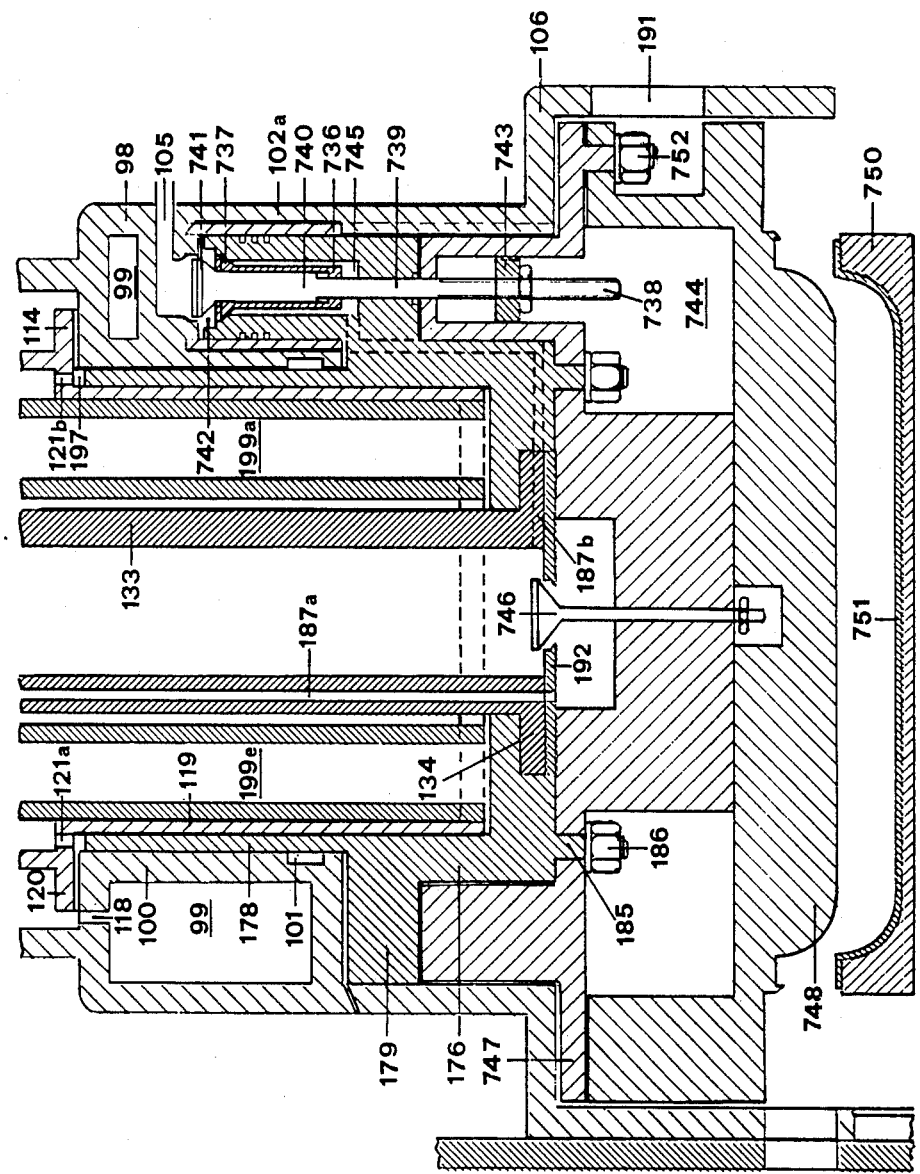
FIGS. 27 to 29 show in an axial section view the lower part of the main press at the beginning, during, and at the end of the operation of the press respectively, in a second variance, during which it has been converted into an explosion press for the production of a pressed product.
Figure 29:
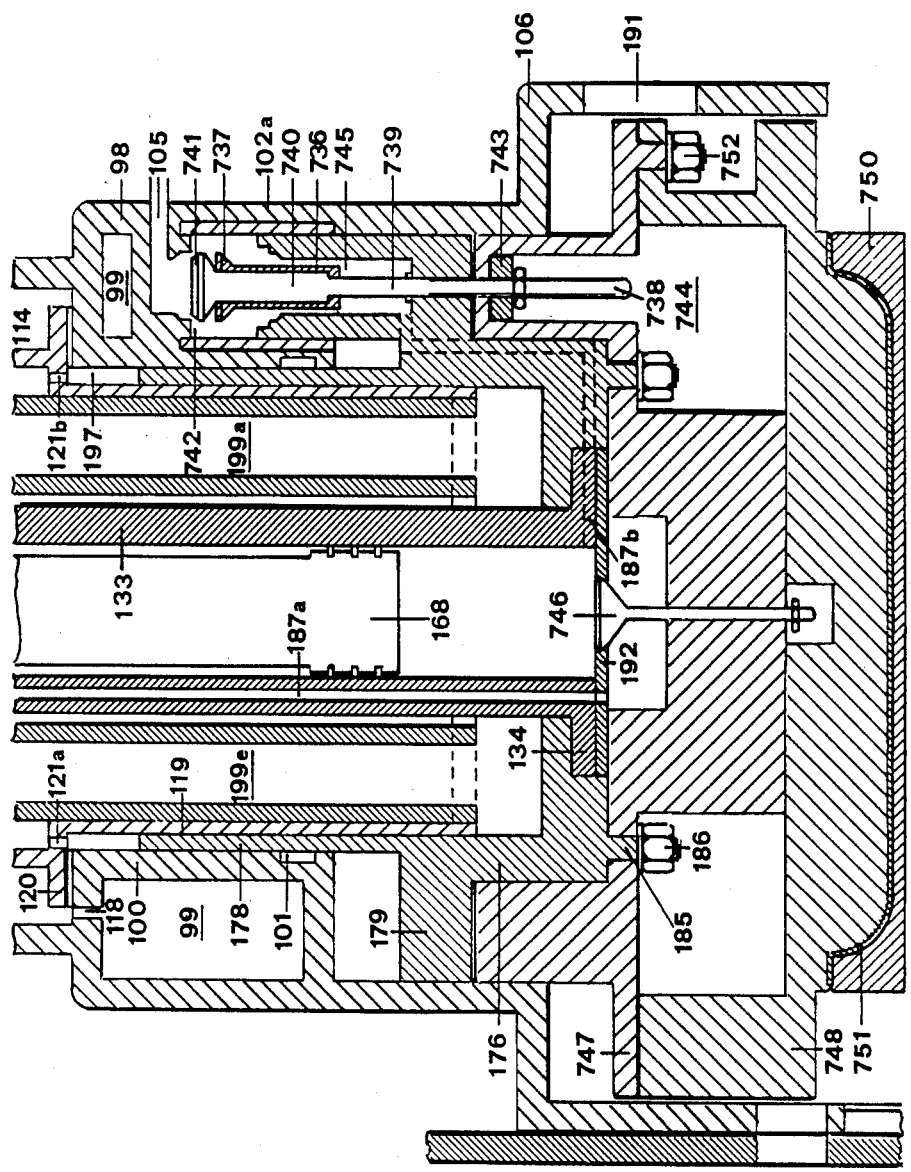

As shown before, the main press can be changed into a combined hydraulic and pneumatic explosion press as illustrated in FIGS. 27 and 29.

For this purpose liner mantles or dry liners 103a, 103b, 103c are inserted into the cylinders 102a, 102b, 102c which have been found in the first broadening 98 of the outer cylinder 95, and a valve seat 104 and a discharge line 105 are inserted into the cover of each cylinder 102. Furthermore, the ring 179 which is well densified against the driving piston 176 of the press, has cylinders, which extend from its surface and contain pistons 180a, 180b, 180c which are smoothly inserted into the liners 103a, 103b, 103c. Each piston is provided with packing or compressing rings 181 and is pierced along its entire length forming a valve stem guide and ending in the base of the fixed ring 179. The upper edge of each piston 180a, 180b, 180c is formed in such a way that it forms a valve seat 184. Each piston 180a, 180b, 180c is provided with two valves, a suction valve for fresh air 736 the head of which lies on a valve seat 184, and a discharge valve 738 which is built so that it glides into the central boring of the suction valve 736. The discharge valve has a valve block 741 which is supported by the valve seat 104 whereby a valve body 740 glides into the inside of the central opening of the suction valve 736, and a valve stem 739 is arranged, so that it glides into the opening 183 of the valve stem guide of the fixed ring 179. The end of this valve extends above the base of the fixed ring 179 and has adjusting nuts 743 which are accessible by the access opening 744 and the operating openings 191, in order that the moving of the motor piston 176 of the press can bring about the opening of the discharge valve after this driving piston has covered a specific deepness, thus adjusting the low pressure or the degree of the compression exerted by the tool piston 188.

The suction valve 736 forms, together with the discharge valve block 738, a combustion chamber 742, when its block 737 lies on its valve face 184, and below a fresh air chamber 745 in the piston 180. This fresh air chamber 745 is connected on the one hand with the atmosphere and on the other hand with the inside of the movable central cylinder 133 of the press by a suction valve for fresh air (fresh air inlet 736) the block of which has a face 193 which is modeled in a round fresh air inlet plate 192 fixed between the broadening 134 of cylinder 133 and the upper surface of the tool piston 188. The bar of this valve is fixed so that it slides into a valve stem guide which is situated in the piston body 189, whereas the intermediate part of piston 188 is modeled in the form of a plate 747 which with the help of the nuts 752 allows the interchangeable pressing tools 748 to be fixed. The latter are advantageously arranged so that their broadened part slides within the inside of the broadening 106 of the outer cylinder 95 of the main press. This explosion press moreover has substances of feed fuel into the chamber 742, and detonating agent (not illustrated).

Figure 5:
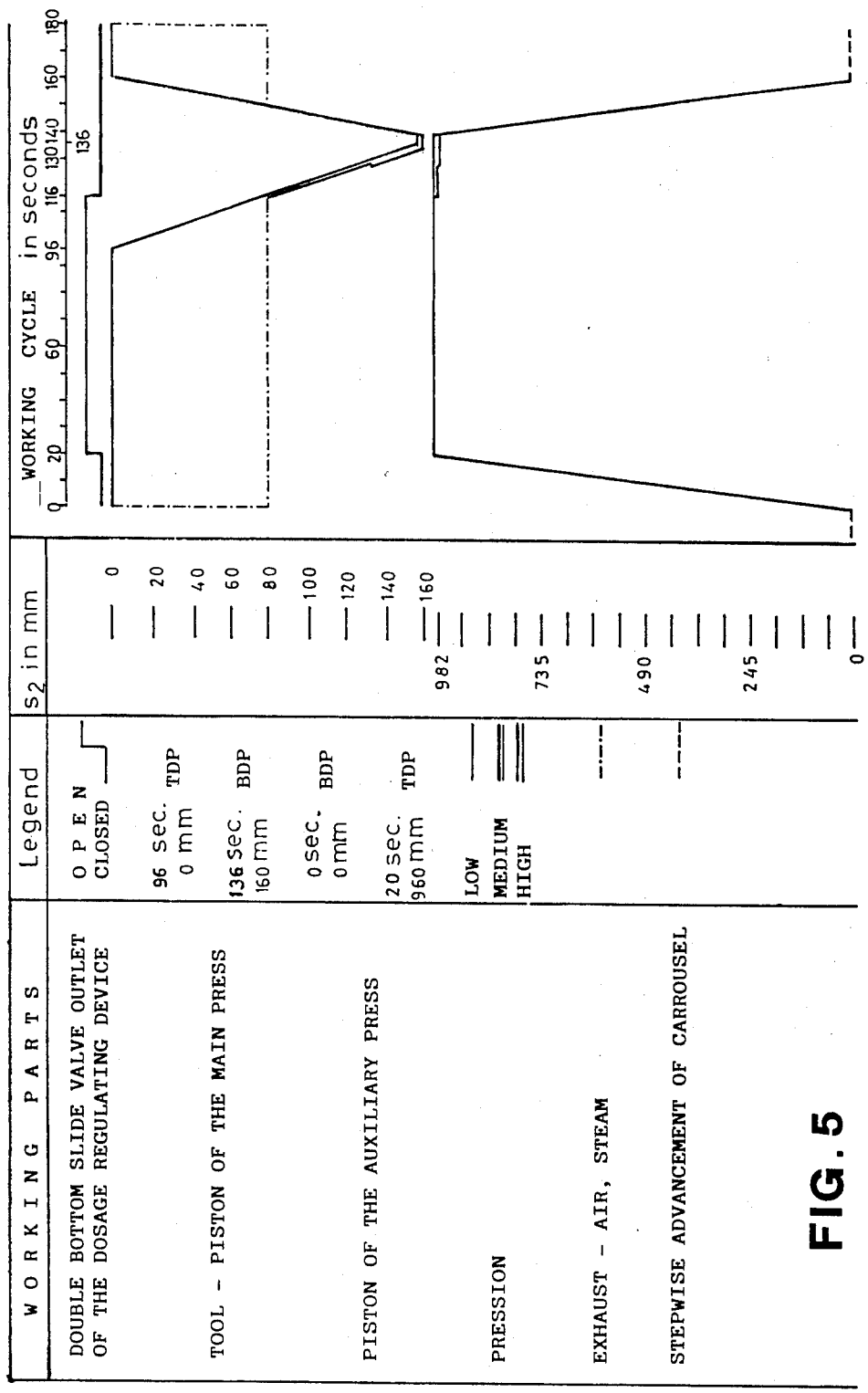
FIG. 5 is a diagram showing the different phases of production of drum brake linings in the first operation of the installation, as represented in FIGS. 1A to 1I, 2A to 2G and 3 and 4.
Figure 28:
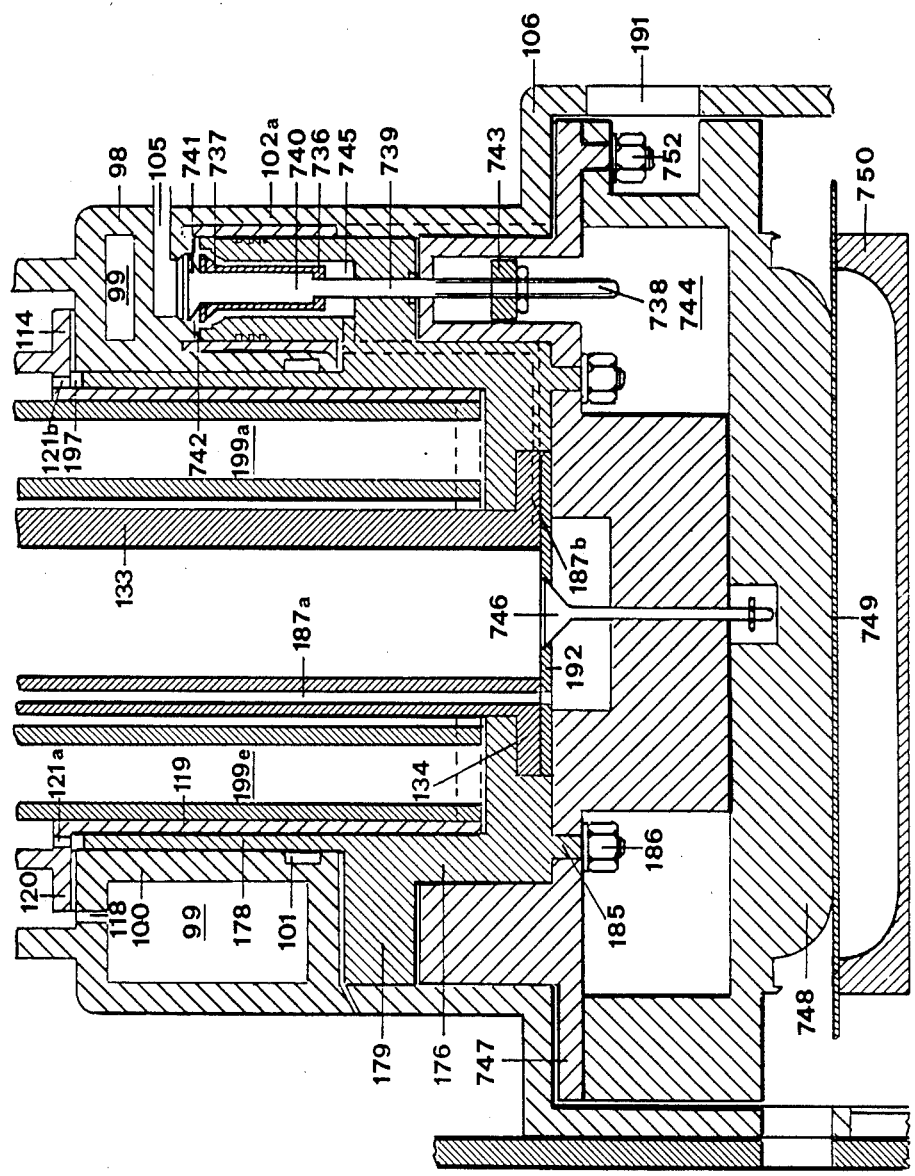

The explosion press operates as follows:

The working cycle is divided into three phases: Inlet compression and explosion/outlet. The inlet is illustrated in FIG. 27 begins as soon as the clock time shown in FIG. 5 is completed, and ends with the forward feed of progressive movement of a new mold or the material to be converted by the pressing tool 748 (FIG. 28), for instance by subsequent movement of the carousel. The finished product 751 itself is transported by the same carousel to the discharging sector. During the admission phase the upper feed screw press of the main press is set into a return mode in order to bring about the upward movement of its screw thread shaft 167 and consequently of the central piston 168 of the moveable central cylinder 133 up to the upper dead point. As a result the valves 746 are opened, fresh air is admitted into the moveable central cylinder 133, a further consequence is the coupled upward stroke of the motor piston 176, of the tool piston 188, of the tool 748 and of the pistons 180a, 180b, 180c to their respective upper dead points. The latter bring about the dosing of the suction valves, whereas the discharge valve remains partly open. During the compression phase the upper feed screw press is again put into a forward mode, whereby the central piston 168 comes to its lower dead point, thus closing the fresh air inlet 746 and compressing the air contained in the central cylinder 133 by the channels 187b in the three combustion chambers 742 connected to one another by horizontal lines (not illustrated) which are formed in the lower wall 100 of the cooling water reservoir 99. The opening of the suction valve 736 is brought about by the pressure of the fresh air inlet, whereas the discharge valve 738 is closed by the same pressure. After the injection of the fuel by the injection devices (not illustrated) the explosion of the gas mixture contained in the combustion chamber 742 is set free by the ignition device which causes the downwards movement of piston 180 and thus the transmission of the impact on the fixed ring 179 of the driving piston 179 and on the tool 748, respectively, which converts the plate 749 into the finished product 751 in the mold 750 fixed on the carousel. After the driving piston 176 or the tool piston 188 has covered a certain distance it comes into contact with the nuts 743 which cause the opening of the discharge valve 738 and consequently the output of the combustion gases into the surrounding atmosphere by the discharge opening 105 (FIG. 29). The working cycle starts again with the activation of the upper feed screw press in the opposite direction.

Below, the different styles of execution of the carousel and the other mediums or sectors of the working unit are described hereby referring to the manufacture of various specific items, such as brake lining blocks, asbestos cement tubes and automobile tires.

The productivity of an installation is generally expressed as a function of each product or article to be manufactured of the relation between the following volumes:

the working cycle (cad. tr.);
the duration of the mechanical operations which include the feeding of the mold;

the mechanical treatment and the duration of the subsequent movement of the carousel (T. mec.);

the duration of the operations or steps for the output of the finished products (T. tech.);

the duration of the heat treatment, the chemical treatment and so on, which represents a constant for each article to be manufactured (T. trait);

the number of sectors of each working unit which corresponds to the number of times the carousel stops during a working cycle, starting with the feeding of the molds and ending with the output of the finished product (N. Sect.);

the volume of the molds which corresponds to the volume of the vertical molds and to the number of the horizontal molds which are arranged in each specific column for each single product participating in a working cycle which is equal to one rotation of the carousel.

The duration of the working cycle for each single product must be adapted to the factor of the longest duration of all spaces of time of the mechanical working steps for the treatment or discharging. As the installation operates in a continuous, automatic and controllable manner, the duration of the mechanical and discharging handlings is greatly reduced and consequently the working cycle, especially the duration of the treatment of the articles to be manufactured which advantageously is divided between all sectors of the carousel, is reduced. However, in order to utilize the reduction of the working cycle for the mechanical treatment and the discharging the division of the treatment duration is controlled by choosing a corresponding number of vertical molds and horizontal mold columns in such a manner that a suitable relation between the number of the sectors and the duration of the working cycle is developed, which is to be calculated as follows:

$$N.\ Sect. = \frac{T.\ trait + T.\ mec. + T\ tech}{cad.\ tr.}$$

This results in a significant number of sectors which allows the productivity of the installation of the manufacture of products requiring a long handling to be increased. Such a carousel with a great number of sectors is not adapted to the manufacture of product which have a relatively short conversion duration, as in this case the working cycle is determined by the duration of the mechanical working steps or discharge working steps.

In the case of an article requiring a long handling duration, as for instance the production of automobile tires, the number of columns which contain horizontal molds is increased in order to expand the productivity of the installation, and thus the number of the sectors of the carousel by causing an equal distribution of the handling duration of each particular article on all stops of the carousel during the stoppages concerning the mechanical working steps and the output of the finished product.

Figure 3:
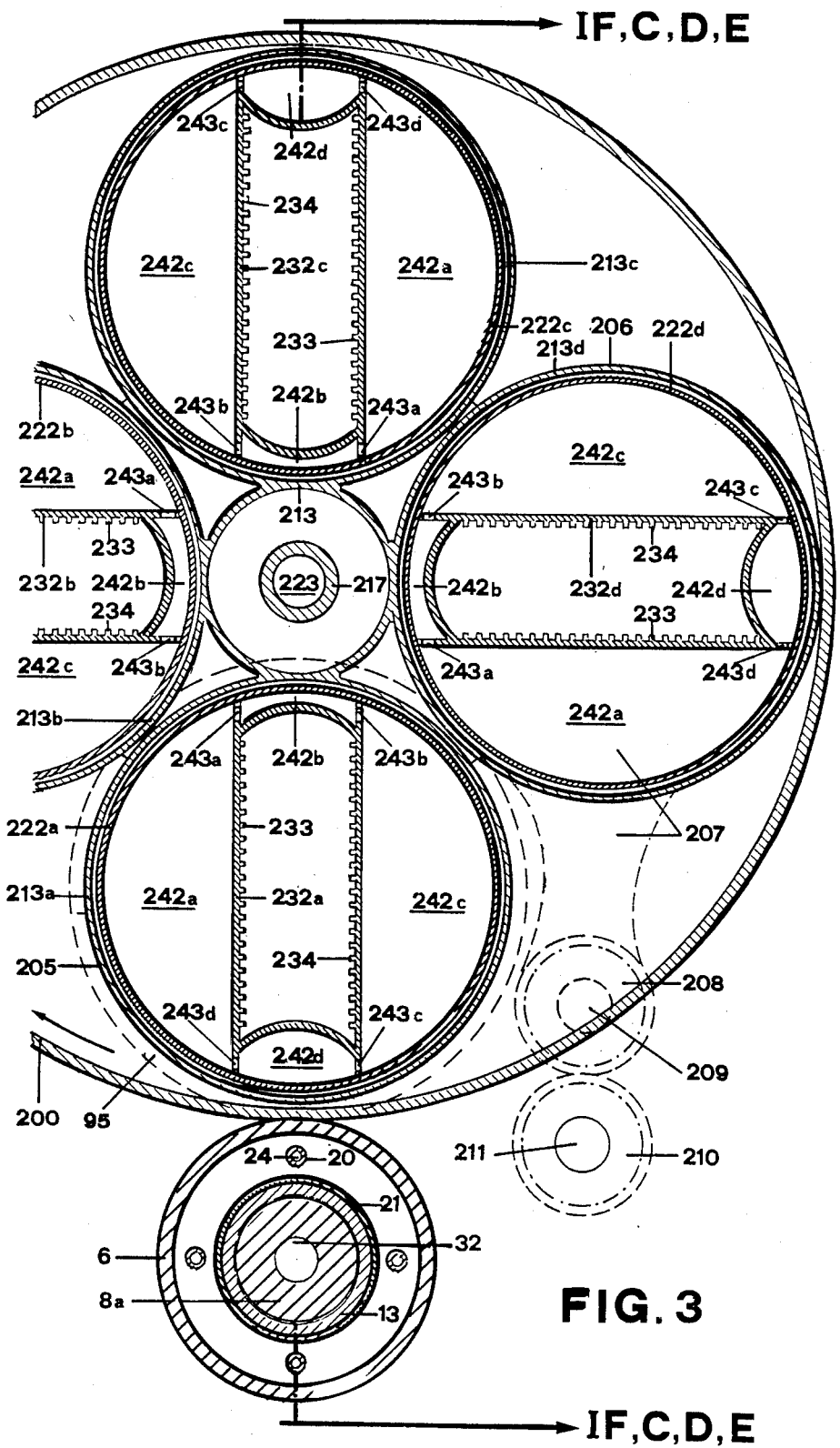
FIG. 3 shows in a section along the lines III—III of FIGS. 1F, 1C, 1D and 1E a first style of execution of the installation before it begins to operate.
Figure 4:
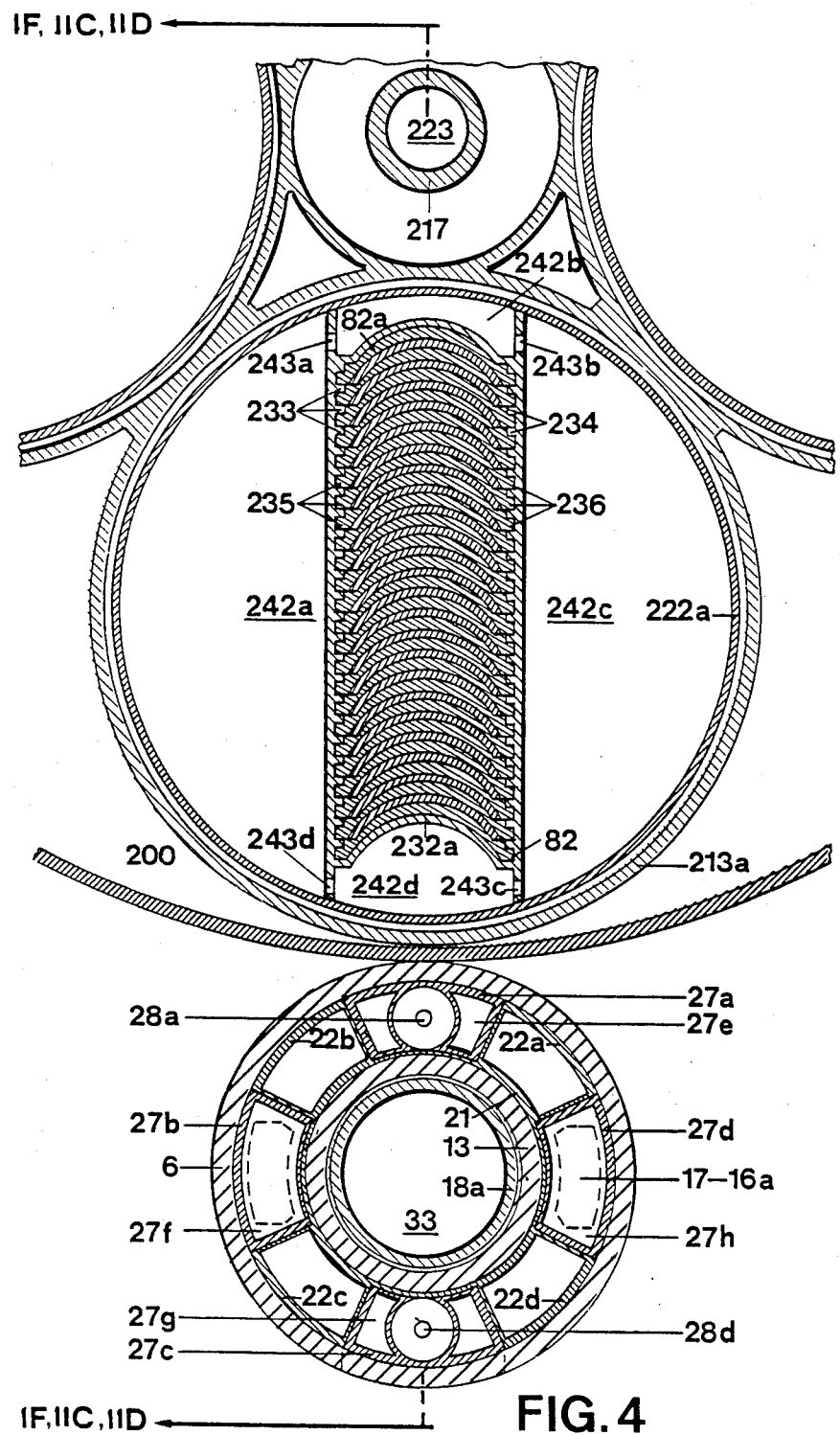
FIG. 4 shows in a section along the lines IV—IV of FIGS. 1F, 2C and 2D a partial view of the installation after the phase of compression of the material in the mold.

Below, two styles of execution of the carousel are described suitable for the manufacture of various different products requiring long or short handling periods:

A first alteration of the carousel which has for instance four sectors and turns around its own axis outside the central cylinder and the cylinder body 6, whereby each sector has a vertical form, which is built for the manufacture of drum brake linings. The arrangement of the working unit and of the carousel with reference to the feeding element is clearly shown in FIG. 3;

a further altered style of execution of the carousel has, for instance, six sectors and turns around the cylinder body 6. This construction is particularly suitable for the manufacture of:

one-piece-tubes of asbestos cement with fixing flanges, either by the compression of a single mixture, for instance, by the centrifusion of at least one mixture, with the help of vertical molds opening horizontally;

automobile tires by the compression of a mixture of different chemical components with the help of a great number of horizontal molds which are put on top of each other, with one each per sector.

Of course, the molds which are given as an example, are adapted to the method of manufacture of the articles. But it is quite possible to adapt to this installation and to this carousel all variances of molds from the simplest to the most complicated, whereby these molds are opened in a vertical, a horizontal or a combined manner, as for instance molds with two parts combined with a movable top for the manufacture of clutch plates with asbestos plates. These molds can be fed with two different mixture compositions and can be adapted to the manufacture of hollowed products made of china, and so on.

In the first variance of the carousel for the manufacture of, for instance, brake linings as illustrated in FIGS. 1A–1I, 2A–2G, 3, 4 the carousel has four vertical molds which are one by one moved from one sector of the working unit to another with a working cycle which is determined by the above mentioned equation or relation. The duration of each stoppage in each sector is equal to the duration of the working cycle.

In this variance the molds are always kept in the inside of the carousel, even at the removal of the finished products. Naturally, in this installation of the invention various working units can be arranged around the central cylinder 1 and 6. In this case, the feeding substance has as many distribution openings 9 as working units are available on the platforms 2, 4, 5, 7. For simple reasons a working unit is described which is fixed on the platforms 2, 4, 5, 7.

The carousel of this working unit has a movable and a fixed part. The fixed part contains the following parts:

One fixed drum 200 which is fixed by nuts 201 on the fixed platform 5 of the frame of the installation. This drum includes a thick central part 202 and a thin hollowed part 203, which is arranged at the opposite end guaranteeing the circulation of hot air which escapes from the molds subject to the thermal treatment:

a bar guiding device 204 swelling from the thick part 202 and two openings cut in the surface of the thick part 202 of the drum 200, whereby the first opening 205 lies under the main press, whereas the second opening 206 is provided at the place of the stoppage for discharging. The latter opening is closed by a removable cover 207 which is inserted in the intermediate space which is formed by a shortening of the wall of the fixed drum 200.

The cover opens when the finished product is discharged and is operated by a toothed wheel 208 which is detached on a wheel shaft 209 swelling from the surface of the thick half 202 of the drum 200, and in contact with a guiding toothed wheel 210 which is wedged up on a reversing shaft 211. This shaft passes through an opening in the surface of platform 5 and is operated by guiding devices not illustrated.

In the illustrated variance particularly suitable for the manufacture of brake lining blocks, the fixed platform 5 has an opening above the auxiliary press for storing a female tool 89 forming the bottom of the mold and arranged as a plate with a number of openings, and equipped with a male tool fixed on plate 80 of the tool piston 77 of the auxiliary press. This male tool has a horizontal plate 81 fixed on plate 80 by nuts 86 and vertical plates or forks 82 arranged at a certain distance from each other and forming a net. Advantageously a device for the passing of hot air 84 between the horizontal plate 81 and plate 80 is provided. These are connected with heating channels positioned in the bodies of the forks by an opening 85 through the horizontal plate 81.

Above the molds which support the finished products and in which sectors of the working unit for the thermal treatment are provided, there are borings 212 connected with the heating system; in the discharge and output sector of the working unit a suction valve connected with the pump for cooling of the hot air, and an opening are provided, the latter of which extends under the suspended block-shaped coatings 247 in order to allow the passing of a non-illustrated hydraulic lifter which is arranged below platform 5 to lift the finished blocks 247.

The movable part of the carousel in the inside of the drum 200, has:

a movable drum 213 with a diameter smaller than that of the fixed drum 200 which has at least one opening to transport the hot air 214 in its lower part of the vertical wall. The bottom 215 and cover 216 of this drum are connected in their center part by a fixed cylinder 217. Each cover 216 and each movable bottom 215 has four openings arranged above one another and regularly distributed so that the upper openings 218a, 218c with their edges 219a, 219c can carry the broadenings 220a, 220c whereas the lower openings 221a, 221c tightly surround the outer bodies 222a, 222c of the molds, in order to keep them in a vertical and steady position. Of course, the two molds of the carousel not illustrated are accordingly carried in the openings 218b, 218c and 221b and 221d of the covers and bottoms;

an opening in the center part of bottom 215 which is overriding the respective central opening in the fixed round platform 5 in order to enable the penetration of:

a tightly connected central axis 221 which is arranged through the bar guiding device 204 of drum 200, whereby the inside cylinder 217 is tightly connected with the central shaft 223 by a system of keys 224. This shift 223 with its lower contracted part 225 is put into:

a controlling shaft to drive the carousel 226 which with its lower part 227 is inserted in a wide region 75 of bottom 76 of the tool driving cylinder 73, 73a of the auxiliary press, and for instance is carried by a roller bearing 228, which is inserted in bottom 76 and fixed by nuts 74 on platform 4. This shaft has a toothed wheel 229 in contact with a pinion drive 230.

In the first variance of the carousel which particularly is suitable for the manufacture of sintered products of large quantities, for instance for the production of brake sets (fittings), the diameter of the mold and its height correspond to the dimensions of the products to be manufactured and to the volume of the products desired. The structural members of the mold which may be fixed, movable or detachable, common or individual, become installation elements as soon as they are built in with the help of which the individual mold during the operation can be formed synchronically to the working cycle and again dismantled.

In the case of the manufacture of brake linings in the form of blocks, the common elements of the molds consist of the male tool 82 carried by the pressing tool 77 of the auxiliary press and the tool piston 188 carried by the driving piston 176 of the main press. Each mold has its own elements and particularly an outer body 222a, 222c in the form of a cylinder without bottom, which is supported by a broadening 220a, 220c of its cover 231c on the frame 213a, 213b, 213c, 213d of the movable drum 213 of the carousel. The cover 231 is densely gliding on the lower surface of bottom 107a of the mixture container 107 as the carousel moves on. This cover has an opening, for instance of an elliptic form corresponding to the opening in bottom 107a of the container 107 in order to enable hump 188a of the tool piston 188 of the main press to pass through. The mold furthermore has a cylinder which is illustrated as a molding container 232a, 232b, 232c without bottom or cover. It is carried out by the cover 231 and is executed in one piece with this cover, welded or fixed to it.

Before the forming of the mold by the upward movement of the male element 82 under the operation of the auxiliary press, an iron frame 237 which is u-shaped and opens to the concave side of the wall of the molding container 232 is inserted into same and lies on the horizontal surface of the glide face 233, 234 which protrude from the longitudinal walls of the molding container 232 in order to form between one another vertical gliding nuts for the forks 82. The outer forks 82a and the static rails 235, 236 are in comparison with the other forks advantageously shortened in such a way that at the moment their lower upper dead point is reached, they take over the iron frame 237, so that the upper area of the frame 237 is put to the same level as the horizontal surfaces of the forks 82, thus forming a single surface together with their upper ends which form a temporarily detachable bottom of a mixture container with high pressure 238 between the lower area of the tubes 188a, of the tool of the main press and this surface. The bottom formed in this way between the upper ends of the forks 82, the static rails 235, 236 and the u-shaped frame 237 has openings corresponding to the dimensions of the coating clocks 239 and defined between each fork 82 and are filled from above by the container 107 to a medium pressure and thereafter by the mixture contained in the high pressure container 238 during the high pressure phase. In this manner a continuous supporting plate 240 is formed the thickness of this corresponds to the end space defined between the lower area of the disk 188a of the tool of the main press and the surface of the forks 82. Advantageously the press tool 188 has turnings spikes 189a which are built into borings (sockets) 189, so that they can slide, which are provided with springs 189b and screwed into the lower area of the disk 188a of the tool piston 188 in order to form openings 241 in the supporting plate 240 particularly between each fork 82, thus enabling the passing of hot air for the thermal treatment in the hot treatment section of the working unit, the totality of the brake lining blocks 23a manufactured and suspended at their supporting plates 240.

The device for the circulation of the handling mediums has heating chambers 242a, 242b, 242c, 242d in this variance of the working unit or of the carousel leading to the molding container 232 which are formed by the containers 232 and the mold walls 222. These heating chambers are connected between one another by air channels 243a, 243b, 243c, 243d provided in the lower region of the molds and connected with the inner spaces of the movable drum 213 by at least one air exhaust channel 214. Furthermore, this heating system has a heating jacket 245 defined by a cylinder around the lower part of the primary (motor) shaft of the carousel 225 and fixed by nuts 74 on the broadened region 75 of bottom 76 of the tool guiding cylinder 72. This box is divided into an upper and a lower chamber by a diaphragm wall 246. The upper chamber has a line 93 serving as a connection to the upper chamber 247 which is formed by the piston 77 of the auxiliary press in the tool guiding cylinder 73, a third line 249 advantageously provided with a thermostat 250 and connecting this upper chamber with the hot gas line 212 which is provided in the carousel and particularly in the heat treatment sector of the products.

The lower chamber has a first line 94 serving as a connection with the lower chamber 251, formed by the pistons 77 in the cylinder 73 of the auxiliary press, a second feeder (supply line) 252, for instance with fresh air, and a second line 253 for the discharge of hot gas. The third line is advantageously connected with the hot gas feeder 248 of the upper chamber. Advantageously the heating system is provided with a hot air circulation pump and thermostats. Furthermore, the fixed drum 200 is connected, for instance, by a feed pipe 254 with the hot air pump (not illustrated) in order to enable a recovery of this hot air, and thus to drive back this air into the upper chamber of the cylinder 254.

Below the operating cycle for the manufacture of brake lining units is described, which can be manufactured in the installation as described below. This is done with reference to FIG. 5.

Firstly, we assume that the duration necessary for the conversion of a mixture based upon asbestos into a finished product will be about 12 minutes. According to the formula as stated on page 28 and considering that the carousel has 4 sectors which are provided with four vertical molds, the working cycle is 12:4 min.

It is, of course, necessary to fill the feeding substance before starting the actual manufacture of the brake linings, and to preheat the various mold elements of the carousel.

In brief, the feeding device has at first to be fed by successive asbestos charges which are mixed by impellers 49 with the process materials (water, brass, cut wires, metal powder, resin, natural rubber, and so on) through the openings 50 in order to gain by this means a mixture at the end of the loading of the mixer which is prepared for the pressing process. After a sufficient homogenizing, the movable bottom or base of the mixer is rotated in order to press this charge into the mixture feeder and to supply its bottom or base by the feed screw 30. By this means a new charge of asbestos and process materials may be fed, and these operating steps are repeated until the mixture feeder is filled. The feeding of the charge into the mixer and their subsequent input into the mixture feeder are executed in a length of time corresponding to the working cycle, namely every 3 minutes. In this manner each time a product charge is given into a casing mold by the regulator for dosing and driving back, a new charge may already be fed by the mixer into the mixture feeder.

The circulation of hot air in the carousel is on the one hand effected by the hot air pump (not illustrated) and on the other hand by the movement of piston 77. The latter carries the hot air contained in chamber 247 and formed in the tool guide 73, after the operation of the lower worm extruder of the auxiliary press, in order to let piston 77 and the male tool 82 move upwards into the mold 222 of the carousel, which is provided in the sector of the working unit holding the pressing element. At the same time this movement of piston 77 causes an intake of air into the lower chamber 251 of the tool guide cylinder 73 for cooling of this press.

After consequently all elements of the equipment of the heating system have been preheated to a temperature prescribed for the handling (treatment) of the respective product, and after the number of the successively sufficient charges have been fed into the feeding substance, the manufacture may begin which is executed in a continuous or consecutive and automatic way in the following manner and as to the diagram of FIG. 5:

From 0 min. up to 1.20 min.

The lower screw press of the auxiliary press is set into movement, so that piston 77 may climb to its upper dead point, the plate 80 carrying the male tool and the horizontal plate of the male tool 81 may move to their lower-upper dead point being in the tool guiding cylinder 73, which lies at a sufficient distance from the perforated plate forming the female tool 89, in order to enable a movement of forks 82 at the time of removal out of the mold above their maximum upper dead point. Forks 82 which have reached their upper dead point by the female tool 89, meet the static rails 235, 236, and the outer fork 82a gets in contact with the u-shaped iron frame 237 carried by the gliding webs 233, 234 and lifts it up to the mutual highest upper dead point in such a way that the upper space of this frame is as high as the horizontal spaces of forks 82 and thus forming the bottom of the high pressure mixture container 238 below the mixture container 107. Advantageously a wetting film 90 carried by a plate 91, is fixed above the surface of the female tool 89, in order to moisten and lubricate the surface of the forks at their upward movement.

The upward movement of piston 77 has pressed the hot air in chamber 247 and in the upper chamber of cylinder 245 through the opening 92 to the surface of the female tool 89 and through the pipe 249 and the thermostats 250 to effectuate the passing of this hot air through the entire working unit and particularly the heat handling sector of this working unit. Furthermore, the upward movement of piston 77 leads to the intake of fresh air contained in the lower chamber of the surrounded room 245 in order to cook the auxiliary press. At this time the mold is formed by the cooperation of the male tool raised by the auxiliary press, the mold elements 222, 231, 232 of the carousel, and the female tool 89. The mold formed in this manner is prepared to receive the mixture fed into the container 107 by the feeding substance.

From 0.20 min. up to 1.36 min.

The movable double bottom of the mixture feeder is rotated in order to feed the dosing chamber of the regulating device for dosing and recycling, which is coordinated to the distribution opening. The latter ends in the container 107 of that sector of the working unit which contains the pressing substances and the mold formed in the manner as described before. The mixture is then fed into the container 107 and into the empty space of the mold. The filling process naturally depends on the volume of the mold to be filled and the feeding pressure. In case the installation is provided for a drying process, the filling of the mold at a low pressure cannot sufficiently be effected, and therefore a volume for the mixture container 107 is to be provided which is adequate to collect a certain mixture quantity at sufficiently low pressure, so that during the medium pressure phase the filling process of a mold of a large volume and a complicated form may be completed. The volume of the mixture container 107 can either be controlled by shortening of the stroke of the tool piston 188, by lowering of its upper dead point, or by setting into operation the main press, so that the tool piston 188 may get in contact with the mixture at the time desired at low pressure. In the following description the second solution is chosen.

From 1.36 min. up to 1.56 min.

The lower worm extruder is set into operation, whereby its thread shaft 157 moves downwards, and thus a pressure can be exerted on the oil of the oil pump and on the driving piston 176 with the help of the movable central cylinder 133 which supports piston 144 of the oil pump.

At this time the only opening of the movable bottom 150 of the compressed oil distributor above the first hydraulic cylinder 123a is stopped, whereby the fee differential piston 124a of this cylinder is fed with compressed oil which affects the movement of this differential piston to its lower dead point. This movement of the differential piston at the same time produces a pressure:

above its top in which the compressed oil in the chamber of changeable volume 195a is moved through opening 127a into the upper compressed oil reservoir of changeable volume 194, which effects the downward movement of the second movable intermediate plate 128 to its lower dead point, and subsequently the transmission of the pressure to the broadened part 135 of the supporting movable central cylinder 133, and thus on the gliding piston 176;

underneath the second movable intermediate plate 128 which carries the compressed oil in the compressed oil intermediate reservoir 196 of changeable volume through the channels or passages 121a, 121b into the outer compressed oil reservoir of changeable volume 197. Thereby a direct pressure is exerted on the guiding piston 176 by the upper horizontal area of the narrow region 178 of the vertical wall. The oil leakage of this reservoir 197 is hereby recovered by the line 101a.

in the lower surrounded space 199a of changeable volume which is arranged underneath the bar of the differential piston 124a forming the trunk piston 126a. Thereby the pressure of the oil in the lower reservoir 189 is increased and an impulse power is directly transmitted on the guiding piston 176.

The operational manner as described before, takes place continuously during a time of 40 seconds, as each differential piston reaches its lower dead point in 5 seconds, and the turning bottom 150 of the compressed oil distributor rotates with a speed synchronized in such a way that the downward movement of the eight differential pistons to their lower dead points coincides with the arrival of the guiding piston 176 at its lower dead point. As the guiding piston 176 during its downward movement meets with three different resistances, the value of its pressure is divided into a low pressure, a medium pressure and finally a high pressure, in accordance to the gradual pressure of the lower feed screw press of the main press which is programmed in a suitable way.

The downwards movement of the guiding piston 176 and of its piston tool 188 in the switch 107 under low pressure, firstly displaces the air and the steam originating from the hot mixture which is accumulated in the upper area of the container 107 through the openings 108 being at medium height of this container, into the surrounding atmosphere. As the upper feed screw press of the main press is uncoupled, the thread shaft 167 and the central piston 168 are lowered while the movable central cylinder 133 moves downwards. The central piston 168 remains in constant contact with the narrowed part 135 of the central cylinder 133.

During the first two pressure phases, i.e. the feeding of the mixture under low and medium pressure, the forks 82 are held by the piston 77 of the lower screw press of the auxiliary press at their upper dead point. Consequently the brake lining blocks are formed under low pressure in the space between the surface of the female tool 89 and the vertical walls of the forks 82 as well as the vertical inner walls of the gliding bar 233, 234, whereby the mixture container 107 is advantageously fed to half of its volume with the mixture being under low pressure.

At this time the connection between the mixture feeder and the dosing chamber of the control device for dosing and driving back is closed, and the tool piston 108 is in contact with the mixture in the mixture container, and by its circumferential region has closed half of the height of the access opening 9 of the mixture and the opening for the outlet of air and steam into the atmosphere. The feeding phase under low pressure is thus completed.

From 1.56 min. up to 2.10 min.

This period corresponds to the feeding and the compressing process under medium pressure. This medium pressure is effected by enlarging the pressure in the oil reservoir 151 of the reciprocating pump 143 of the main press. This increase of pressure is transmitted to the guiding piston 176 and the tool piston 188 in the above described manner. The tool piston 188 consequently exerts a medium pressure on the mixture in the container 107 and thus enables a complete filling of the mold without the risk of an agglomerating or a sintering of the mixture in the mold or the surplus mixture in the container underneath the tool piston 188. The heat of the elements of the mold and particularly of the forks causes the release of hot air and steam contained in the mixture, which emerge into the container 107 with the surplus mixture.

This release of steam and hot air is possible as the mixture contained in the mold is always kept in a moldable condition.

As soon as the pressure exerted onto the tool piston 188 has exceeded a certain degree, the coil spring 26a gives way to the control device for dosing and driving back which effects the lowering of the horizontal plate 27 of the oscillator and thus the opening of the driving back channel. The surplus mixture may now be pushed into the mixture feeder by the screw with an opposite rise 31. At this moment the phase of the filling process under medium pressure is completed.

From 2.10 min. up to 2.16 min.

This phase corresponds to the beginning of the compressing process of the mixture in the mold under high pressure, which is effected by enlarging the pressure in the oil reservoir 151 under the pressure of the reciprocating pump 143 of the main press. This pressure is transmitted to the guiding piston 176 in the above described way.

The disk 188a of the tool piston 188 tightly penetrates the respective opening of the high pressure mixture container 238 which is particularly defined by the opening of cover 231. The control device for dosing and driving back the feeding device subsequently is no longer in contact with the mold, and the surplus product contained between the lower area of the recesses 188b, 188c of the tool piston 188 is automatically transported into the feeding device, as the return openings are in an open position. Only the mixture in the mold underneath the surface of the disk 188a of the tool piston 188 is admitted with a high pressure. The balance of the mixture contained in the installation and particularly in the distribution openings and the dosing chambers of the control device for dosing, remains always in a moldable condition.

The pressure exerted by the disk 188a of the working piston 188 on the mixture contained in the mold and in the high pressure mixture container 238, gives this mixture a definite specific density to convert same into one piece of a nearly dry condition together with a carrier plate 240 which is formed between the disk 188a of the tool piston 188 at its lower dead point and the upper area of the forks 82 at their upper deadpoint.

The surplus part of the mixture in the high pressure mixture container 238 determines the carrying area of the carrier plate 240. The coil springs 79 keeping plate 80 and the said tool 89 of piston 77 of the auxiliary press at a certain distance from each other, are calculated to give way to a certain pressure degree, in order to effect to lowering of the forks 82 to their lowest part deadpoint thus granting an additional space between their upper end and the disk 188a to form a carrier plate 240 of a greater thickness. This thick enlargement corresponds mainly to the distance between the guider 83 and 78 for plate and piston 77, respectively.

During this phase the pressure exerted on the bottom (base) 107a of the container 107 guarantees a complete density of the mold.

From 2.16 min. up to 2.00 min.

A high pressure is constantly kept during a period of 4 seconds; then the piston 144 of the reciprocating pump is released, and the high pressure phase is completed. The position of the different elements of the installation at this time is illustrated in FIGS. 1A to 2G and 1F to 1H.

From 2.20 min. up to 2.40 min.

The guiding piston 176 and the tool piston 188 of the main press have climbed to their upper dead point and by this means cause the separation of the disk 188a of the tool piston 188 from the carrier plate 240 of the block-shaped linings 239.

The lower screw press of the auxiliary press is then set into operation in order to effect an upward movement of its thread shaft 69 by a number of millimeters with the purpose of effecting the separation of the lower horizontal surfaces of the block-shaped linings 239 from the female tool 99 and of releasing the coil spring 79 remaining in a compressed position.

The lower screw press of the auxiliary press is set into a backward movement in order to effect the downward movement of its thread shaft and of the piston 77, and consequently of the forks 82 to their lower deadpoint. The u-shaped profiled iron frame 237 with the carrier plate 240 affixed on its surface touches the gliding bars 233, 234 which are arranged as high as the lower upper deadpoint of the forks 82 and thus permit the separation of the forks 82 and thus permit the separation of the forks 82 from the block-shaped linings 239 which are removed from the molds and are kept in a suspended position in the mold by the frames 237 and the guides 233 and 234.

The downward movement of piston 77 effects the inlet of hot air into the enclosed space 247 and the pushing back of the air in the lower chamber 251, which is heated by this means and may be used as hot air in the following cycle.

Moreover, the stroke of the tool piston 188 releases the openings 108 thus permitting the outlet of the air and the steam in the container 107.

From 2,40 min. up to 3 min.

The reversing shaft 226 of the carousel is set into motion and the movable drum 213 rotates by one step in order to carry the totality of the brake lining blocks formed in the described manner into the following sector for heat treating of the working unit. This movement of the carousel automatically effects the arrival of new mold elements into the sector which possesses the pressing device of the working unit. Now the installation is prepared to start with a new producing process according to the working cycles of 3 minutes as described before.

Each single sector form of the carousel consequently has a working cycle of 12 minutes showing the following distribution:

From 0 min. up to 3 min.:

Sector for mechanical work as described before;

From 3 min. up to 11 min.:

This period of the working cycle corresponds to the thermal handling which consists of a constant hot air circulation at a temperature controlled by the thermostat 250. This hot air passes through the suspended linings 239 and reaches the upper chamber of cylinder 245 through the openings 241 developed in the carrier plate 240. This thermal handling is continued in the following sectors of the carousel and in the sector for the output of the half finished products as described below.

From 11.30 min. up to 12 min.

This period of the working cycle corresponds to the discharge process of the product after the carousel has carried the mold into the sector for discharge and removal of the working unit from the mold. The mold arrived in this sector is adjusted to the opening 206 provided in the surface of the thick half 202 of the fixed drum 200 of the carousel, whereas its lower part is stopped above a plate positioned in the cutting of the fixed platform 5. This plate is, for instance, operated by a hydraulic altitude adjuster provided underneath platform 5 and not illustrated. The hot air in the mold is taken in by the pump and carried to the upper chamber of cylinder 245. The operated toothed wheel 208 moves the detachable cover 207, fixed on drum 200. Then the plate penetrates the molding container 232 from below, in order to lift the totality of the lining blocks 239 suspended in the mold. At this moment a handling device, for instance a davit, is fixed at the iron frame 237 of the unit in order to lift same, to remove the carousel and to carry same to a machine for a subsequent treatment which takes over and forms the totality of brake lining blocks for the development of drum brake linings.

After the downward movement of the plate, the insertion of a new u-shaped profiled iron frame 237 and the taking back of the cover 107 to its position by the toothed wheel 208, the discharging and output side is prepared to take up a new unit of lining blocks by turning the driving shaft 226.

At this described variance of the installation, the carousel may be removed from the auxiliary press and the main press by moving its central axis 232 with the help of its carrier 255 in order to adjust the installation to the manufacture of another product by changing the tool piston 188 and the mold elements carried by the piston 77.

Figure 6:
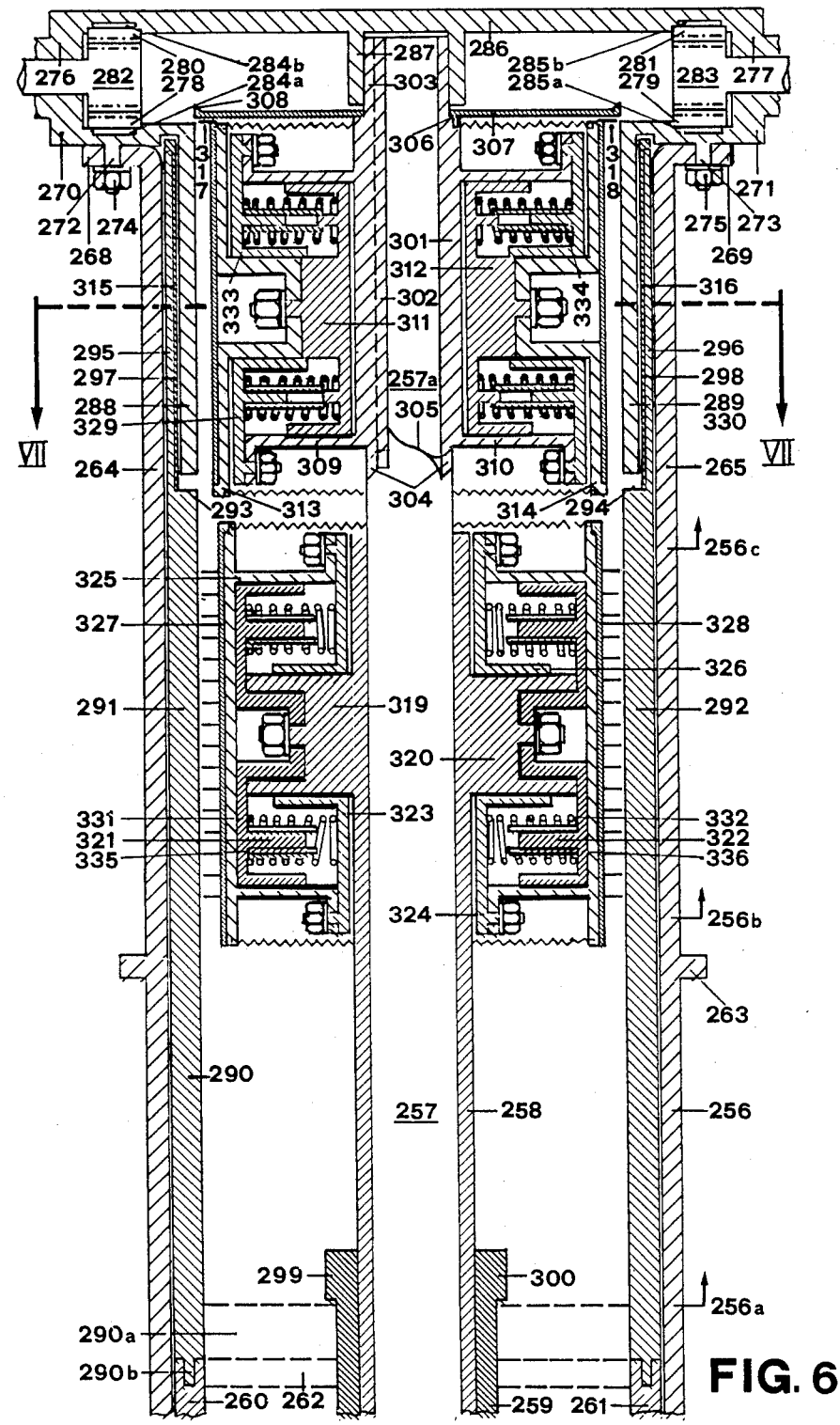
FIG. 6 is a vertical section along the line VI—VI of FIG. 7 showing a discharging and finishing machine for brake linings, which are produced in the first operation of the installation or plant.
Figure 7:
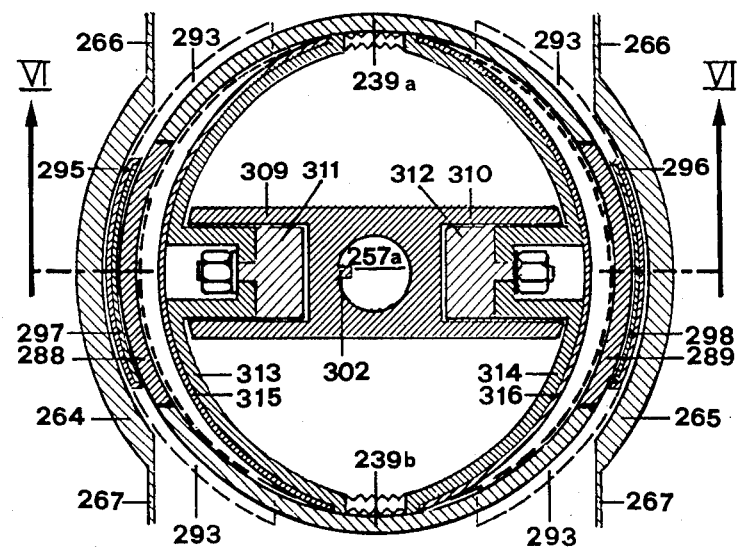
FIG. 7 shows a cross section along the lines VII—VII of FIG. 6.
Figure 8:
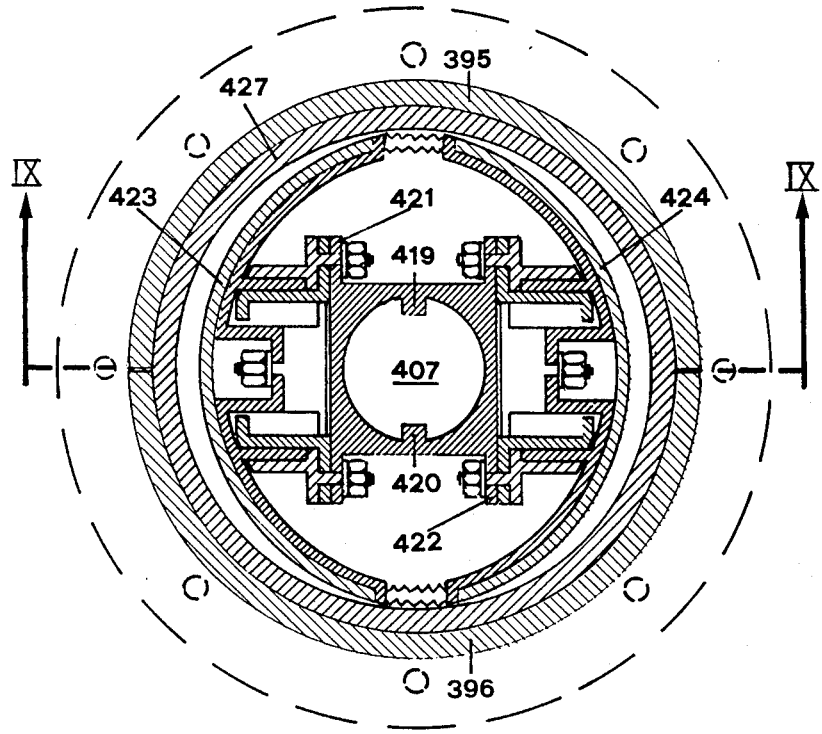
FIG. 8 represents a cross section along the lines VIII—VIII of FIG. 9 on a scale enlarged by the factor two, and shows part of the carousel and the mold elements of a second variance of the installation which is adapted to the production of asbestos tubes.
Figure 9:
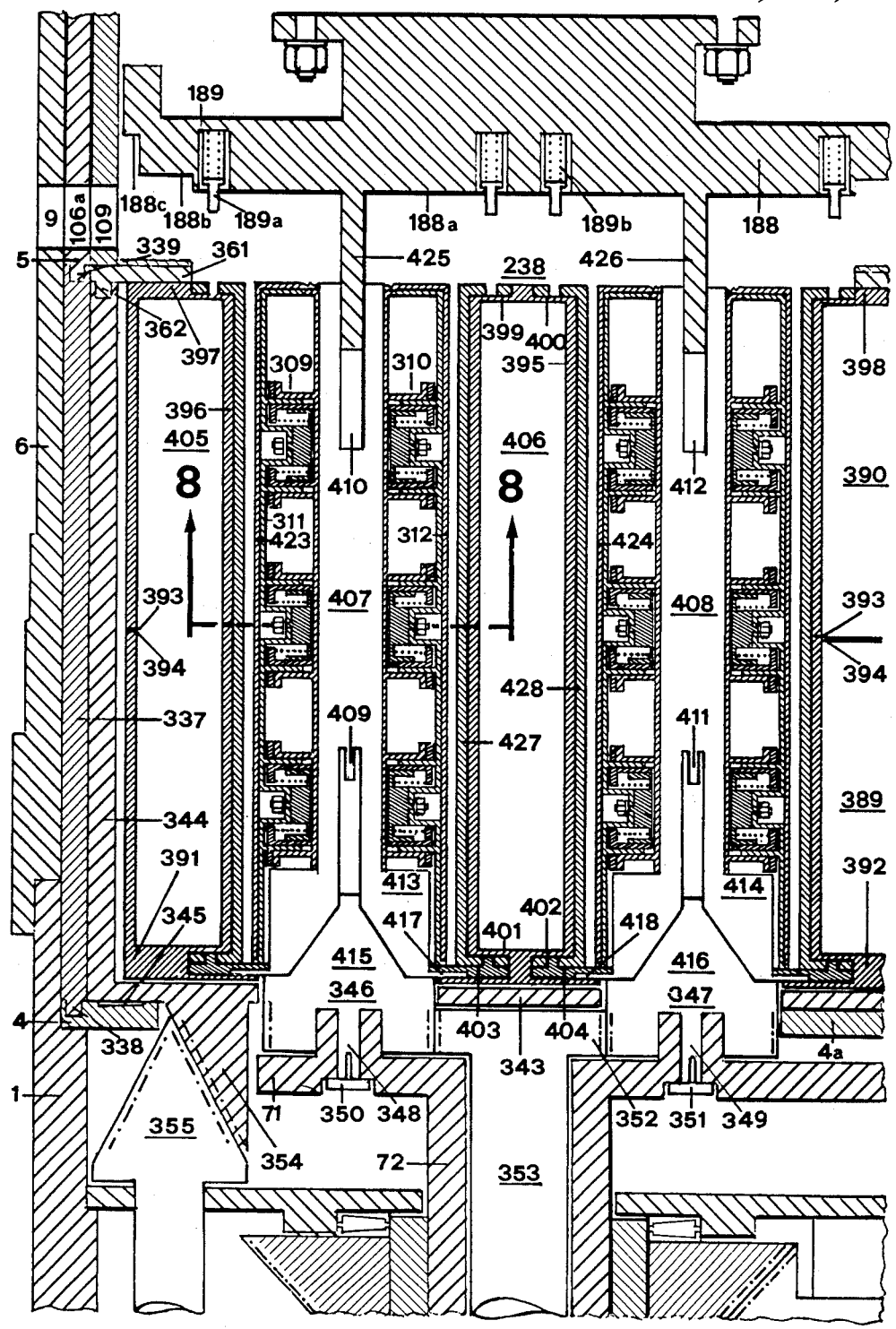
FIG. 9 shows a section along the lines IX—IX of FIG. 8 and represents the second operation of the invention, which is adapted to the production of asbestos cement tubes.

In the following a device or a machine is described with reference to FIGS. 6 and 7 for delivery of the totality or unity of brake lining blocks in the form of brake linings and their conversion into finished products. In order not having to reduce the productivity of the whole installation, it is necessary to install a machine which processes the brake linings with a productivity corresponding at least to that of the manufacturing installation. Such a machine in this example permits a simultaneous treatment of two brake lining block units delivered from the carousel, with its u-shaped frame 237.

This machine therefore has a platform and handling devices with side heads which take up interchangeable tools. The platform of the machine is formed by a vertical cylinder and a horizontal device positioned above.

The vertical cylinder 256 at its bottom is fastened by a lower flange and encloses in its lower part three detachable bottoms (bases) (not illustrated), arranged above each other and carried by the respective narrowings in the inner wall of cylinder 256. Each bottom (base) is in its circumferential area penetrated by at least two diametrically opposite openings arranged above each other in order to permit the mounting of two supports 260, 261 for the upward and downward movement of one of the cylinders 290 as described below.

These supports are fixed below on a hydraulic lifter and welded above on the inner horizontal area 262 of upward and downward moving cylinders 260, 251. A deep ring-shaped nut passes through this surface. Furthermore, each of these three detachable bottoms has in its center an opening for taking up a driving shaft and its corresponding guiding means, and particularly a central driving shaft (257) passing through the three bottoms, an intermediate driving shaft 258 fixed on the central driving shaft 257 passing through the two upper bottoms, and finally a third outer driving shaft 259 positioned on an intermediate shaft 258 simply passing through the third upper bottom. The upper part of the cylinder 256 is divided into three parts (steps) 256a, 256b, 256c each of which has a height basically corresponding to the height of a brake lining block 239.

The first lower step 256a has two openings not illustrated arranged diametrically in an opposite position in the wall of cylinder 256 showing sufficiently large dimensions to enable simultaneously the discharge (unloading) of all cut and finished brake linings originating from two brake lining blocks developed in the upper levels. Advantageously in this step an intermediate flange 263 is provided which enables the installation of boring machines for the manufacture of brake linings.

Above the height of the second intermediate step, and the second intermediate level 226b, respectively, the wall of cylinder 256 is perforated by holes with fixed boring tool equipment linings (not illustrated). These are positioned in suitable angles and in a number sufficient to have simultaneously the totality of the cut brake linings of two brake lining blocks bored which have been treated at the same time in the upper level 256c and in step 256b. By this means it is possible to produce simultaneously all openings necessary for the fastening of the finished linings on the drums.

Above the total height of the third upper level 256c the cylinder 256 is cut on two opposite sides in such a way that only two arc-shaped segments 264, 265 remain left which define two opposite openings large enough to permit the passage of two brake lining blocks 239a 239b originating from two brake set units (fittings) which are supplied by the carousel and at the same time brought about by two opposite sides of this machine by feeding devices for the brake lining units with guide walls 266, 267. The openings must also be sufficiently large to permit the brake lining block to get successively in contact with centrifugal working tools arranged in the third upper level 256c of cylinder 256 and carried by a side head shaft 301 on the driving shaft 257.

This feeding device represents the overriding horizontal device as mentioned above, and has two lower movable guide bars 270, 271 fixed on flanges 268, 269 with the help of bolts 272, 273 and nuts 274, 275, and two upper sliding rails 276, 277. The four sliding rails have opposite and coordinated longitudinal grooves, whereby the lower grooves serve as a fixing and guiding device for a couple of lower toothed racks 278, 279. The upper grooves serve as guiding and fixing devices for a couple of upper toothed racks 280, 281. Each couple of toothed racks is welded in one piece at its outer end on a connecting arc-shaped support (not illustrated) corresponding to the arc of the supporting plate 240 of the brake lining unit 239. The upper connecting tie is lowered to the upper area of the supporting plate 240 and the two couples of toothed racks 278, 280 and 279, 281 are driven in an opposite direction by the common toothed wheels 282, 283 which are carried by free toothed wheels or pinions not illustrated, each of which is in contact with two toothed racks positioned above each other and are supported by their corresponding roller bearings 284b and 285a, 285b. These toothed racks move towards the cylinder 256 and, thanks to their arc-shaped connecting piece, move the corresponding supporting plate 240 detached (separated) from the u-shaped iron frame 237 in order to let the unit glide on the respective guide walls 266 and 267. The upper two guide bars 276, 277 fixed on the lower guide bars 270, 271 with their total length, carry the driving toothed wheels 282, 283 and the free toothed wheels (not illustrated) in a steady, horizontal position. These bars are mutually welded by a connecting piece 286, and by this means keep the upper narrowed end 303 of the side head shaft 301 and consequently the narrowed part 257a of the central driving shaft 257 in a steady vertical position by a liner 287.

Furthermore the guide bars 270, 271 carry two coaxial, arc-shaped segments 288, 289 positioned on the opposite sides and suspended above the total height of the third level 256c inside of cylinder 256, and parallel to segments 264, 265 of this cylinder. These two arc-shaped segments 288, 289 are at a distance from the segments 264, 265 which permits the working of two brake lining blocks 239a, 239b above the total height between these two vertical segments. A device formed by a cylinder 290 without bottom and cover is fixed inside of cylinder 256 in a vertically gliding and rotating movement to for the supporting elements of the brake lining blocks 239a, 239b separated by the supporting plate in order to successively take these brake lining blocks into the first, second or third levels or step of cylinder 256 which is effectuated as follows:

Cylinder 290 positioned in the ring-spaced groove of the low upward and downward moving cylinders 260, 261 by a round key, it cut in its upper part 291, 292 above a height which basically corresponds at least to the height of a brake lining block 239 in order to form two cylinder segments 295, 296 positioned diametrically opposite to each other, which have a thickness smaller than the tangential length of the lining blocks 239a, 239b and is covered by a grinding coating 297, 298 on the inside.

Cylinder 290 is provided with cut grooves along its total height on the inside between the segments 295, 296 positioned vertically and diametrically opposite to each other. They carry two driving arms not illustrated which stand in opposite direction on a platform 299 for driving and discharging. The latter is fixed to the outer driving shaft 259 by a key 300. By this means the cylinder 290 can be rotated both in its standstill position and during its upward and downward movements from one level or step to another.

The starting point of cylinder 290 is its lower deadpoint, whereby the upper ends of its segments 295, 296 are positioned above platform 299 and consequently above the openings for discharge of the coatings (linings);

Cylinder 290 is not set into motion before the lining blocks 239a, 239b are inserted between the segments 288, 289 which are connected with the gliding bars 270, 271;

When moving towards its upper deadpoint, cylinder 290 being in touch with the segments 295, 296 is set into rotation by the lower ends of the two lining blocks 239a, 239b. The latter remain in their steady position as they are not yet separated from their carrier plate 240, while their outer area tightly fixed to the segments 295, 296 by the upward movement of the grinding coating 297, 298 is ground.

The setting into operation of the centrifugal tools to grind the inner area of the lining blocks 239a, 239b and their separation from the carrier plate 240 is synchronized, so that these working steps are completed at the moment of the arrival of segments 295, 296, and consequently of the shoulders 293, 294 at their upper deadpoint are completed.

By this means the two ground lining blocks 239a, 239b which have been separated from the carrier plate 240, reach the horizontal area of the shoulders 293, 294 with their lower edges in order to get from the upper level 256c of the machine to the central level 256b by the gliding movement of the cylinder 290 where they are bored and cut.

The blocks are always kept in a vertical and steady position by the side ends of the segments 295, 296 as well as by the lower ends of the fixed segments 288, 289, and by a groove cut into the horizontal area of the shoulders 293, 294 which are also covered with an abrasive not illustrated;

finally the finished linings (coatings) get to the lower level 256a by the subsequent movement of cylinder 290 in two piles. The piles are set off on the driving and discharging platform 299 fixed at the outer driving shaft 259 with the help of a key 300, whereby the outer ends protrude over the outer sector (arc) of this platform 299, so that the forks of the two dischargers may enter from below to be transported all at once by the machine through the openings of the fixed cylinder 256 as soon as the segments 192, 196 stop at their lowest deadpoint. In order to reduce the weight of the machine, the cylinder 290 can be cut out on the total height of the three levels 256a, 256b, 256c of cylinder 256. In this case the two segments 295, 296 are kept in the same position by the upper turnable part 291 for the upward and downward movement. The ring-shaped contraction 293 is divided into two arc-shaped shoulders 293, 294 of the same dimensions as the specific segments 295, 296. Thus a supporting area for the side ends of the two lining blocks 239a, 239b is created, and these are steadily kept in the vertical position as described before regarding the total duration of the finishing process. The developed linings (coatings) are then set into rotation and discharged in the previously described manner.

The various tools to mold or discharge the brake lining blocks contained in the stories 256b, 256c are operated by side heads constructed according to the centrifugal tool principle. Apart from the kind of the tools, they have at least one stretchless device driven by a tightly connected driving shaft, an extractable or expandable device with an inserted internal part guided by the stretchless device and an external part in the form of a side head, whereby the springs or the devices causing an equivalent effect, resist the extraction of the extractable device by the centrifugal force above a predestined, adjustable barrier as well as a brake which limits the extraction or expansion of the extractable device in such a way that the outer half-cylindrical area of the tool fixed on the side head does not exceed the tangent with the product to be finished or to be manufactured, which is predetermined in each specific case.

In the described variance the two side heads positioned in the upper level or in the central level of cylinder 256, are illustrated in two types.

The turnable, combined side head positioned in the third upper level 256c serving for the upward and downward movement and containing an axis 301 in the form of a piled tube fixed by a key 302 in a groove positioned in the narrowed part 257a of the central driving shaft 257, is kept by its upper end in the boss 287. This axis 301 is coupled to the central driving shaft by a screw-shaped ramp 304, 305 which permits the upward movement of the whole side head within the vertical play provided in boss 287. The contraction 306 of axis 301 serves as a platform for the circular saw 307 which is exchangeable and provided with a vertical toothing 308. It is positioned at its upper deadpoint by the movement of the tool 301, caused by the screw-shaped ramp 304, 305 in order to cut the carrier plate 240 of the brake lining block units. These blocks are fed to these tool in alignment with the concave areas of the suspended lining blocks 239a, 239b. The fixing devices 309, 310 tightly connected with the axis 301 and diametrically arranged in an opposite position carry the extractable or expandable internal parts 311, 312 and external parts 313, 314 of the two half-cylindrical centrifugal side heads. Thereby the outer part is covered by exchangeable grinding tools 315, 316 combined with a peripheral saw 317, 318. The latter is positioned at the height of the lower area of the two carrier plates 240 in order to separate the carrier plate part 240 from the brake lining block.

In the second central level 256b the intermediate or medium driving shaft 258 has fixing devices 319, 320 which are tightly fixed, fabricated in one piece and positioned diametrically opposite to each other. Each of them includes in its outer part 321, 322 the inner part 323, 324 of an extractable or expandable half-cylindrical centrifugal side head 325, 326 covered by a saw tool 327, 328. Each tool is, for instance, provided with sixteen peripheral circular saws. Furthermore in this level all brake linings formed by the peripheral circular saws are simultaneously bored with the help of boring machines positioned at the flanges 263 of cylinder 256.

All side heads as described before are provided with springs 329, 330, 331, 332 and expansion or extraction control systems 333, 334, 335, 336. These are exchangeable and enable the centrifugal-acting saws 317, 318, the saw tools 327, 328 and the grinding tools 315, 316 not to touch the product to be manufactured until the accelerated rotation of the specific driving shaft of these tools produces a centrifugal force sufficient to press together the said springs, whereby the axial expansion of the tools is limited by the length of the expansion control system. The expandable segments of the centrifugal tools are furthermore connected among each other at their total height as well as on bottom and covered by a foldable, elastic element 294, for instance, a case (shell) of synthetic rubber or metal. By this means the tools in their totality are enclosed in a tight chamber which is protected against the dust caused by the grinding and sawing of the brake lining blocks. This dust is preferably taken in by a pump through outlets positioned outside of the cylinder wall 256, particularly at the height of the second and third levels. By this means the machine may simultaneously treat the items or products manufactured by two working units as previously described.

The machines for cutting and molding of the brake lining block units operate as follows:

The carrier plates 240 of two brake lining block units are simultaneously piled on their specific inner guide ways 270, 271. At the same time the lining blocks 239a 239 are inserted between the specific guide walls 266, 267. The units are simultaneously taken to the tools of the machine in order for the concave surface of the outer brake lining blocks to get in contact with the upper narrowed end 303 of axis 301 above the circular saw 307. The u-shaped iron frames 237 inserted into the specific key ways in the lower guide ways 270, 271, are consequently kept in a fixed position during the whole treating and finishing process.

At this moment the central driving shaft 287 is set into operation. The circular saw 207 which is set into rotation, is pushed upwards by the screw-shaped ramp 304, 305 simultaneously cutting off the overhanging, interfering parts of the two carrier plates 240 thus forming same as an oblique metal band (not illustrated). After the stoppage of the central driving shaft 257 the toothed wheels or pinions 282, 283 are operated in order to effect the separation of the carrier plate 240 from the allocated frame 237 and to move it towards the center of the machine until that moment when the outer lining blocks 239a, 239b are put between the suspended fixed arc-shaped segments 288, 289.

After the stoppage of the toothed wheels 282, 283 the central driving shaft 257 is again set into operation in order to work the circular saw 307 so that the remaining parts of the two carrier plates 240, this time along the inner concave bows of the inserted blocks 239a 239b, may be cut off. The rotating speed of the central driving shaft 257 is consecutively increased and the outer driving shaft 259 is also set into rotation in order to rotate cylinder 290, which previously had been pushed upwards by the upward movement of the hydraulic means.

The grinding tools 297, 298 start to grind the outer area of blocks 239a, 239b, and the centrifugal-acting circular saws 317, 318 simultaneously saw the two lining blocks 239a, 239b directly underneath the specific carrier plate 240.

At the same time the inner grinding tools 315, 316 grind the inner area of the lining blocks 239a, 239b.

After that the cylinder 290 carrying the ground brake linings 239a 239b separated from their carrier plate 240, lowers to the level of the second intermediate level 256b. At this level the two lining blocks are firstly bored by the boring machines not illustrated; then the intermediate driving shaft 258 is set into operation in order to cause the sawing of the two brake lining blocks with the help of the centrifugal sawing tools 327, 328 into finished perforated and ground drum brake linings. In order to prevent the damaging of the outer grinding tools 297, 298, their surfaces have comparatively deep grooves corresponding to the position of each centrifugal-acting saw 327, 328 of the second level or the second step.

Finally the lining blocks are taken in a final working step to the lower level 256a of cylinder 256 by downward movements of cylinder 290. Simultaneously they are discharged through the side openings of cylinder 256 by any suitable devices and particularly by that as previously described.

After completion of the cutting process of the last brake lining block of the brake lining block unit the toothed bars 278, 280 and 279, 281 are taken back to their initial position, and the iron frames 237 are removed in order to be transported back into the carousel.

The previously described centrifugal-acting tools may also be used for the combined manufacture and finishing of flat, round or hollow products with an edge, channels, or flanges. An example of using these tools for the molding of asbestos cement tubes during their finishing process is described below in the description of the second variance of the carousel on the occasion of the manufacture of asbestos cement tubes which have fixing flanges and are formed in a single molding process into vertical, horizontally opening molds.

The second variance of the carousel according to the invention particularly illustrated in FIGS. 9–12, 19–22, is a carousel build into a working unit with six molds turning around the cylindrical body 6 of the installation. As in the first variance, each sector corresponds to a specific process for articles to be manufactured, and to the number of pressing devices positioned around the cylindrical body 6. Consequently the sectors of the working unit may be divided into three groups according to the division of the technological process:

"A mechanical sector" for each sector which has a pressing device and particularly two presses positioned above each other in which the feeding of mixture into the mold takes place, and possibly a part treatment, and the removal from the mold of the products contained in the mold or molds supplied by the carousel to this sector.

"A treatment sector" for each sector which is positioned behind a mechanical sector of the working unit in the direction of rotation of the carousel, and in which the manufactured product or article is subject to a heat treatment, a chemical combined treatment, and so on.

"A discharge sector" for each sector of the working unit which is provided for the discharging of the finished product or article of the carousel at the end of the working cycle of each specific mold.

As in the first variance example, the carousel has a fixed part positioned in the circular fixed lower platform 4 of the frame or housing of the installation and the second cicrular upper fixed platform 5. The two platforms are either mounted on the central cylinder 1 of the frame, or the cylinder body 6. These platforms have openings, particularly in the mechanical sectors of each working unit to enable the feeding of the specific pressing tools of the auxiliary press and the main press. The platforms also have devices such as shafts 340 in the discharge sectors of the working units in order to enable the driving of the discharge device of the carousel for discharging the articles from the carousel. These various devices will be described later on.

The fixed part of the carousel consists of a fixed cylinder 337 without bottom and cover, mounted on the cylinder body 6 and fixed on platform 4 and 5 with the help of a key 338, 339.

The movable part of the carousel is positioned between the fixed platform 4 and 5 and around the fixed cylinder 337. The latter serves as a stiffening between the two platforms 4 and 5. Advantageously the height of the fixed cylinder 337 is adjustable, thus adapting the space between the fixed platform 4 and 5 to the dimensions of the article or product to be manufactured.

The moveable part contains a circular movable lower plate 343, tightly fixed to a cylinder 344 mounted on the fixed cylinder 337. This movable circular plate 343 is rotably carried by rolls 345 positioned on the fixed platform 4 around the cylinder body 6. This circular plate is also cut out in each of the six sectors of the carousel, in order to enable the feeding of the mold elements or other elements carried by plate 71 of the upper screw press of the auxiliary press, as will be described later on.

This movable part has furthermore an upper circular movable plate 361 which is mounted on cylinder 344 through an opening cut out in its central part, and fixed by the help of a key 362. The latter cylinder is tightly connected with the lower movable plate 343 and has at least an opening in each mechanical sector, corresponding to the diameter of disk plate 188a of the tool piston 188 of the main press, and has on its circumferential area outside the space of the main press destined for twelve cores 360, 384 pressed into twelve openings, devices for discharging carried by the carousel, and which will be described below in the description of the manufacture of asbestos cement tubes.

By this means the two movable plates, namely the lower plate 343 and the upper plate 361 form together a working unit divided into six movable sectors which rotate around the cylinder body 6. The unit is synchronically set into rotation by a toothed wheel 355 in contact with a toothed intermediate crown 354 in such a way that each mold is stopped in the discharge sector and the end of its working cycle, whereas the mold discharged at the end of the foregoing working cycle, is stopped in the mechanical sector, whereas the mold discharged at the end of the foregoing working cycle, is stopped in the mechanical sector, whereas the others containing the products to be treated, are stopped in the treatment sectors. For the timewise decrease of the working cycle, part of the treatment may be performed in the mechanical or the discharge sectors.

The heating system of each single sector is connected with a heating medium source (not illustrated) via channels 364, 365, 382 advantageously bored into the swinging driving shaft 358, 359, 381, 383, 384 of the discharge devices carried by the carousel, as well as into their tightly connected tappet 356, 357, and connected with each single mold. The feeding of the heating element into each of these channels is controlled by a valve 366 with an oval head. The valve is operated in concave hollows (channels) provided at their access at the height of each sector of the lower fixed platform 4. Each valve is connected by its own line 367 either with a common line for the feeding of the heating element, or directly with its special source when the treatment temperature differs in the various sectors, or when the element for heating or treating is of a special nature. The continuous circulation of the heating or treating element is guaranteed by the return valves 368, 369 which are of the same kind and arranged in two parallel accesses in each of the six sectors of the lower movable platform 4, and during each stoppage of the carousel in one of these sectors are in alignment with the transport openings arranged above; these belong either to each particular mold, or are commonly allocated to various forms or molds piled parallel or above each other. The valves installed in the discharge sector are advantageously connected with a hot air pump or the condenser of a heating boiler in order to guarantee a complete unloading of the heating element contained in the respective molds before the beginning of the discharging of the manufactured articles. Correspondingly this system may serve as a cooling system for the inside walls of the molds, whereby pipes 370, 371 act as an admission or opening for the fresh air. These lines are arranged along a fourth inner channel on the fixed lower platform 4.

Advantageously the rotating driving shafts 358, 359 of the discharge or unload elements of each sector have channels 372, 373, 374, 375 for molds with movable elements. These are connected among each other by an arc-shaped groove 376 provided at the height of the tappet 356, and serves for the feeding and transport of hydraulic oil through the line 377, the valve 378 and the channel 372. Advantageously an additional pipe for compressed air 370, 380 is provided in each driving shaft to clean or possibly to lubricate the molds.

Thanks to this assembly the second variance of the carousel is particularly suitable for the manufacture of articles of a complicated form which are exchangeable and adjustable, for instance for the manufacture of special products, such as asbestos cement tubes with one-pieced molded flanges according to two processes, namely a centrifugal process or by simple pressing. In the following the forming of molds and pressing tools for the manufacture of asbestos cement tubes in a centrifugal way with vertical, horizontally opening molds arranged in one row, is described, showing an inner mold element, for instance a centrifugal side head element or a tube.

Figure 10:
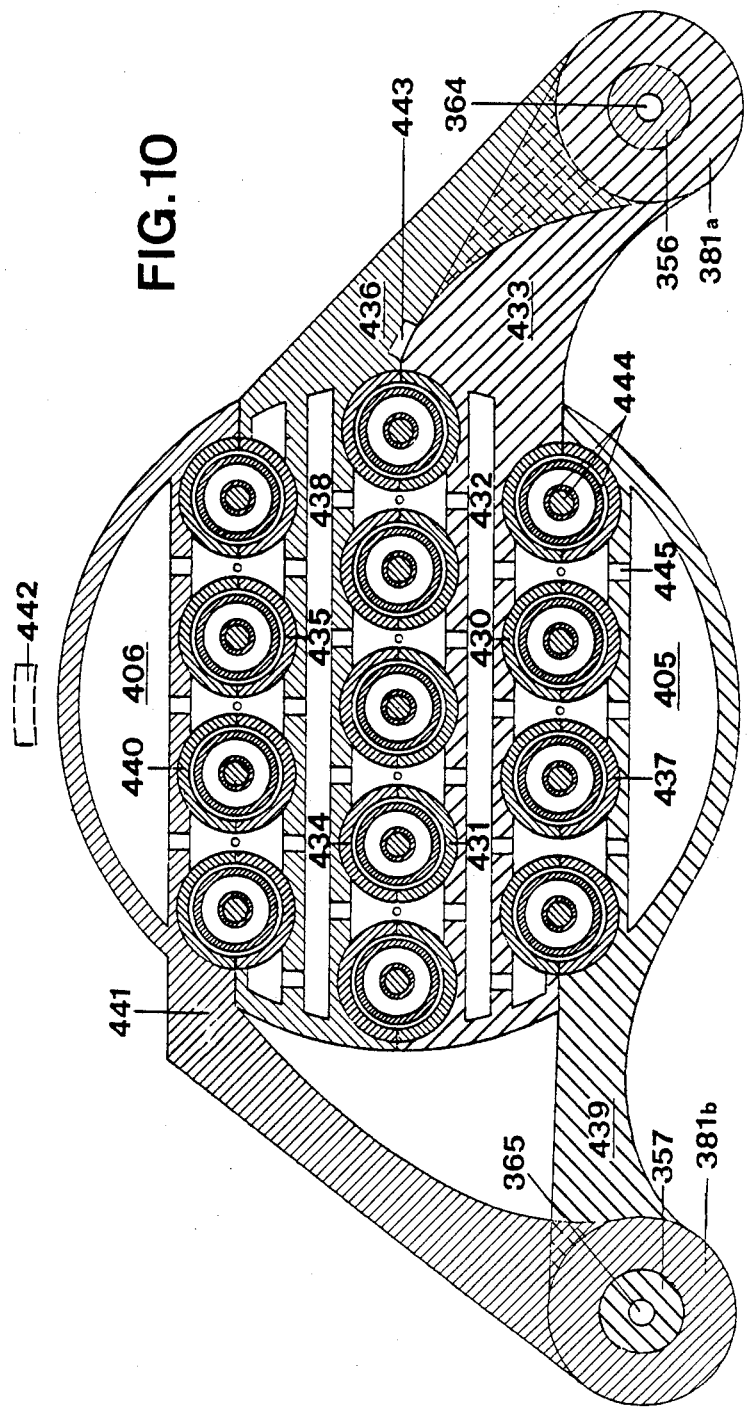
FIG. 10 is a horizontal section through the carousel according to the second variance of the installation as shown in FIG. 9, whereby the operational form is placed in the unloading sector or sector for the removal from the mold of a working unit.
Figure 19:
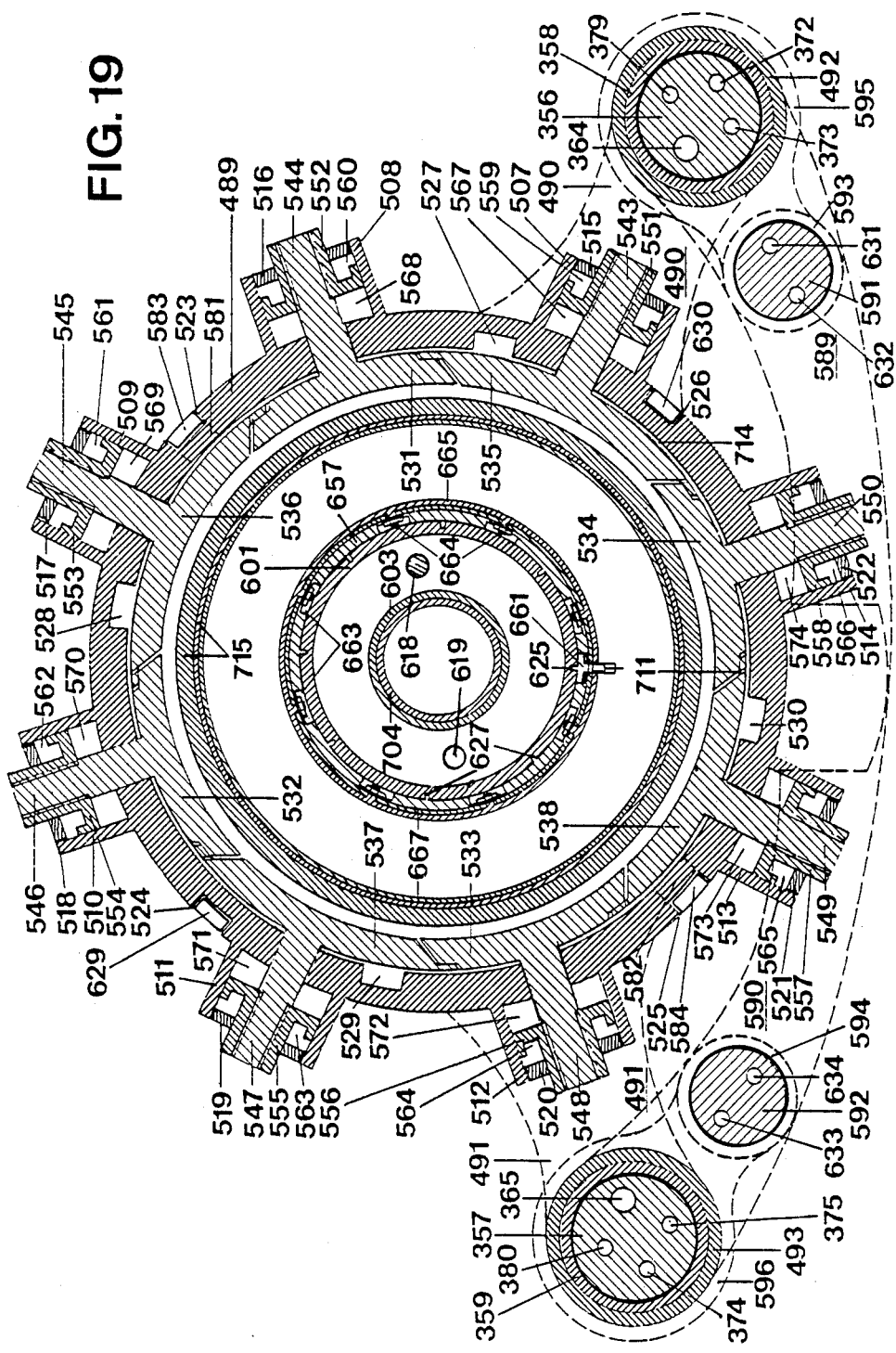
FIG. 19 is a horizontal section along the line XIX—XIX of FIG. 16 and also shows in a closed position the equipment for the transport and the opening of the mold outside the carousel.
Figure 20:
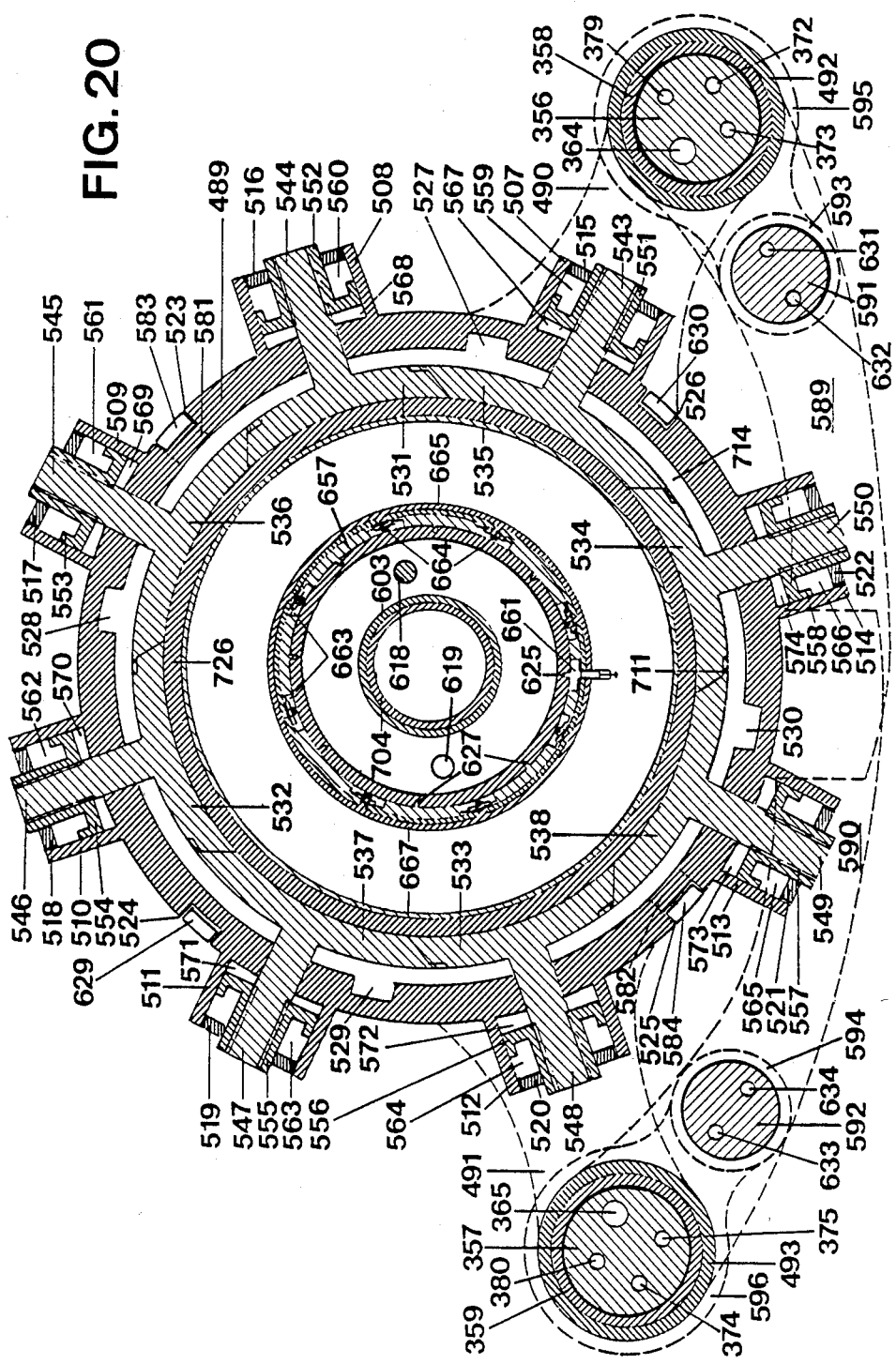
FIG. 20 is a view identical with FIG. 19 and shows the mold at the end of the compression phase.

Each movable sector of a carousel as illustrated in FIGS. 10 and 19, has two tappets 356, 357 positioned opposite each other with the specific driving shafts 357, 359, 432, 438 which bring about the output of the molds out of the carousel to the opposite sides. Thus the molds positioned in one row (FIGS. 9 and 11) can advantageously be unloaded with a single discharge tool supported by two tappets, in the case of illustrated FIG. 12 by tappet 356. This tappet 356 has a lower driving shaft 381 which stands up to half of the height of the movable part of the carousel, whereas a channel 382 is bored through the core 383 of the driving shaft 381 above the fixed platform 5. This channel 382 lengthens the channel 364 for the feeding of the heating element. A second upper driving shaft 384 is mounted on core 383 and carries on an extension of its upper part the movable upper plate 361 of the carousel whereas the remaining upper area serves as a platform for an operational toothed wheel 385, fixed by a key 386 to the driving shaft 384. This toothed wheel is also mounted on the core 383. A second operational toothed wheel 387 for the first driving shaft 381 is mounted on the part of smaller diameter 388 of the core 383. This device guarantees a drive of the driving shafts 381, 384 in the same direction, the simultaneous discharge of the mold elements allocated to each driving shaft by the operation of the toothed wheels 385, 387 with the specific driving elements, for instance fixed on the platform 5 of each unload or discharge sector, and particularly having a shaft 340 with two driving pinions 341, 342.

The driving shafts 381, 384 are each connected with one half of a plate by arms 389, 390 positioned above each other with a diameter corresponding to that of the mixture container 107 and which is cut into two lower areas or parts 391, 392 which on their part define the lower part of the specific sector of the working unit. Each part of these plates is provided with an area for positioning the mold elements, and with a welded vertical wall 393, 394, which extends up to the upper fixed plate 361. Two half-cylindrical segments 395, 396 of two cylinders with an equal diameter and with an equal eight are welded on each of these plates. The upper ends of these cylinders are covered by two parts 397, 398 of an upper plate cut in exactly the same way as the lower plate previously described. Each of these parts of plates 397, 398 is bored around the half-cylindrical segments 395, 396 in order to form a half-cylindrical upper opening 399, 400 corresponding to the diameter and the thickness of the upper flange of the tube to be manufactured. Identical lower borings 401, 402 are executed in the thickness of the lower horizontal parts 391, 392 serving to store removable rings 403, 404, with an outer diameter which corresponds to the outer diameter of the tube to be manufactured, and which on their upper area show keys to form the mounting holes in the lower flanges of the tubes to be manufactured. By this means the individual shape of two half blocks of each sector of the working unit are formed, in a parallel and opposite position to each other by the movement of their specific driving shafts 381, 384 in an opposite direction. By getting in contact with each other, they tightly enclose the two cylinders without bottom and cover surrounded by the common heating chambers 405, 406. Each cylinder has mold elements to form the lower and upper mounting flanges of the tubes to be manufactured. For the manufacture of the tubes in a centrifugal way, it only remains to equip this mold with centrifugal tools carried by a driving shaft 407, 408 identical for each cylinder, which extends up to the surface of the upper parts 397, 398 of the upper plates. These driving shafts have axial upper and lower borings 409, 410, 411, 412 in order to cooperate on the one hand with supporting axes (shafts) 425, 426 positioned on the lower surface of the tuber 188a of the upper pressing tool 188 to keep these driving shafts in a central and vertical position, an on the other hand with devices for a rotating drive of the centrifugal tools.

The rotating drive device of these centrifugal tools is formed by a conical boring in a tightly connected section 413, 414 of each driving shaft 407, 408. The shafts are supported by the conical part 415, 416 of the toothed wheels 346, 347 during the closing process of the molds positioned freely turnable by pins 348, 349 and bolts 350, 351 on the piston 71 of the upper screw press of the auxiliary press. The toothed wheels 346, 347 are set into rotation by a plain shaft 353 with an upper end 352 developed as a pinion, and the lower end of which is set into rotation by driving devices not illustrated.

Furthermore each section 413, 414 of each driving shaft 407, 408 has a lower flange 417, 418 serving as a continuous platform for the removable rings 403, 404, which are also supported by the two lower parts 391, 392 during the closing process of the molds.

The centrifugal tools 421, 422 are positioned on the driving shafts 407, 408 and connected by keys 419, 420. These centrifugal tools are of the same kind as those previously described regarding the machine for shaping the brake lining blocks, and consist particularly of tools 423, 424 centrifuging the mixture and which are extractable up to the inner surface of the wall of the tube to be manufactured.

The tool piston 188 of the main press forming the upper area of the tube to be manufactured, shows a similar form as that described for the first variance of execution regarding the manufacture of brake linings, and has specific bolts 189a to form the openings in the mounting flanges of the tubes.

The installation according to the second variance operates as follows:

The feeding element of the installation operates with a speed corresponding to the working cycle for the fabrication of asbestos cement tubes, and guarantees the preparation, dosing and pushing back of the mixture in the container 107 and in the molds in a way as described regarding the first variance.

As soon as the rotation of the carousel has taken the mold elements and the centrifugal tools to a mechanical sector for mechanical treatment, the tool piston 188 of the main press is sufficiently lowered, so that the supporting shafts 425, 426 can penetrate into the specific slot openings 410, 412 of the driving shafts 407, 408 to keep same in a vertical and steady position during their rotation.

Accordingly the piston 71 of the upper screw press of the auxiliary press is lifted in order to connect the two conical parts 415, 416 of the toothed wheels 346, 347 with the conical parts of sections 413, 414 of the driving shafts 407, 408 and thus to rotate the centrifugal tools by the rotation of shaft 353.

Advantageously the velocity of the centrifugal tools is progressively, synchronically enlarged with the downward movement of the tool piston 188 and consequently with the increase of the pressure exerted on the mixture. The latter is fed by the feeding element basically in the same way as described regarding the manufacture of the brake linings. A possible excess of the mixture under high pressure is, however, integrated into the upper flange, in that case equipped with a more significant thickness.

The driving shaft 353 is stopped at the moment of the arrival of the tool piston 188 at its lower deadpoint. The piston 71 is then run downwards, which causes the downward movement of the toothed wheels 346, 347 beneath the lower movable plate of the carousel. The latter may then be turned to the following sector with the formed tubes and the centrifugal tools suspended in the interior, after the tool piston 188 of the main press has moved towards its upper deadpoint. The rotation of the carousel is caused with the help of the driving toothed wheel 355 and the toothed part 354 of cylinder 344.

The carousel rotates by one step to take these molds into the following sector, and to stop the working cycle, respectively, which, for instance, includes four treatment sectors. After the consecutive stoppages in these treatment sectors the mold and the formed tubes are then taken to the discharge sector, where the working cycle by the discharging of the finished tubes is completed, which proceeds as follows:

The toothed wheels 385, 387 allocated to this particular mold, automatically get in contact with the toothed wheels 341, 342 when the carousel takes these molds to the discharge sector. The toothed wheels 341, 342 are then set into rotation by an outer motor in the same direction of rotation, and cause the output of the mold from the carousel by rotation of the driving shafts 381, 384 of the arms 389, 390 the lower parts 391, 392 and upper parts 397, 398 connected with each other by their half-cylindrical segments 395, 396 and the specific vertical walls 393, 394 and thus forming a block which is kept together in a closed position by the tubes 427, 428 sticking on the walls of the molds 395, 396 and by the removable rings 403, 404 and, for instance, a readjusting catch (not illustrated). This block is stopped above the operating device operated by a hydraulic can not illustrated. As the tubes of asbestos cement are comparatively heavy, the fixed circular platform 4 advantageously has an outer part 4a fixed on the outer frame of the installation and shows at the height of the plate guiding openings for the aforementioned operating device. These devices are operated in order to be interlocked with the locking bars provided in the lower bows of the driving shafts 407, 408, and consequently take over the fixing devices of the centrifugal tools and of the formed tubes. At this moment the toothed wheels 342, 341 are operated in an opposite direction of rotation, which causes the separation of the two halves of the block, whereby the finished tubes 427, 428 removed from the molds remain in a vertical, steady position. Thus the tubes are fixed on the removable ring 403, 404 by their specific lower flange and are carried by flanges 417, 418 of the sections 413, 414 of the driving shaft 407, 408 and thus by the operating devices. The final removal of the tubes from the molds and their discharging are caused by the upward movement of the operating devices, whereby the unit tubes-centrifugal tools are taken up to the height of an arm 429 operated by a hydraulic device which keeps this unit in a fixed position, whereas the operating devices move downwards in order to separate the removable rings 403, 404 and the centrifugal side heads from the molded tubes 427, 428. Finally the removal from the molds is completed and terminated by the lifting of the finished tubes 427, 428 with the help of arm 429 (FIG. 24) above the said block to take them to a circular conveyor, whereas the two form block halves are united to a closed block by the lower members 391, 392 (FIG. 11) and by operation of their specific driving shaft 381, 384 for a new forming of the mold around the specific centrifugal tools which have before been freed by the downward movement of the driving shaft. The whole block is taken to the carousel by operation of the driving shafts 381, 384 and thus prepared for the performance of a new working cycle.

Figure 12:
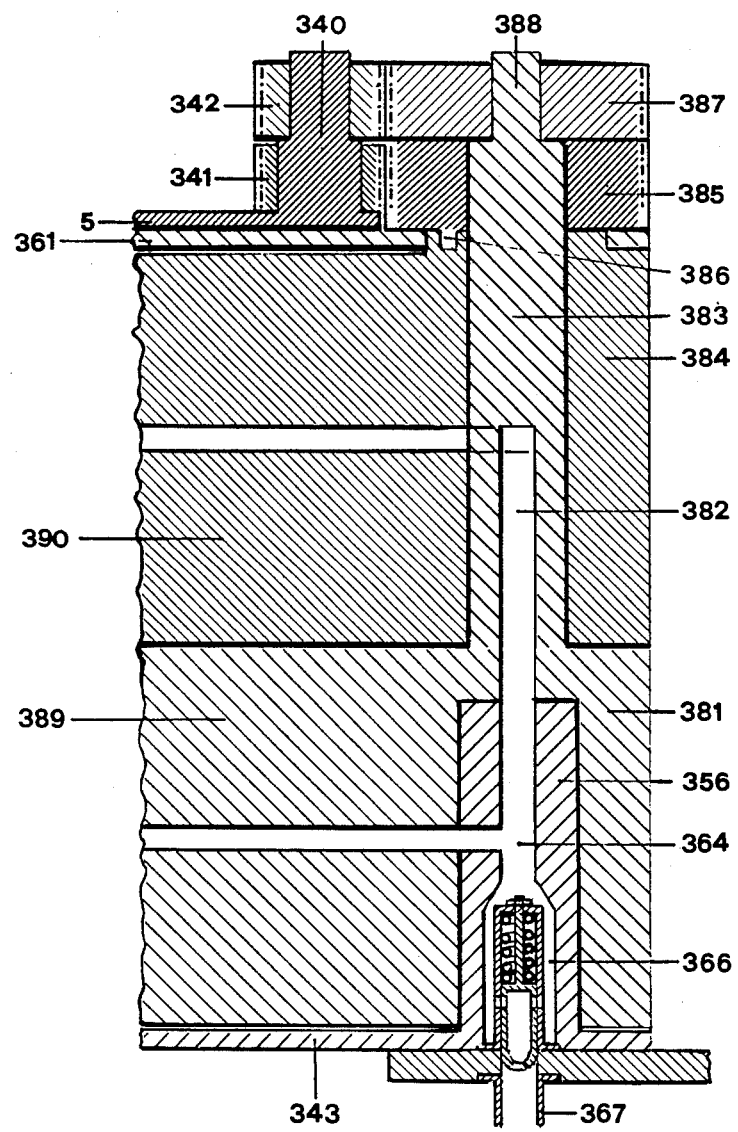
FIG. 12 is a partial view in an axial section and shows the apparatus which controls the emergence of the mold from the carousel during the opening and the removal of the finished asbestos cement tube.

Of course it is possible for such an installation to use various parallel molding rows. In this case the sector has two tappets 356, 357 each of which serves as a base for the discharging and fixing device as illustrated in FIGS. 10 and 12. Particularly on the tappets 357 two driving shafts 381b, 384b are positioned, which are connected by arms 439, 441 with an outer half-cylindrical segment 437 of the first row and an inner half-cylindrical segment 440 of the third row. Out of the tappets 356 two driving shafts 381a, 384a are set up which are each connected by the arms 433 with a double inner half-cylindrical segment 430 of the first row and an outer segment 431 of the second row, and by the arm 436 with a double outer half-cylindrical segment 434 and an outer half-cylindrical segment 434 and an outer half-cylindrical segment 435 of the third row. The movement of the arms 433, 441 to the central part of the installation is limited by stop motion devices 442, 443. All molds are in their closed position provided with centrifugal side heads 444 and surrounded by heating chambers 405, 406, 432, 438 which are connected among each other by passages or channels 445, and with the heating source by channels 364, 365. For the removal and discharging of the finished tubes each row of molds is discharged at two different discharging places provided on both sides of the removal device. The process of the discharging device previously described regarding the discharging of molds positioned in rows, is identical to that described in the aforementioned case.

Figure 11:
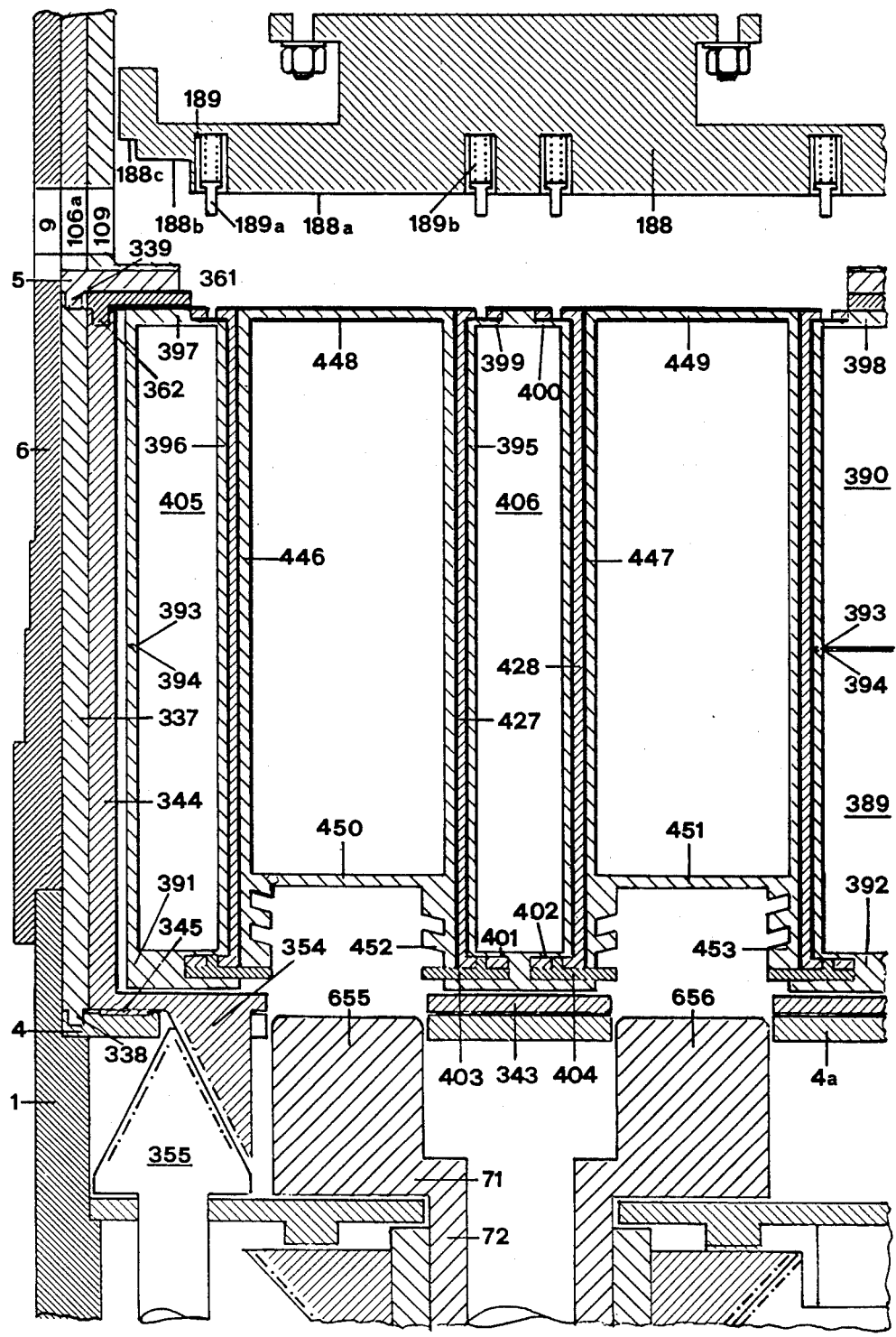
FIG. 11 is a partial view showing a vertical section of the carousel according to the second operational form arranged in the sector, which has a pressing element of an operating unit and is adapted to the production of asbestos cement tubes.

The manufactured of asbestos cement tubes by presses is illustrated in FIGS. 11 and 12 and is different from the manufacture of tubes in a centrifugal manner by the following device:

The bolts or supporting shafts 425 arranged on the disk plate 188a of the tool piston 188 are omitted and the main press programmed in such a way that its tool piston 188 operates synchronically with the working cycle, which is identical with that one regarding the manufacture of brake linings at the first variance of the carousel.

The centrifugal tools with their driving system are exchanged for each mold by an inner cylinder 446, 447, the outer diameter of which corresponds to the inner diameter of the tubes to be manufactured, and which is closed on the top by covers 448, 449 and beneath provided with a bottom 450, 451; the latter is lifted and has underneath a thick inner wall developed as screw-shaped ramp 452, 453. This is supported by an allocated, removable ring 403, 404 which in its closed condition is carried by lower parts 391, 392, and during the removal from the molds and unloading of the products by a broadening of the male part (not illustrated) of the screw-shaped ramp. During the removal from the molds and the unloading of the products the inner cylinder is lifted and slightly skewed by its screw-shaped ramp 452, 453 in order to separate it from the vertical wall of the molded tube which is still sticking on the specific removable ring 403, 404 with its lower fixing flange. In order to complete the removal from the molds and the unloading, the lever cooperating with the screw-shaped ramp continues its upward movement thus causing the upward movement of the whole device, until the tube removed from the mold is picked up by the automatic discharging arm 429 and can be kept in a fixed position.

The downward movement of the driving lever causes the downward movement of cylinder 446, 447 thanks to the screw-shaped ramp 452, 453 which by this means leads to the separation of the movable rings 403, 404 from the lower flange of the manufactured tube.

The closing of the empty molds, their return to the carousel and the connection with the heating system are performed as in the aforementioned case, whereas the feeding, the stepwise process and the treatment are performed in a way identical to that one specified regarding the manufacture of brake linings.

It is also possible to manufacture asbestos cement tubes with the installation according to the invention showing various coatings of different composition which are sprayed by centrifugal tools in opposite direction. Thereby it is possible to increase the quality of the tubes and their compression resistance. For this purpose the centrifugal side heads can be repeatedly coated with a suitable AZ-mixture before the unloading of the finished tubes, corresponding to the number of the coatings to be applied. The carousel previously described can be used in such a manner that with each mold a working cycle for each additional mixture coating starts from the beginning. In this case, however, the productivity of the installation is decreased. Another possibility for the manufacture of these tubes is to position various pressing elements around the feeding device which in this way define a number of mechanical sectors corresponding to the number of additionally applied coatings. Each mechanical sector is fed by the feeding device with the approximate mixture. Thereby the feeding device is advantageously applied according to the second variance previously specified, namely with various compartments, the number of which is identical with the number of asbestos cement mixtures. In this case the unloading sector is positioned directly (exactly) in front of the first mechanical sector of the working unit. Furthermore the centrifugal side heads can be exchanged for the appliance of the consecutive mixture coatings before each mechanical sector. In a preferred variance, however, these side heads can also be replaced by centrifugal tools with various extents, whereby the desired extent is either chosen by a mechanical, an electronic or programmed, electro-magnetic device.

The previously described manufacture of asbestos cement tubes and particularly the manufacture in a centrifugal manner offers unquestionable advances in comparison with the technique presently applied, as for instance a reduction of the infra-structure costs, and equipment which is more efficient, less expensive and less spacing requiring, as well as simplified operation along with an increase of the productivity, the automation and continuity of production.

The second variance of the installation as described before, is also particularly applicable for the manufacture of rubber tires in a continuous way with a high productivity.

Actually, the specified installation can simply be converted for the manufacture of tires by exchanging the mold forming elements carried by the carousel, and the pressing tools of the main press and of the auxiliary press by mold elements appropriate for the manufacture of tires.

As furthermore the manufacture of tires requires the feeding with two mixtures of different composition, namely a mixture to form the carcass of the tires, and particularly the cap of the tire, and another mixture to form the flanks of the tire, in the following the alterations are specified to be made at the main press and the auxiliary press in order to guarantee the consecutive feeding with at least two mixtures.

Below the mold elements are described which are carried by the carousel and positioned in a single sector of the working unit. Preferably such mold elements are provided in each sector of the working unit.

Figure 22:
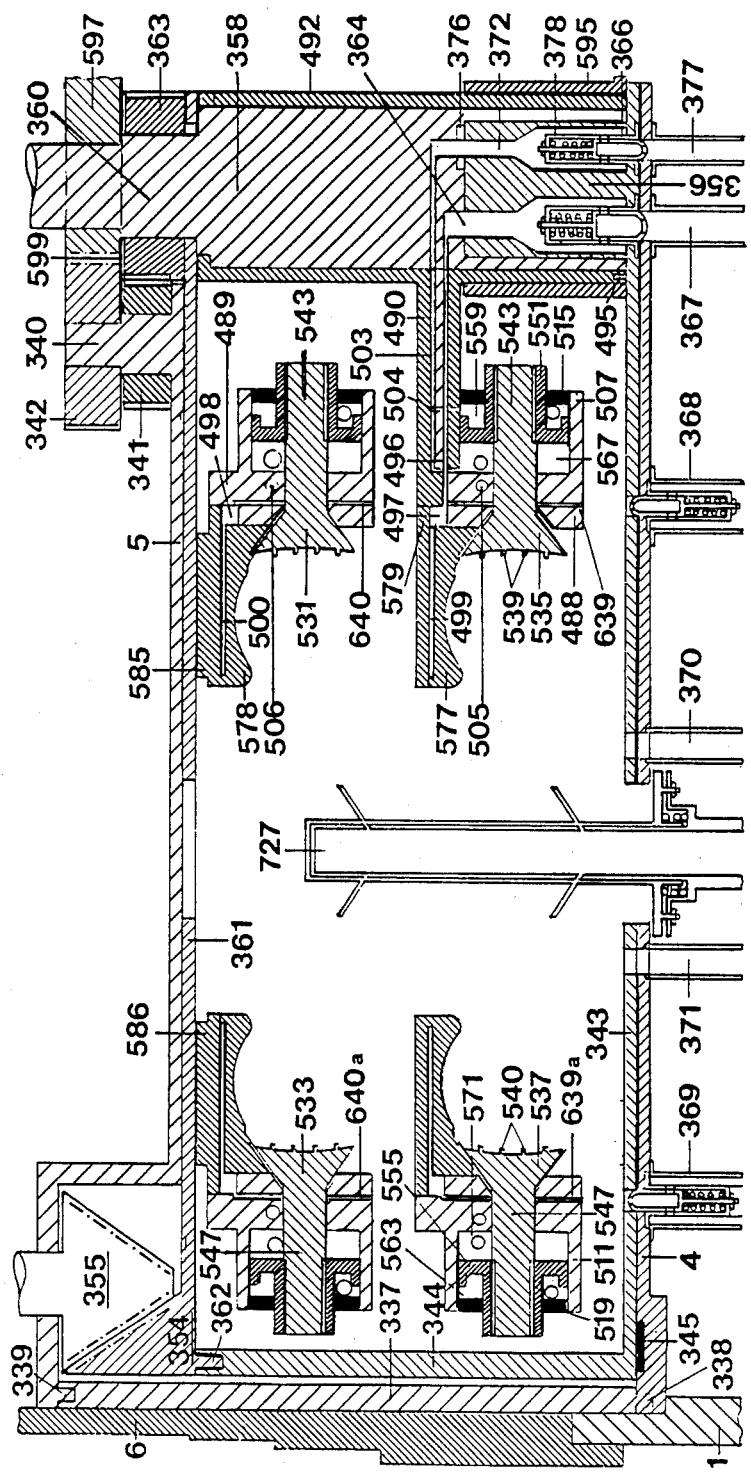
FIG. 22 shows the upper parts of two molds one on top of the other, after the separation of the respective lower part.

Furthermore each sector can contain various molds arranged above each other in the form of a vertical column (support) as in the illustrated variance, or various vertical colums of forms positioned above each other. Each form of a vertical column as illustrated in FIGS. 16, 17, 18, 19, 20, has:

one upper molding support 488, 489 forming a block of a comparatively large thickness, bored in its upper and lower part to enable the storing of the actual mold and the sliding of the movable parts of the mold. This upper molding support is connected above an arm 490, 491 welded with its outer side onto a cylinder 492, 493, which is fixed on its driving shaft with the help of a key 494. This driving shaft 358, 359 enables the removal of the molds arrived at the discharge sector from the carousel, by the drive of the toothed wheels 342, 341 in a manner basically analogous to that specified with reference to the unloading of the asbestos cement tubes. Advantageously each sector has two driving shafts 358, 359 which are tightly connected by specific cylinders 492, 493 and arms 490, 491, the first one with the even-numbered molding supports of the vertical molding column, the second one with the upper molding supports of the odd-numbered molds of the vertical molding columns, as illustrated in FIG. 22 which only shows two molds piled above each other. Advantageously each cylinder 492, 493 is provided with a housing 495 for the fastening of the fixed mold positioned underneath. In the body of each arm 490, 491 a pipe 496 is bored to feed the heating element in order to connect the pipe 464, 365 incorporated in the driving shaft with the horizontal, circular pipe lines 499, 500 and vertical pipe lines 639, 639a, 640, 640a, which are altogether connected in a closed condition with the combined heating and discharging channels contained in the plates 587, 588 altogether forming the heating system and opening to the lower area of the upper molding support block. This upper molding support block 488, 489 shows on its inner wall and in its central part or area a ring-shaped groove with conical edges and borings which open into the bottom of this groove to receive the guide bars for the segments forming the body of the form as described below. Furthermore the upper molding support 488, 489 has along its whole height on its outer area four broad grooves 523, 524, 525, 526 positioned opposite to each pair and divided regularly on the circumference of block 488, 489 with at least one arc-shaped channel 527, 528, 529, 530 on its lower area, connected with a circular compressed air piping 505, 506 which in its turn is connected with the pipe line 379 by a compressed air feeding pipe (not illustrated).

Figure 18:
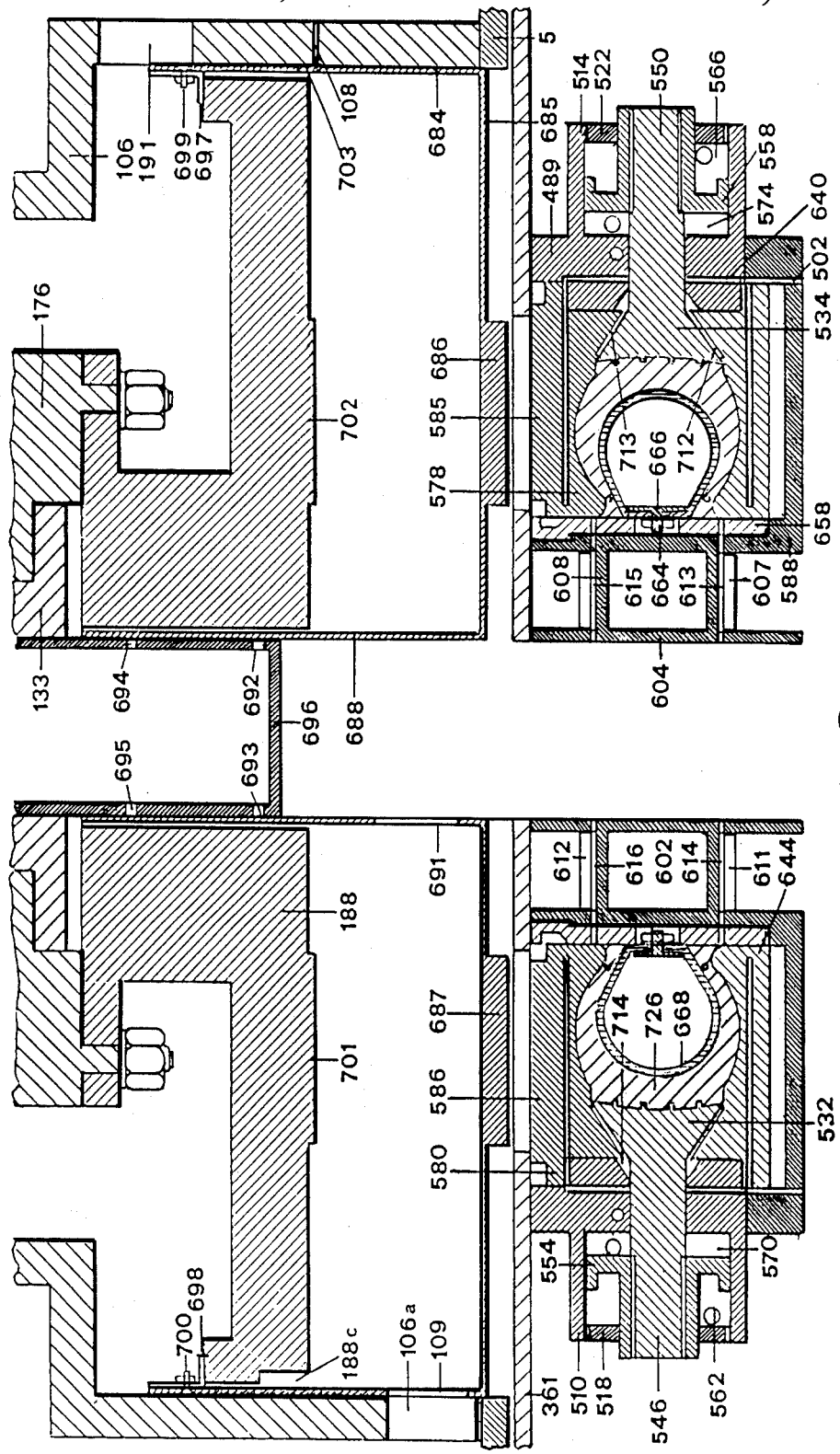
FIG. 18 shows the carousel of FIGS. 16 and 17 after completion of the compression and before it moves into the sector following the first working unit.

One central molding body composed of a number of horizontal, arc-shaped, inner segments 531, 532, 533, 534 and outer segments 535, 536, 537, 538 which in an assembled condition form a ring-shaped unit. These segments have upper and lower chamfered areas, as well as chamfered side areas in order to easily slide in relation to each other and to the conical wall of the inner groove of the upper molding support block 488, 489 as illustrated in FIGS. 18 and 19. Each segment shows an inner area developed as a matrix with various stampings 539, 540, 541, 542 to form the structure of the tread of the manufactured tires. Each segment has on an outer area a tappet push rod 543, 544, 545, 546, 547, 548, 549, 550 which is run on bearings in the borings of the upper molding support block in a sliding position, and opens into the bottom of the central conical groove. These tappet bush rods penetrate into the cylinders 507–514 developed on the outer area of block 488, 489, whereby each piston 551 to 558 of these cylinders is mounted on the tappet bush rod 543–550. Each cylinder is closed by a cover 515 to 522, which is densely penetrated by the piston rod and the allocated tappet bush rod. By this means, he pistons 551 to 558 divide the cylinders into two chaambers of a variable volume, namely an outer chamber 559 to 556 and an inner chamber 567 to 574. Each of these chambers is connected with an oil pressure source by feeding and discharging pipes 503, 504 which are bored into the blocks 488, 489 forming the upper supports of the molds, whereby they are all connected together by outer pipes 575, 576 (FIG. 16), in order to cause by this means of feeding with compressed oil the simultaneous sliding process of all segments towards the interior to form a ring of a certain dimension.

An upper movable cover 577, 578 is rigidly set with its side wall into the boring of block 488m 489 for supporting or fixing the molds, whereby its lower side area is chamfered at an angle which corresponds to the angle of the upper areas of the arc-shaped segments 531–538, so that it can rigidly be supported and slide on the upper part of the segments. The remaining inner area of the cover is developed according to the form of the flanks or the sideband of the tire to be manufactured from the rim up to the tangent with the assembly or tape line. The upper part of the cover has a plate 579, 580 which protrudes from the surface of block 488, 489 by a height which basically is identical to the sliding height (stroke) of cover 577, 578 on the surface of the segments. The plate 579, 580 has at least two horizontal tongues (not illustrated) sliding vertically into the allocated grooves 581, 582 which are cut into the surface of body 488, 489. Each of these tongues is at its end provided with an element 583, 584 forming a leg which is inserted and welded onto the said vertical groove 523, 525 of the outer area of block 488, 489, in order to keep the cover in its position. This cover is likewise bored by horizontal channels or pipes 499, 500 which are connected with the common horizontal circular pipe line 497, 498 as soon as the mold is closed. The cover of the upper mold which is positioned on top of the column of molds piled above each other, is provided with at least two abutments 585, 586 which protrude above the plate 578 with a height corresponding to the distance of the plate from its upper deadpoint to its lower deadpoint. These abutments have dimensions which are executed according to the openings of the movable upper plate 361 of the carousel in order to cooperate with the abutments 701, 702 of tool 188 of the main press of the movable mixture container 686, 687.

Figure 21:
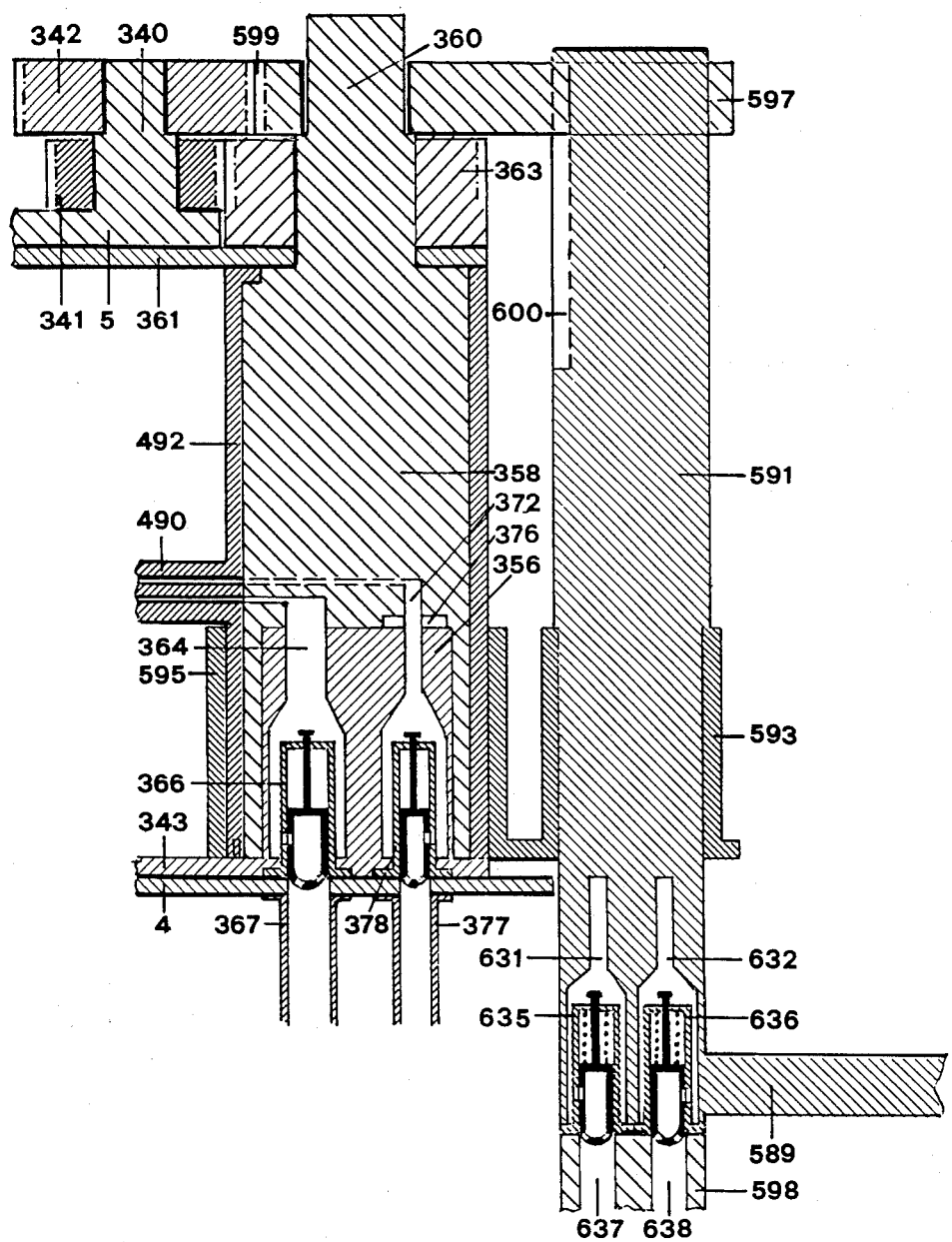
FIG. 21 is a vertical section view of the equipment in an open position for the transport and the opening of the molds out of the carousel as represented in FIG. 19.

One lower molding support which is shown in FIGS. 16 to 18 and 24, has the form of a plate 587, 588 with a diameter identical to that of block 488, 489 of the upper molding support. Each plate is connected with an arm 589, 590 welded on an outer rod 591, 592. The rod 591, for instance, is common to the lower molding supports of the odd-numbered molds of the molding column, whereas the rod 592 is common to the lower molding supports of the even-numbered molds of the molding column. During the closing period of the mold these common rods are positioned in a circumferential opening (not illustrated) of the circular movable lower plate 343, and slide on the area of the circular fixed platform 4 from the carousel during the forward movement of the carousel and the unloading of the molds. The common rods 591, 592 are carried by cylinders 592, 594 which belong to a pair of two allocated cylinders, whereby the other cylinder of each pair 595, 596 is set on the cylinders 492, 493 of the upper molding supports, so that the common rods can rotate horizontally. The upper end of the common rods 591, 592 is provided with a lever transmission which is swingingly positioned on the core 360 of the driving shafts 358, 359. This lever has a toothed part 599, in contact with the toothed wheel 342, which is attached in the discharge sector of the working unit. The common rods 591, 592 slide vertically in the lever 597 by means of a groove 600 and under the effect of lever 598 of a hydraulic device not illustrated. The plate 587, 588 is cut out in its central part to form an opening, on the circumference of which a feeding cylinder 601, 602 (FIG. 24) is welded, whereby the upper part of this cylinder reaches the height of the upper cover 577, 578 at its upper deadpoint. An inner co-axial cylinder 603, 604 is fixed at the inside of the feeding cylinders 601, 602 by two fixed rings 605, 606, 607, 608. Each of these fixed rings has on its inner area a removable ring 609, 610, 611, 612 which is penetrated by a narrow frame or a small rail which in this manner is supported on the surface of its specific fixed ring and between this and the thin part of its surface includes (encloses) two arc-shaped passages 613, 614, 615, 616 which are connected with the passages of the same cross section bored at the same height into the wall of the fixed cylinder 601, 602 and the co-axial cylinder 603, 604. Thereby dosing and back pressure passages for the mixture are created which are tightly closed by master bolts 617, 618 and the pipe thread 619, 620, also serving for the admission of cooling fresh air. Each pipe of each mold leads to the pipe of the mold arranged above the mold column or mold pile thus forming a fresh air channel which extends along the total height of the column of molds arranged above each other, whereby the fresh air is pressed through the openings 621, 622, 623, 624. Furthermore the fixed feeding cylinder 601, 602 has a vertical pipe line for the admission of compressed air 625, 626 which advantageously ends right-angled outside of the cylinder, as well as various vertical pipe lines for the distribution of an effective element to separate the finished tires 627, 628 which are equally spaced from each other. These pipe lines also open outside of the cylinder 601, 602 into an angle of inclination suitable for the spraying of the effective element. These different vertical pipe lines are connected among each other by a circular common horizontal pipe line 629, 630, whereby each circular pipe line is parallel with the compressed air channel 625, 626 by the plate 687, 688 and the arm 589, 590, and with specific vertical channels 631, 632, 633, 634 which are developed in the common outer rod and end at valves with oval heads 635, 636 and which open at the angle point of the carousel in a sector above the allocated concave depressions (hollows) in the horizontal area of lever 598, the channels 637, 638 of which are each connected with sources for compressed air and effective elements for the separation of the finished tires, as illustrated in FIG. 21. Each feeding cylinder 601, 602 has a screw-shaped ramp 641, 642 to enable the placing of the rim of the tire as will be described below.

A movable lower cover 643, 644 has a form analogous to that of the upper cover 577, 578 which tightly fits with its side part into the lower boring of block 488, 489 of the upper molding support, and with its lower part into a ring-shaped boring in the surface of plate 587, 588. Each lower cover has on its outer circumferential area at least two arc-shaped vertical rods 645, 646, 647, 648 with a height corresponding to the height of the total mold in its open position. These rods are each welded on tongues 649, 650, 651, 652 and can slide in vertical grooves 524, 526 which are developed at the circumference of the supporting block for the upper molds, equivalent to the extent of the upward and downward movement of cover 633, 644. The lower cover of the molds piled upon each other at the base of the columns has two abutments 653, 654. These abutments are inserted in ring-shaped borings of plate 567 and protrude downwards from the lower area of plate 587 by a height corresponding to the distance of cover 643 and consequently of all covers 644 piled upon each other between their lower and upper deadpoint, and fit during the feeding and closing process into specific openings of molds contained in this mechanical sector of the working unit, which are developed in the circular movable lower plate 343 to enable the upward moving plate 71 (FIG. 11) of the upper screw press of the auxiliary press to lift these lower covers synchronically with the feeding of the molds with a mixture of a different composition under low and medium pressure, and to be able to exert a high pressure during the final closing process of the lower part of the molds. The lower cover 643, 644 has on its upper area a slope corresponding to the lower area of the arc-shaped segments 531 to 538 of the molding body.

A rim 657, 658 in the form of a cylinder, the screw-shaped ramp 659, 660 of which fits in the reversing pitch of the screw-shaped ramp 641, 642 developed in the outer wall of the feeding cylinder 601, 602 in order that the boring 661, 662 is automatically positioned opposite the opening of the compressed air admissio channel 625, 626. Identical borings 663 are equally spaced around the inside of rim 657, 658 for bolts 664 which protrude from a ring-shaped band, for instance of elastic sheet metal 665, 666 inserted into an air tube 667, 668 to carry the shoulders 669, 670, 671, 672 of these air tubes put against the outer area of rim 657, 658. This air tube 667, 668 is connected with the boring 661, 662 and accordingly with the compressed air admission channel 625, 626 by a valve (FIG. 25), the outer mantle 673 of which belongs to the sheet metal band 665, 666 and is fixed in the boring 661, 662 by a counter nut 674, 675, whereas its inner mantle 676 which has the form of a fork, penetrates the bottom of the outer pipe (tube) 673, and which is biased by the spring 678 with a constant pressure to be adjusted by the nut 681, keeping the compressed air passage 679, 680 in a closed position. Furthermore the upper area of rim 657, 658 has a ring-shaped groove 682, 683 which enables the fitting in of an arm 429 during the automatic unloading or automatic discharge in the manner illustrated in FIG. 24.

The built-up mold operates synchronically with the other elements of the installation adapted to the requirements, and enables the manufacture of tires according to different technical processes, the three most important of which are described below.

The basic materials for the different chemical compositions are supplied by the previously described feeding element, and particularly by the feeding element according to the previously described second variance illustrated in FIGS. 13 and 14. The fed mixtures must, however, must be exactly dosed, and it is therefore of advantage to prepare, mix and homogenize same with the help of special machines which are not part of the installation.

The feeding of the molds under low and medium pressure is effected by the main press issued by the feeding elements, and differs from the feeding equipment described regarding the first variance in such a way that the mixture container 107 is exchanged by a movable mixture container, the outer wall 684 of which is provided with a stop motion device 697, 698 fixed by nuts 699, 700 tightly against the side of the inner wall at the flange 106 of the outer cylinder 95 of the main press. Its enclosed space is connected with the atmosphere by the opening 703 and the openings 103 before the downward movement of the tool piston 188. Its bottom 685 is advantageously provided with two abutments 686, 687 positioned above the abutments 585, 586 of the upper cover 578. In its center an opening is cut out around which a cylinder 688 is arranged which has the task to slidingly bear the shaft 167 of the main press; the latter has on its lower end a feeding container developed by a cylinder 689 closed by a bottom 696. The cylinder has an opening 691 towards the mixture feeding into the container 689 of the thread shaft 167. In an analogous manner the cylinder 688 of the movable container 684 takes up the second container for the feeding of the second mixture developed by a cylinder 704, fixed on the upper end of the thread shaft 69 of the lower screw press of the auxiliary press, and closed by a cover 706 on its upper end. The tool piston 188 of the main press has two abutments 701, 702 destined to be supported by abutments of the upper cover 578 to enable the compressing of the mixture in the mold under high pressure, and thus to guarantee the pushing back of the surplus mixture in a kneadable and moldable condition. Accordingly the upward movement piston 71 of the upper screw press of the auxiliary press is provided with two abutments 655 656 (FIG. 11), which are in contact with the abutments 653, 654 of the lower cover 643. With such an equipment for feeding the first mixture into the molds piled upon each other, this mixture is fed from the first compartment of the feeding device illustrated in FIGS. 13 and 14 by the allocated dosing chamber, the allocated movable facility for the adjustment and control of the dosing and the driving back into the container 684. The thread shaft 167 of the main press is thereafter moved to its lower deadpoint, so that the feeding opening 690 of its container 689 with the right-angled feeding opening 691 of the container 684 is adjusted in alignment and their openings 692 to 695 align with the openings 613 to 616 of the feeding cylinder 601, 602 and the molds to feed the mixture into each mold. As regards the two first variances, the containers 684 and 689 are isolated from the closed space during the compressing phase under high pressure, in order to prevent any risk of an agglomeration of the surplus mixture or the mixture in the container 689, and in the openings 613 to 616 of the feeding cylinder 601, 602. The surplus mixture in the container 684 is driven back to the feeding device in the previously described manner. Advantageously the first mixture is to be used for forming the body of the tire and the thread (of the wheels).

After completion of this working process the pistons 188 and also the shaft 187 are driven back to their upper position. The feeding device is set into rotation in order to enable the feeding of the second mixture from the second feeding compartment through its own dosing chamber with changeable volume 16, 17 of the allocated control device for the dosing and the feeding back into the empty shaft 69 of the lower feed screw press of the auxiliary press which is moved upwards to its upper deadpoint, in order that the feeding opening 705 of the container positioned near its cover 706 is in alignment with the distribution opening 691 of container 684, and that the distribution openings 707 to 710 of container 704 are in alignment with the feeding openings 613 to 616 of each special mold, so that the inside of the container 684 is connected with the inside of the molds. This second mixture is particularly used for the forming of the flanks of the tire. The feeding of this second mixture is performed by a process identical to that of the first mixture by the piston 188 of the main press, whereby the central shaft 167 of this press is kept in its upper deadpoint.

Furthermore such an installation has devices to feed oil into the chambers of cylinders 507 to 514. This feeding goes synchronically with the operation of the feeding element of the main and auxiliary press to control the movements of the arc-shaped segments 531 to 518 in such a way that an outer pressure is exerted on the mixture fed into the mold, whereas the inner pressure is caused by the air in the air tube 667, 668. The lower and upper pressure are exerted by the pressing tools 188 and 71 of the main press of the auxiliary press with the help of the lower cover and the upper cover and the allocated vertical support leg.

When finishing tires based upon carcasses, the latter before fed into the mold are fixed on the rims 657, 658 which by this means cover the air tube 667, 668. The carcasses are expanded to the desired form by the air pressure contained in the air tube 667, 668.

The various systems for the feeding with air and oil of the installation are programmed in such a way that a slow and continuous closing of the molds is possible, whereby the surplus of mixture is removed in the manner described below.

The chemical and thermal treatments of the tires is realized by feeding with suitable treating and heating devices by the pipes as previously described, which in a programmed manner are particularly fed by valves controlled by cams which are provided on the fixed platform 4 in the various sectors of the working unit. After the set of specific molds of the carousel are moved in all thermal treatment sectors of the installation, they are transported to the dickering sector into which at the same time the totality of the tires are unloaded, and the molds are fed with new carcasses, as will be described later on with reference to FIG. 23.

The installation equipped with the molds as previously described, can be used for the manufacture of tires of different composition by simple programming of its operational manner according to the suitable technical process. This basically automatic adaption is based upon characteristic features of the installation and particularly on the integrated molds with the following advantages:

The installation is adaptable for the manufacture of tires of all dimensions by simply exchanging the molds;

The increase of the volume of manufacture can be adjusted to the requirement by exchanging or lengthening the elements carrying the molds 350, 357, 591, 592, and by increasing the number of molds, whereas the decrease of the production can be effected by closing a desired number of mixture passages 692 to 695 and 707 to 710 provided at the bottom of the upper and lower feeding cylinders 689 and 704, respectively.

Figure 15:
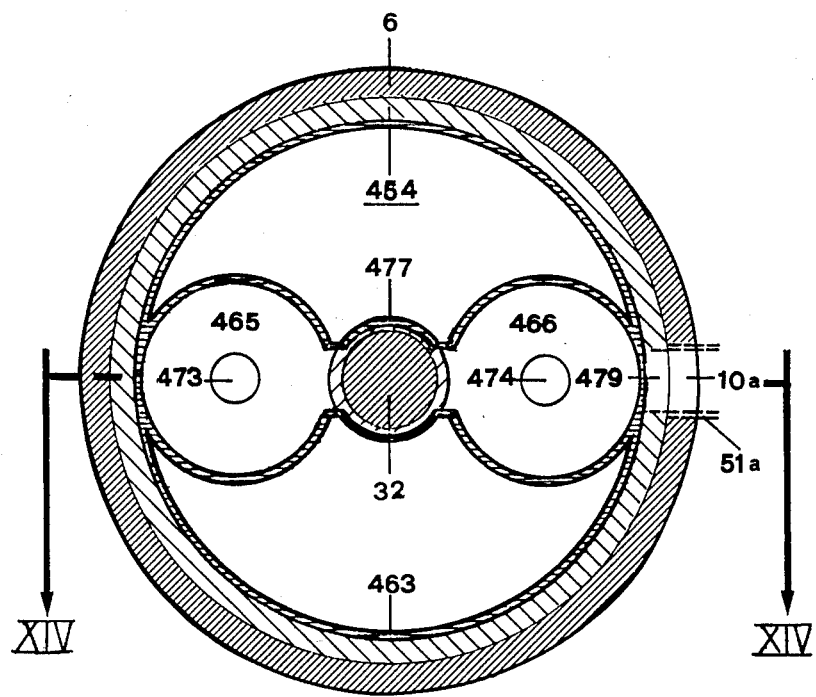
FIG. 15 represents a horizontal section along the line XV—XV of FIG. 14.
Figure 16:
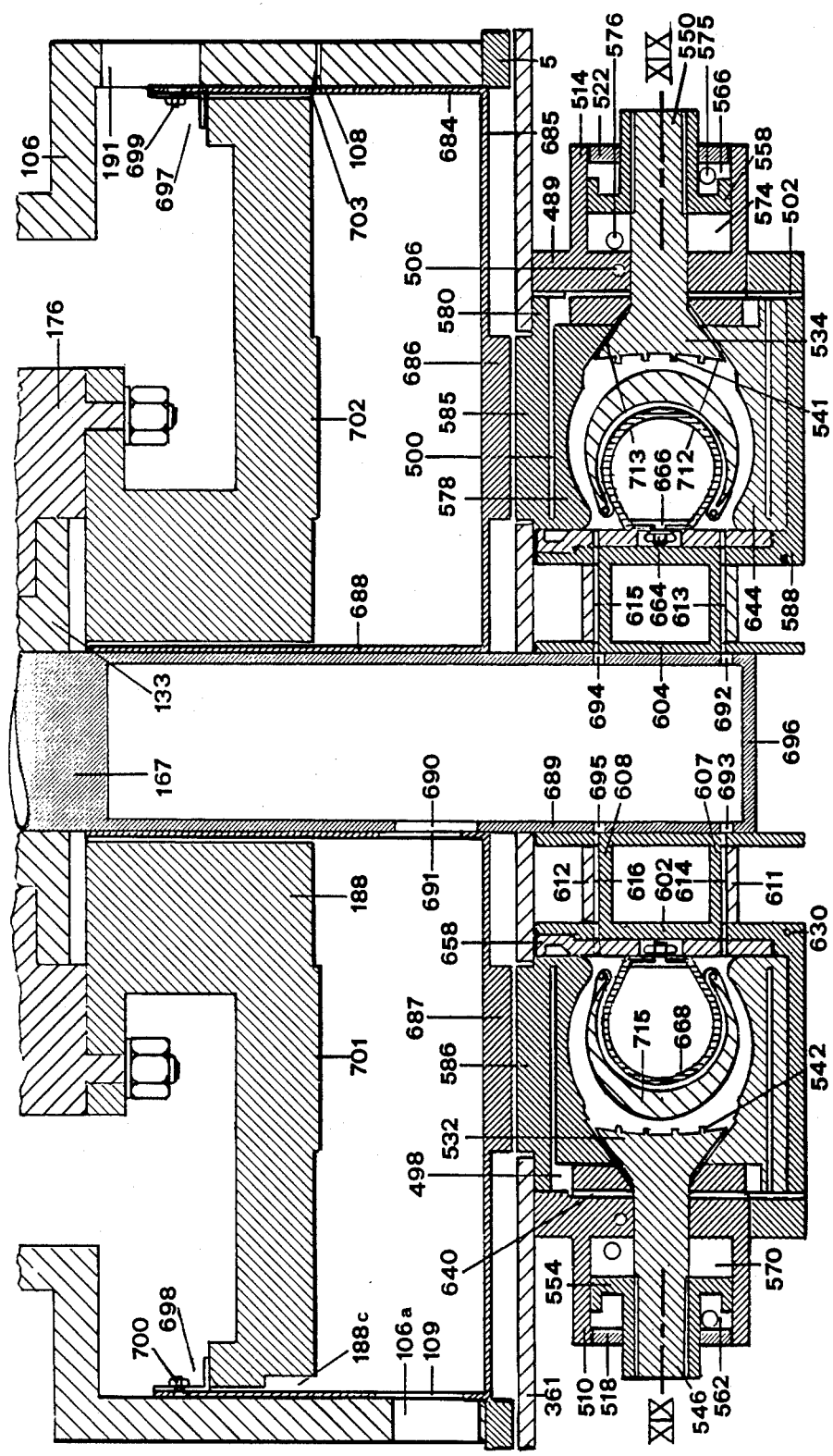
FIG. 16 shows in an axial section the upper part of a third variant of the carousel developed for the production of tires and is placed in that sector of a working unit which has the pressing elements, whereby the carousel is shown during the phase of the feeding of the first mixture.
Figure 17:
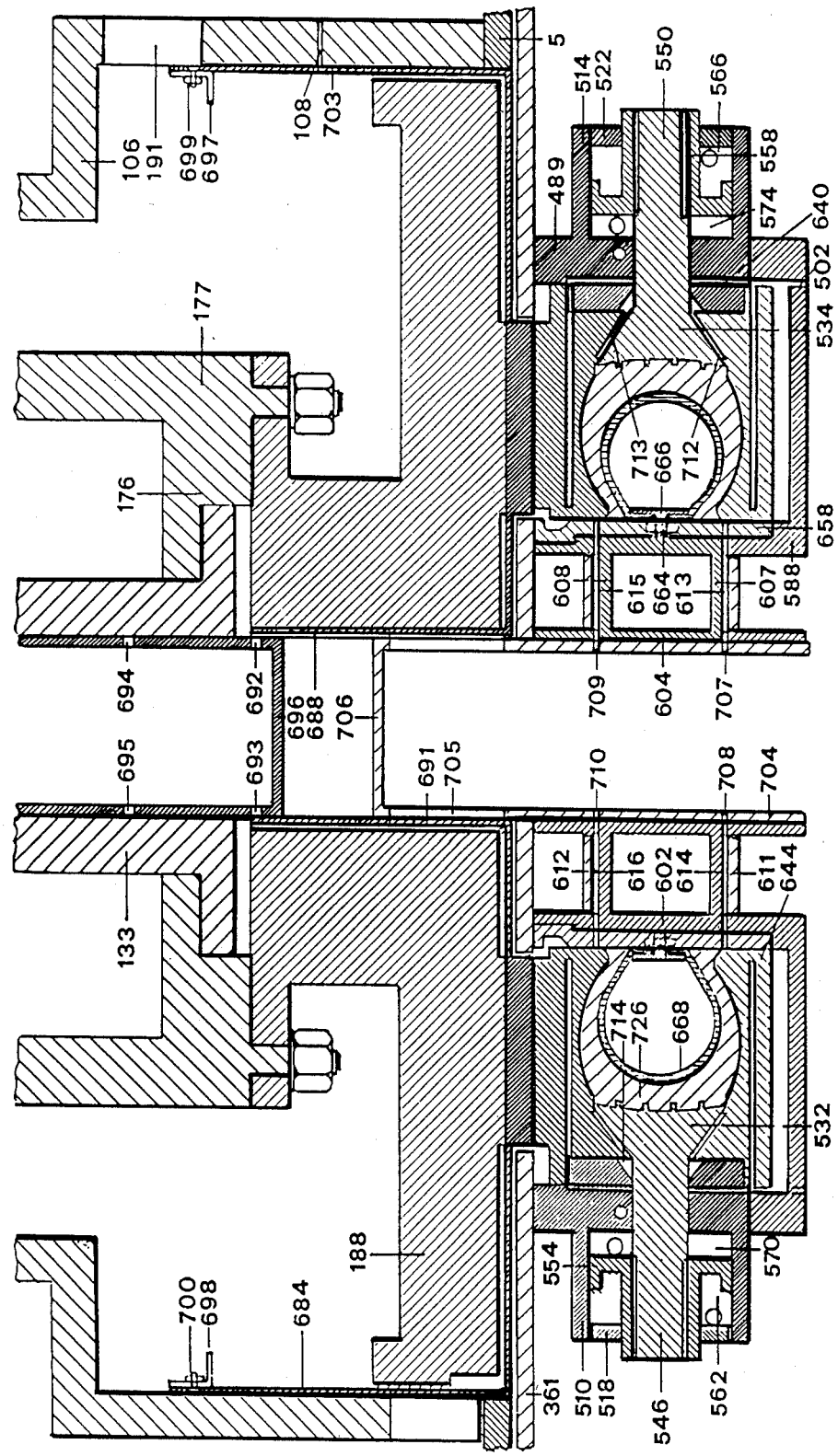
FIG. 17 represents the carousel as shown in FIG. 16 after the feeding with a second mixture at the end of the compression phase.

The feeding of the molds can be accelerated by accelerating the working cycle of the feeding devices illustrated in FIGS. 13, 14, 15, whereby the entrance into the mold is sufficiently big to accept the mixture penetrating under low and high pressure, and the possible surplus is pushed back through the small openings 711 and the splits 712, 713 for the outlet of the air and the surplus mixture.

The feeding of the molds can be performed in various layers of different composition by pressing devices on one or more fixed consecutive sectors of the carousel, increasing at the same time the number of the feeding parts illustrated in FIGS. 13, 14, 15.

The opening and closing degree of the mold is space- and time-wise completely controllable. In spite of the pressure of the mixture during the feeding on the bottom 685 of the movable container 684, it is not lowered until the rams 543 to 550 of the segments 531 to 538 are pushed towards the center of the mold.

The closing of the mold is specifically programmed for each special case according to the requirements of the technical process. It can be performed during the feeding in different steps by consecutive closing and opening which is done synchronously with the feeding program, whereby the mixture surplus is always pushed back from the inside by the feeding device, and from the outside by the mouth 714 connecting the arc-shaped cuttings or nuts 527 to 530 for the outlet of the air and the mixture surplus.

At the moment when the mold is definitely closed under high pressure, the feed back openings are closed. The quantity of the mixture contained in the molds exactly corresponds to the mass of the final (finsihed) tire. The compressed air starts to stream through the pipe lines 631, 633, 625, 626, 601, 602 and the valve 674, 680 allocated to the air tube 667, 668 synchronously with the outer pressure exerted by the converging segments 531 to 538 and the upper covers 577, 578 and the lower covers 643, 644 which are all exposed to the pressure of the abutments 701, 702 of the tool piston 188 of the main press 686, 687 of the movable mixture container 684 and the abutments 655, 656 to lift the upward movement plate 71 of the upper feed screw press.

Before the return of these abutments into their basic position the specific driving shafts 358, 359 of the upper molding supports are set into motion in a synchronous way and in opposite direction in order to come to a stop in a stop motion device not illustrated. As soon as the abutments 585, 586, of the mold positioned at the angle point of the mold column as well as the abutments 653, 654 of the mold positioned in the lower part of the column, are outside the openings allocated to the upper movable plate 361 and the lower movable plate 343. By this means these movable plates 361, 343 keep all molds piled above each other in the specific column in a closed position during the whole duration of the treatment, and at the same time cause a backpressure of the steam 501, 502 in the vertical channels, and of the cool air 370, 371 in the molds through the allocated backpressure openings provided in the lower movable plate 343, in order to adjust the latter to the specific openings 370, 371 and the allocated valves 368, 369 of the first fixed circular platform 4 during each stop of the carousel.

For the manufacture of tires the working cycle of the installation is mainly destined as a function of the duration of the thermal, chemical or analogous treatment which is prolonged by the duration of the mecahnical treatment or the unloading. Consequently each specific tire has to be kept in its mold during the whole period of this thermal, chemical or other treatment, whereby the operation of the mold is prolonged for the longest duration of the period of the mechanical treatment and of the duration of the unloading. The total duration of the working cycle of each special mold which is to be divided by the number of the sectors of the carousel, results in the duration of the working cycle which also applies to each sector, or for all molds piled upon each other in each specific sector.

That means that the productivity of the installation rises with the increased number of molds which are equally positioned in all sectors of the carousel. For instance, in a carousel with six sectors each of which is equipped with a column of 25 molds piled above each other for the manufacture of tires, requiring a length of time of 20 minutes for the thermal-chemical treatment, a duration of 2 minutes for the feeding and mechanical treatment, and an unloading time of 2 minutes, the working cycle is fixed on 4 minutes, whereby the thermal-chemical treatment already starts in the mechanical sector and continues in the discharge sector. The installation supplies 25 tires every 4 minutes, that means 375 tires per hour, 9,000 tires every 24 hours, and 3,150,000 finished tires in 350 days in a continuous operation.

If the volume of production of the same installation is to be increased to 5,000,000 tires a year, in each of the six sectors 40 molds instead of 25 as described above, have to be piled up upon each other. This effects an increase of the height of the column by 60% and consequently a complicated, if not prolonged treatment during the feeding and unloading process. In order to remove this inconvenience, the installation has to be equipped with a carousel which has 10 sectors each of which contains a column of 25 molds piled upon each other rotating around the central body 6 with a working cycle of 144 seconds with the same duration for the mechanical treatment and an unloading of 2 minutes, with a duration of the thermal-chemical treatment of 20 minutes, as described above. The installation thus produces 5,040,000 finished tires in 350 working days which means an increase of production by 60%. The installation therefore has the same height whereas its total diameter is increased by only 2 meters of the carousel with sex sectors. The space requirement and the number of the remaining elements of the installation, the press forming element, the feeding element and the unloading device are not changed.

This clearly illustrates the important advantage of the installation according to the invention for the decrease of the infra structure necessary for the manufacture in a continuous working program and for molded articles of a great volume of production, at the same time the extent of manual work is reduced by a complete automatization of the installation. The latter enables at the same time the application of different techniques of which, as an example, some variances are described which are nearest the conventional technique:

Each mold is provided with a carcass manufactured in a conventional manner, or a used-up tire to be renewed which is covered with an elastic tape. The feeding is suppressed and the task of the installation is reduced to the vulcanizing of carcasses or tires contained in the mold during a length of time for mechanical treatment reduced to 10 seconds, whereby the unloading time amounts to 2 minutes and the working cycle to 133 seconds. The installation operating with 10 sectors and in the way described above, produces 5,682,600 finished tire in 350 working days.

Each mold is tipped with a metallic carcass produced by soldering of metal wire and which rests with its total inner area on a suitable rubber coated cloth, the boarders of which are imbedded on both sides in thickened rubber coatings, and bent upwards around heels together with the columns of the metallic carcasses, in order to be fixed together in the said rubber coatings by a prefabrication press, which operates simultaneously from both sides of the carcass, whereby the installation is equipped with one or more pressing elements provided around the cylindrical body 6 according to the choice of the tire manufacturer, in order to allow the placing of these carcasses in a number of mixture layers of different composition consecutively sprayed, and which, if necessary, are stepwise vulcanized on each other, in order to produce a tire of the quality desired.

In another case the carcass is prefabricated on the same press as mentioned above, however without a metallic carcass, which in this case is exchanged by an air chamber with a thick wall resting on a rubber-coated cloth, finally swelled with a certain pressure having a form and a height which is adapted to the dimensions and the profile of the tire to be manufactured, whereby their boarders are bent upwards around heels together with the boarders of the cloth, and fixed as in the example described before, in order to form by this means the base of the tire which is stepwise combined with the following layers of mixtures with suitable composition by consecutive vulcanizing of one layer to the next.

This kind of carcass is suitable for a prefabrication in one piece with its own rim which allows the manufacture of the tire in a position mounted on the rim, which is simply assembled on the wheel of a vehicle and fixed thereon.

Of course, numerous other solutions may be considered. Howevr, the aim of the invention is to offer the tire manufacturers a tool with the help of which they may finish a new tire according to their own ideas.

Figure 23:
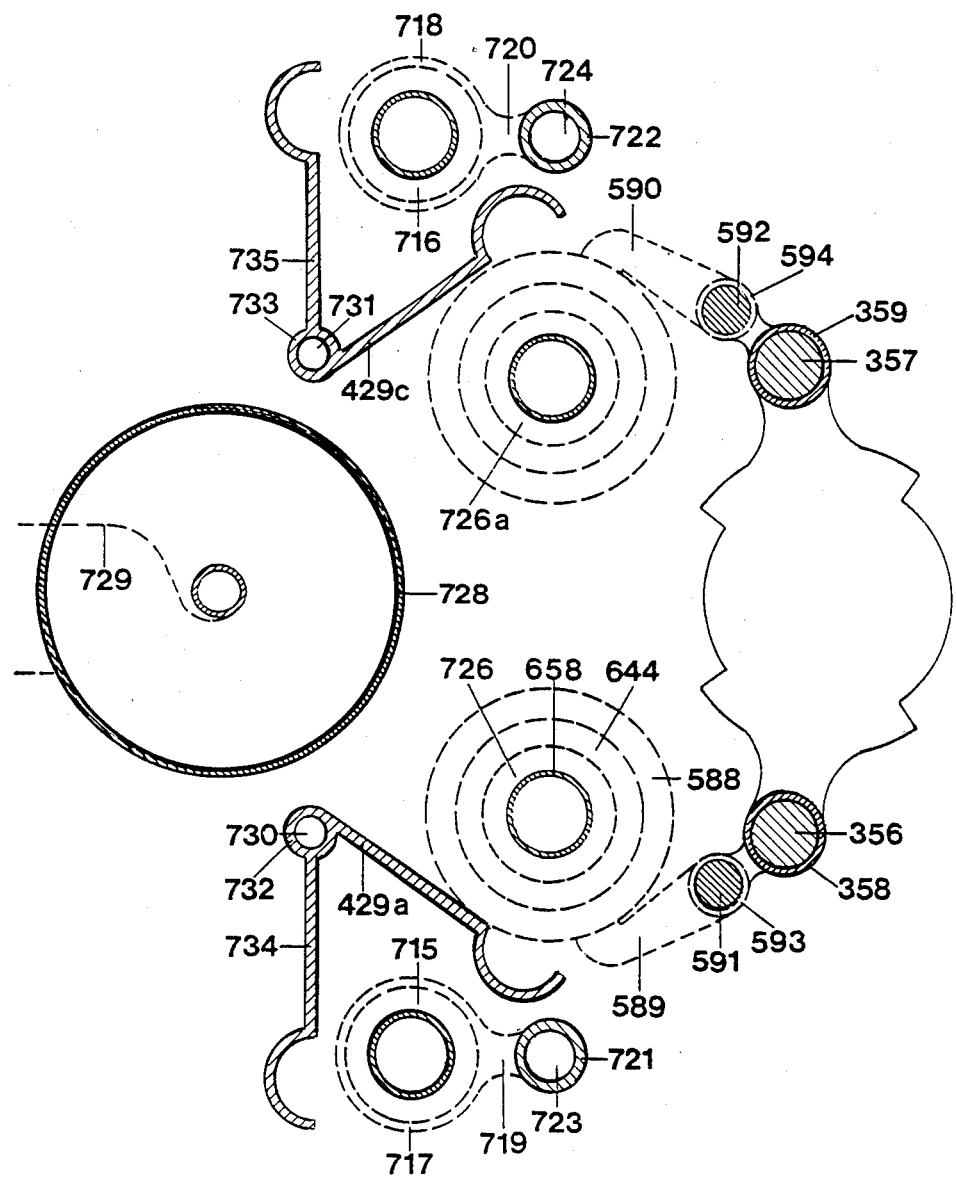
FIG. 23 shows in a horizontal section the molds of the carousel which are placed in the opening and emptying sector of a working unit after the separation of the respective upper parts of the molds as shown in FIG. 22, and the system for the output of the finished tires and for the input of new carcasses.

With respect to FIG. 23, in the following the working manner of the devices for the output of the tires are described contained in the molds which are piled upon each other in a specific column of a sector of the carousel. After the column has carried in the discharge sector, it comes to a standstill. Thereby the channels 501, 502 for the backpressure are positioned above and are connected with pipes 368, 369 above their oval head valves which are open at the moment of the stoppage, by openings belonging to the lower movable plate 343. After that, possibly during a certain period, the articles are subject to the last phase of the thermal, chemical or analogous treatment. At the end of this treatment the starting valve of the condenser of the heat boiler not illustrated, is opened and the total quantity of steam contained in the molds of the said columns is pushed back. The driving shafts are again set into rotation, whereby the driving shaft 358 takes all closed odd-numbered molds with their right outer common rod 591 to the right discharge place, and the driving shaft 359 takes all even-numbered molds with the left outer common rod 592 to the left discharge place, whereby the two common rods 591, 592 slide on the surface of the lower fixed platform 4. By this means the only mold column is divided into two halves containing molds which are sufficiently far (away) from each other in order to enable the removal of the tires by sliding of the segments 531 to 538 to the outside, and the upward movement of the upper cover 577, 578 as well as the downward movement of the lower cover 643, 644 which allows the lower area to be lowered by letting down the common rods 591, 592 with the help of the hydraulic levers 598 and thus to separate the tires 725, 726 from the body of the mold and of the upper cover, as they are moved with the lower part by the rim. The driving shafts 358, 359 are then set into return movement, so that the upper parts of the mold set free may return into the carousel in which they are possibly lubricated by effective components against adhesion with the help of a sprayer.

At the same time the finished tires 725, 726 carried by their rims 657, 658 and with their height are piled on their plates 587, 588 tightly fixed with the common rods 591, 592 and are assembled at their specific discharge place at an equal distance from a carcass supporting element 719, 720 which by sliding of its cylinder 721, 722 on the fixed shaft 723, 724 is movable, as well as at a common discharge tower 728 formed by a movable transport shaft 729 and a fixed shaft 730, 731. A movable cylinder 732, 733 is assembled on this fixed shaft 730, 731 provided with a pair of arms positioned at a distance equal to that which separates each plate forming the lower mold supporter 587, 588 and the plates 717, 718 of the carcass supporting element 719, 720.

Figure 24:
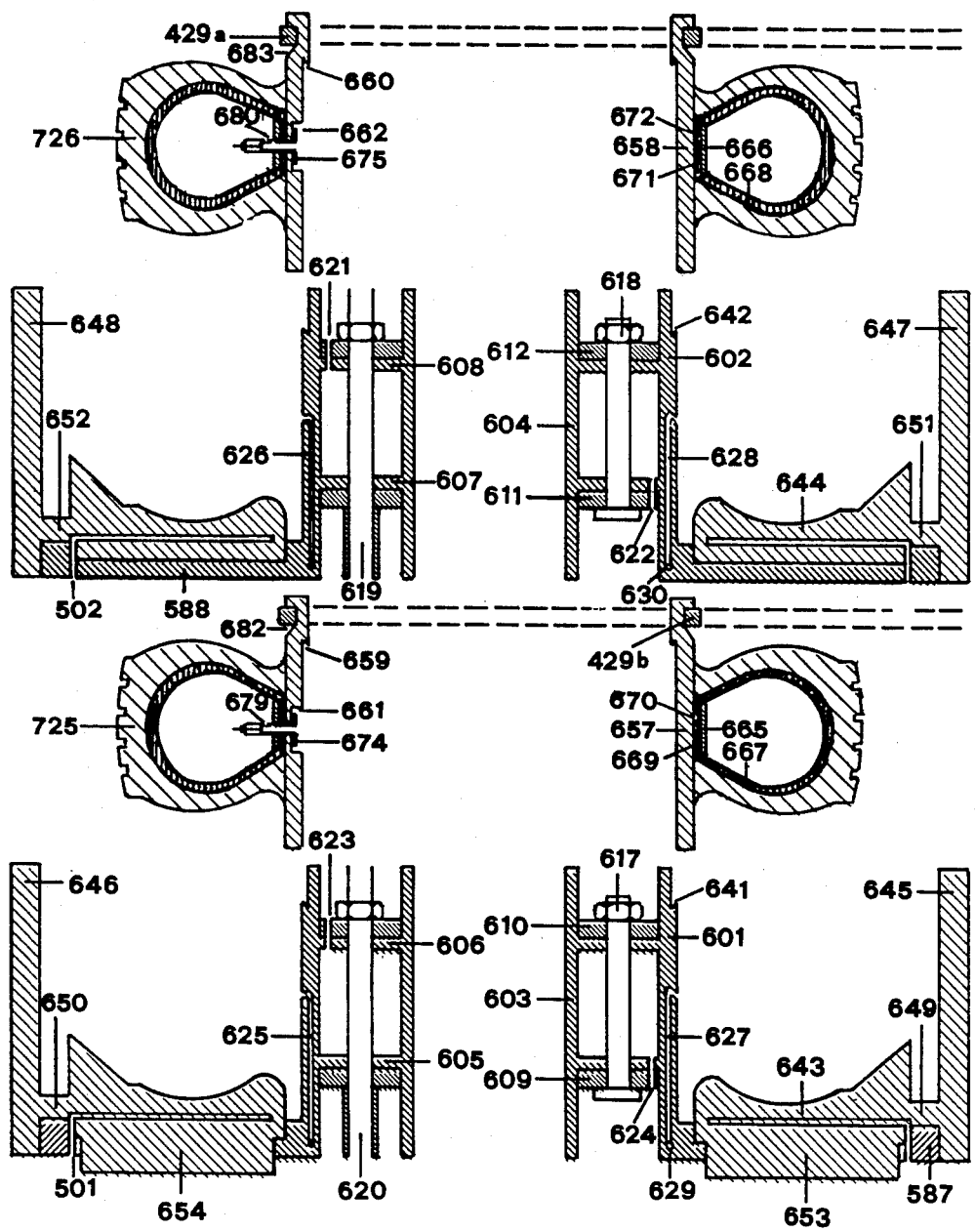
Figure 25:
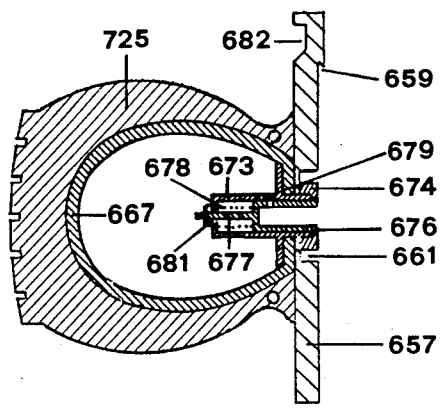
FIG. 25 is a section view showing the flap valve for a fluid under adjustable pressure in the tire during and after its production.
Figure 26:
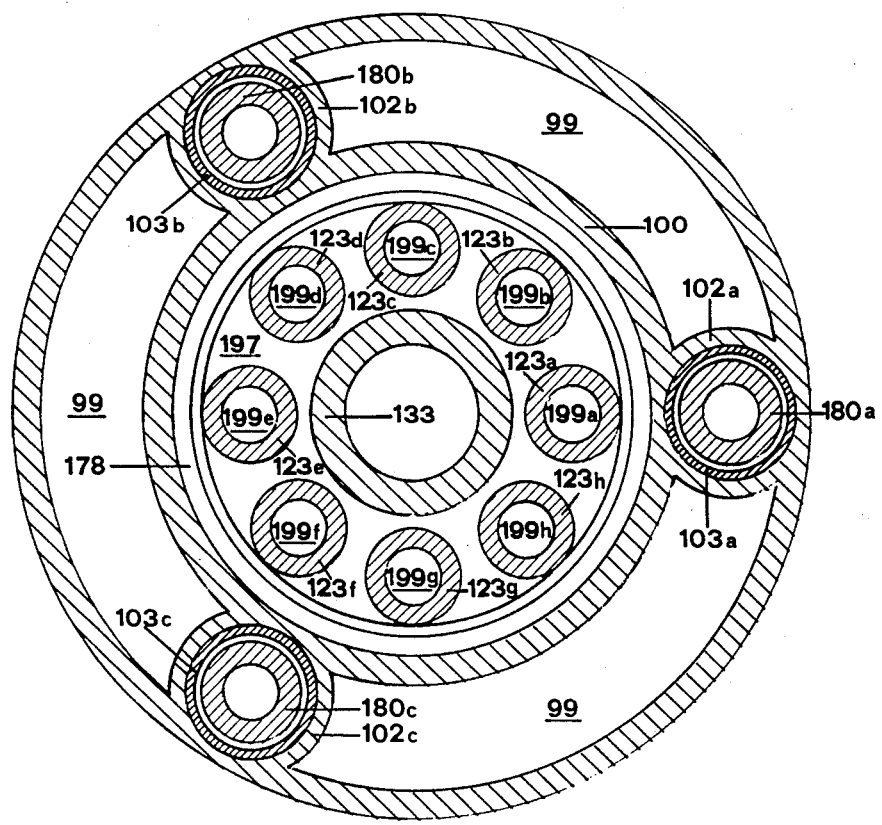
FIG. 26 is a section of a portion of FIG. 19 of the main press.

All arms of these different pairs of arms have an equal length and show at their ends a bowed part which is particularly half-cylindrical and shows an inner diameter basically equal to the outer diameter of the rims. Under the effect of the rotation of cylinder 732 the first arms of each pair of arms 429a, 429c contact the rims 657, 658 carrying the finished tires 725, 726, as illustrated in FIG. 24. The second arms 734, 735 of each pair of arms at the same time receive the rims not numerated provided with new carcasses 715, 716 which are positioned on the carcass supporting element 719, 720. After an upward movement of the arm supporting cylinder 732, 733 by a hydraulic system (not illustrated) and by sliding on the fixed supporting shaft 730, 731, the arms 429a, 429c each separate the finished tires from the lower cover of the mold, and the arms 734, 735 at the same time the rims carrying the new carcasses from their supports 719, 720. A new rotation of the arm supporting cylinder 732, 733 allows the finished tires with their specific rim to move into a position above the conveyor 728, and the rims with the new carcasses into a position above the support of the lower molds. Thereafter, after the deposit of the finished tires with their rims into the discharge tower 728, and of the rims with their new carcasses into the supports of the lower molds 587, 588, the arm supporting cylinder 732, 733 is turned into its basic position, and the driving shafts again take the upper mold parts to their discharge place, in order to connect them with their specific lower part tipped with new carcasses, and subsequently take back the two newly formed mold half-columns into the carousel, or to form a single mold column.

Advantageously the lower part of each mold is lubricated with an effective element against adhesion after the removal of the finished products. The varied examples of manufacture as described before demonstrate the great adaptability of the installation according to the invention, to the manufacture of articles of any kind whatsoever without having a disadvantageous effect on the productivity of these articles articles. This adaption is effected in a simple way by exchanging or altering individual easily accessible elements. Such an installation is consequently simply applicable in a manufacturing place which is to produce various articles during the period of a year which are of a different form and require different kinds of treatment.

I claim:

1. In a plant for a manufacture in an automated and continuous manner of agglomerated, sintered and vulcanized articles, which are formed by converting and pressing materials, including minerals, synthetics, mixtures and alloys, which has at least one forming element to press or compress materials fed into a mold by feeding elements, at least one element for a thermal, chemical, mechanical or similar treatment of the pressed articles, and at least one device to remove manufactured articles from the mold, the improvement wherein a frame is provided which carries the whole plant, in order to feed the material into one or more working units positioned on the frame around the feeding elements, whereby each working unit is divided into fixed sectors each serving as a base for a press forming element and/or treatment element and/or one element for the removal from the mold are tightly fixed on the frame and a carousel is fixed on the frame, said carousel being provided with a number of mobile sectors equal to the number of said fixed sectors and turning with respect to the fixed sectors for transporting part of each mold or the formed articles from one fixed sector of the working unit to the next fixed sector of the working unit.

2. The improvement defined in claim 1, wherein the mold or the molds of the articles to be manufactured by the cooperation of the mold elements of a working unit, and the pressing tool or tools of the press forming element or pressing element are formed during the feeding process of the products into the mold or molds.

3. The improvement defined in claim 1 characterized by the connection between the feeding device and the mold formed by the cooperation between the press forming device and the mold elements of the carousel, which is interrupted at the end of the feeding process, being automatically reestablished in an opposite direction as soon as the pressure exerted on the fed material approximates the pressure at which this material agglomerates.

4. The improvement defined in claim 1 wherein the frame of the plant has a cylinder (1) carrying the feeding device, and various platforms (2), (4), (5), (7) fixed around the cylinder (1) at different heights, whereby the platforms are held at their circumference by a vertical supporting structure and whereby the working unit or units are fixed on the platforms.

5. The improvement defined in claim 4 characterized by the distance between the platforms is adjustable.

6. The improvement defined in one of the aforementioned claims, characterized by the feeding device has at least one opening (9) to distribute the material formed and divided in the outer mantle of the feeding device, whereby at least one of the distribution openings ends in the sector of a working unit which has a press forming element.

7. The improvement defined in claim 1 wherein a press forming element having a press indicated as an auxiliary press or a press indicated as a main press which are positioned on the platforms (2), (4), (7) of the frame above and opposite to each other in such a way that between their pressing tools a space for the performance of the carousel and their mold elements is created, whereby each pressing device of each press has mold elements in order to form the desired mold in cooperation with the mold elements contained in this sector.

8. The improvement defined in claim 7 characterized by the closing of the connection between the material feeding device and the mold is effected by high pressure of the pressing tool of the main press during the compressing phase.

9. The improvement defined in claim 7 wherein the auxiliary press is fixed underneath the carousel and has a cylinder (73) and a piston (77) contained in this cylinder and carrying a detachable pressing tool (82), whereby the piston is operated by a feed screw press which has a toothed wheel (57) in contact with a pinion drive (58) and a lead screw (59) in contact with a thread shaft (69) connected with the piston (77), whereby the lower end of the shaft is flanged on the fixed frame of the auxiliary press.

10. The improvement defined in claim 9, wherein the pressing tool of the auxiliary press has mold elements which are provided for cooperation with the mold elements of the carousel.

11. The improvement defined in claim 10 wherein the pressing tool (82) is slidingly arranged on the piston (77) and, for instance, is elastically kept by springs in its distant position with reference to the piston.

12. The improvement defined in claim 11 wherein the auxiliary press has a second feed screw press positioned between the piston (77) and the toothed wheel (57) of the first feed screw press, whereby this second feed screw press has an adjustable piston (71), a toothed wheel (64) in contact with a driving toothed wheel (65), and a lead screw (66) of a thread shaft (72) connected with the piston (71).

13. The improvement defined in claim 7 wherein the main press is a hydraulic, pneumatic or hydraulic-pneumatic or combined pneumatic explosion press, which has a pressing tool carrying mold elements and which serves to cooperate with the mold elements of the carousel and the mold elements carried by the piston (77) of the auxiliary press to form a mold, and a mantle defining at its lower end above the mold elements of the carousel a container (107) into which at least one distribution opening of the feeding elements ends, whereby the opening is particularly isolated against the mold by the pressing element of the main press during the compressing phase of the product at high pressure.

14. The improvement defined in claim 13, wherein the main press has an outer cylinder (95) forming the outer mantle of the press, whereby this mantle is fixed on one of the platforms of the plant, and whereby in its inside an oil reciprocating pump, a central cylinder, various cylinders or actuators (123a), (123b), (123c), (123d), (123e), (123f), (123g), (123h) are arranged, which are positioned around the central cylinder in a crown-shaped arrangement, and are fed with oil under pressure by the reciprocating pump, whereby each actuator or cylinder operates on a motor piston (176) of the press carrying the pressing tool (188) the form of which is adjustable to the article to be manufactured.

15. The improvement defined in claim 14, wherein the oil pump has an oil distributor for the hydraulic cylinders (123) which are in a crown-shaped arrangement, whereby the oil distributor is formed by a cylinder in the inside of the pump which has on a vertical wall thereof (147) a toothing in contact with a driving toothed wheel (149), we well as a turnable bottom (150), which is provided with a single opening for consecutive feeding of the hydraulic cylinders (123).

16. The improvement defined in claim 14 wherein the piston (144) of the oil feeding pump to the hydraulic cylinder (123) is operated by a feed screw press which has a toothed wheel (152) in contact with a driving toothed wheel (153) and a screw (156) in contact on a thread shaft (157) which is connected with the piston (144) of the oil pump.

17. The improvement defined in claim 15, wherein the main press has a second feed screw press for displacing the piston (168) of the central cylinder of the main press.

18. The improvement defined in claim 14 wherein the main press has at least one cylinder (102), one explosion chamber (742), one piston (180), suction (736) and discharge valves (738), detonating agent and elements to feed the cylinder with fuel, and a device to feed each cylinder (102) with compressed air which is formed by a fresh air suction valve (746) positioned at the lower end of the central cylinder (102) by an air feeding line (187b), whereby the air is compressed by the piston (168) of the central cylinder.

19. The improvement defined in claim 18, wherein the bar (739) of the discharge valve (738) of the cylinder (102) penetrates the motor piston (176) of the main press and has an element which forms at a part protruding above the motor piston a stop motion device (743) for effecting the opening of the discharge valve after, or according to a certain stroke of the motor piston.

20. The improvement defined in 18 wherein the suction valve (736) of the cylinder (102) has a longitudinal opening in which the body (740) of the discharge valve (738) of the cylinder (102) is slidingly and coaxially run on bearings.

21. The improvement defined in claim 1, wherein the feeding device for feeding the materials into the sector of a working unit includes a press forming element having an outer cylinder (6) which forms an outer mantle of the feeding device and is fixed on the cylinder (1) of the frame of the plant, and also having in a consecutive manner in the outer cylinder (6) at least one funnel (53) or a feeding channel for the material, at least one mixer, at least one mixture feeder and at least one device for the dosing control and pushing back of material, each of which is allocated to the distribution opening (9) developed in the outer cylinder (6).

22. The improvement defined in claim 21, wherein the mixer is connected with the mixture feeder by a double bottom with at least one opening (40, 46), whereby one of the bottoms is fixed and the other is to be set into rotation, for instance, by a toothed wheel (52).

23. The improvement defined in claim 21 wherein the mixture feeder is connected with each device for regulating the dosing and backpressure by a double bottom with at least one opening (17), (16a), whereby one of the bottoms is fixed, whereas the other one is to be set into rotation, for instance, by a toothed wheel (15).

24. The improvement defined in claim 21 wherein the device for regulation of the dosing and backpressure has a dosing chamber or a changeable volume, which is separated by a piston (27) carried by elastic elements and in which the distribution opening (9), the feeding opening (16a) and the backpressure opening connect the dosing chamber with the mixture feeder if the pressure exerted on the material fed into the mold exceeds the power of the adjustable spring of the elements carrying the piston.

25. The improvement defined in claim 24, wherein the piston (27) has a skirt (29) forming a back which protrudes into the dosing chamber for periodically covering the backpressure opening.

26. The improvement defined in claim 21 wherein the mixture feeding device has a shaft (32) on the main part of which an endless screw (30) is fixed for the transport of the mixture to the feeding openings (16), (17), (16a) of the double bottom, whereby the lower part of the shaft (32) positioned opposite the backpressure openings (21a) of the devices for regulation of dosing and backpressure has an endless screw (31), the lead of which is opposite to that of the endless feed screw (30).

27. The improvement defined in claim 21 wherein the mixture and the mixture feeding are divided into at least two vertical compartments, each vertical compartment having one material feed screw (475), (476) for the feeding of two different mixtures into the devices for regulation of dosing and backpressure, each of the devices being connected fixedly with a movable cylinder (13) which is set into rotation by a toothed wheel (15).

28. The improvement defined in claim 1, wherein the carousel is driven by a central shaft (226) which is held by one of the platforms (4) of the plant during its rotation, the carousel having at least one supporting frame (213) for a mold or mold elements in tight connection with the central shaft (226).

29. The improvement defined in claim 28, characterized by the carousel has a number of mold elements equal to the number of sectors of the respective working unit.

30. The improvement defined in claim 28 wherein a cylinder (245) forming a gas container is arranged around the lower part of the driving shaft of the carousel (226) divided into one lower and one upper chamber, whereby the upper chamber has a first line (248) for the feeding with hot gas, as for instance hot air, a second line (93) forming a connection with the upper chamber (247) defined by the piston (77) in the cylinder (73) of the auxiliary press, and a third line (249) connecting the hot air lines in the sector of the working unit forming the heat treatment element of the articles.

31. The improvement defined in claim 30, wherein the lower chamber of the gas container has a first line (94) forming a connection with the lower chamber (251) defined by the piston (77) in the cylinder (73) of the auxiliary press, a second line (252) for the feeding with fresh gas, for instance fresh air, and a third line (253) for the backpressure of hot gas, whereby the line is connected with the hot gas feeding line (248) of the upper chamber of the container.

32. The improvement defined in claim 1 wherein the axis of rotation of the carousel is formed by the axis of symmetry of the cylinder (1) of the frame and of the material supplier whereby the carousel has a number of mold elements which are equal to the number of sectors of all working units which are arranged around the cylinder (1) of the frame of the plant.

33. The improvement defined in claim 28 wherein the carousel has a box or drum (200) in the form of a crown fixedly arranged on the frame of the plant around the driving shaft (223), (226) of the carousel, whereby the mold elements supporting frames in the inside of the drum (200) are turned from one sector to the next of the respective working unit, and the cover and the bottom of the drum (202), (5) have suitable openings in the sectors of the working unit each of which comprises a pressing element and a device for removal or discharge.

34. The improvement defined in claim 33, wherein the mold element supporting frames are formed by a drum (213) arranged in the inside of the fixed drum (200) of the carousel, and set into rotation by the driving shaft (223), (226) of the carousel, whereby the drum (213) has in its upper and lower part opposite openings in which the mold elements are provided.

35. The improvement defined in claim 34, particularly for the manufacture of sintered articles, such as brake blocks, wherein the mold elements of the carousel are formed by a bottomless cylinder (222) having an upper flanged part supported by the movable drum (213) of the carousel and which carries a cover (231) provided with an opening equal to the form of the mold elements which are carried by the pressing tool of the main press, the carousel being further provided with a shaping and molding cylinder (232) positioned in the inside of the bottomless cylinder (222), whereby each pressing tool of the main and auxiliary press has mold elements which cooperate with the cover (231) and the molding cylinder (232) to form the mold for the brake linings.

36. The improvement defined in claim 35, wherein the mold elements carried by the auxiliary press are formed by a plurality of vertical plates or forks (82) arranged at a distance from each other to create a space between them the form of which corresponds to a brake lining block, whereby the forks (82) by the upward movement of the piston (77) of the auxiliary press are passed through openings which correspond to a female tool provided in the opening of the bottom (5) of the fixed drum (200), the mold elements carried by the main press being formed by a disk-shaped plate which has a form equal to the opening in the cover (231) of the mold elements of the carousel, whereby the pressed material forms a supporting plate (240) for the brake lining blocks defined between each fork (82), the thickness of which corresponds to the end distance between the upper ends of the forks (82) and the lower part of the disk carried by the tool of the main press.

37. The improvement defined in claim 36, wherein a u-shaped developed frame (237) is provided at the inside of the upper part of the molding cylinder (232) forming a guide surface for the outer forks, (82), whereby this frame is embedded in the pressed material which forms the supporting plate (240) of the brake lining blocks (239), for providing a gripping device for the handling of all the brake lining blocks.

38. The improvement defined in claim 37, wherein a device for the tooling and supply under high speed of at least one unit of brake lining blocks (239) connected with each other by their supporting tape (240), which is carried by an u-shaped frame (237) and unloaded by the carousel of a working unit, the device having a cylinder (256) the upper part of which is divided into three levels (256a), (256b), (256c) positioned above each other, each of which has a height which basically is equal to the height of a brake lining block (239), and furthermore characterized by the device carrying a central shaft (257) which again carries shafts (259), (258), (301) forming side-heads for the tools for the centrifugal treatment of the brake lining blocks (239), the device being fixed at the upper part of the cylinder, (256) advantageously for the feeding of two total units of brake linking blocks with their supporting tape (240) of two opposite openings of the cylinder, (256) as high as the third upper level (256c), as well as a further device for the discharge of the tooled and cut brake linings which are positioned on the cylinder, (256) at the height of the first lower level (256a), for the simultaneous discharge of all brake linings which are manufactured by the working operation of a brake lining block.

39. The improvement defined in claim 38, wherein the device for feeding the brake lining blocks has guide walls (266), (267) and a toothed wheel system (278), (279), (280), (281), (282), (283) in order to bring the outer block of each total unit of brake linking blocks in contact with the tools for the centrifugal treatment which are provided in the upper third level (256c) of the cylinder (256) and carried by the side-head shaft (301).

40. The improvement defined in claim 38 wherein a cylinder (290) being provided in a vertical, sliding and turntable position at the inside of the cylinder (256) for forming a supporting element for brake linking blocks (239a), (239b) separated from the supporting plate (240), and to move these brake lining blocks one after another into the first, second and third level of the cylinder (256).

41. The improvement defined in claim 40, wherein the cylinder (290) being cut out in an upper part thereof above a height which is at least basically equal to the height of a brake lining block (239) for defining cylinder segments (291), (292) positioned opposite each other and forming the support area, whereby a mainly central part of these segments (295), (296) has a smaller thickness and on its lower area is provided with a grinding rest (297).

42. The improvement defined in claim 38 wherein the side-head shaft (301) provided in the third story (256c) of the cylinder (256) is slidingly mounted on the main shaft (257) and connected with this shaft (257) by a screw-shaped ramp (305) for reflecting and upward movement of the side-head shaft (301) with a predetermined free motion.

43. The improvement defined in claim 41, characterized by the centrifugal tools carried by the side-head shaft (301) are mainly saws or centrifugal cutting tools or grinding tools.

44. The improvement defined in claim 38, wherein the centrifugal tools provided in the second central level (256b) of the cylinder (256) are mainly formed by cutting or boring tools and carried by the side-head shaft (258) detached from the main shaft (257) and set into rotation in an independent manner.

45. The improvement defined in claim 1 wherein the carousel has a cylinder (344) which is rotatable around the feeding device and carried between two central platforms (4), (5) of the frame of the plant, whereby this cylinder comprises a bottom (343) which has two openings for each sector of the carousel, which are respectively developed according to the dimensions of the mold elements carried by the tool (71) of the auxiliary press, and furthermore by having a cover (361) provided with one opening for each sector of the carousel, the diameter of which is equal to that of the pressing tool (188) of the main press, whereby the cylinder is set into rotation around the feeding device by a driving device similar to a toothing comprising toothed wheels (355), (354).

46. The improvement defined in claim 45, wherein the cover (361) of the cylinder (344) has two openings in each sector of the carousel, which are positioned outside the space of the main press with respect to the feeding device to allow the passage of a core (360), (384) of the driving shaft (258), (259), which is connected with part of the mold elements of the same sector, whereby the discharge of the molds from the carousel and the removal of the products in the discharge sector or removal sector of a working unit may be performed by setting the driving shafts (358), (359), into rotation by a driving system which is fixed on one or more platforms of the frame of the plant.

47. The improvement defined in claim 46, wherein the driving system of the driving shafts (358), (359) has a toothed wheel (341), (342), in each discharge or removal sector of the working unit, in contact with a toothed wheel (363) fixed on each core (360) of the driving shafts (358), (359) when the carousel pushes the articles to be removed or to be discharged into a discharge or removal sector of a working unit.

48. The improvement defined in claim 46, wherein each sector of the carousel has a channel system for a medium, for instance hot air, connected with a suitable medium source by channels (364), (365) bored into the specific driving shafts (358), (359), whereby these channels each have an element forming a valve (366) for the automatic control of the feeding of the molds according to the treatment desired in each sector of the carousel.

49. The improvement defined in claim 45 particularly for the manufacture of tubes, for instance of asbestos cement provided with flanges, wherein the mold elements in each sector of the carousel are formed by vertical half-cylindrical mold elements (395), (396) arranged in two rows, for forming in a cooperative way the molds for one or more tubes, whereby each mold element is connected with an arm tightly fixed on the driving shaft (358), (359), and also by the mold elements in each sector of the carousel being formed by a tube or cylinder (446), (447) provided at the inside of each mold and having an outer diameter equal to the inner diameter of the tube to be manufactured, whereby this tube or this cylinder (446), (447) is removably held by detachable rings (403), (404) on the bottom (343) of the cylinder (344) of the carousel, and whereby the pressing tool (71) of the auxiliary press which has two elements (655), (656), the diameter of which is adapted to the inner diameter of the cylinder (446), (447) in order to form elements for the fastening and centering of the cylinder (446), (447) during the molding phase of the tubes to be manufactured, whereby the tool of the main press comprises devices to form the fastening holes in the flanges of the tubes to be manufactured.

50. The improvement defined in claim 45 particularly for the manufacture of tubes of asbestos cement according to a centrifugal process, wherein the inner cylinder (446), (447) is formed by side-head shafts (407), (408) which are provided with centrifugal tools at their circumference, and also by axes or shafts (415), (416) for fastening and rotation and carried by the pressing tool (71) of the auxiliary press, whereby each side-head shaft (407), (408) has axial boring holes (409), (410), (411), (412) which each cooperate with fixing axes (425), (426) developed at the pressing tool (188) of the main press.

51. The improvement defined in claim 50, wherein the driving shafts (415), (416) provided on the tool of the auxiliary press, has toothed wheels which are set into rotation by a toothed wheel (352) which is tightly connected with the axis (353), (69) of the lower feed screw press of the auxiliary press.

52. The improvement defined in claim 1, particularly for the manufacture of tires using molds with or without carcasses, wherein each sector of the carousel have various molds which are stacked above each other to form at least one vertical column, whereby each mold has a central feeding line (601), (602), (603), (604) around which a central body is arranged which is formed by various horizontal or adjoining segments (531)-(538) and elements defining a ring, whereby these elements have upper and lower chamfered walls as well as chamfered side walls, so that they may slide easily with respect to each other, and each mold have furthermore an upper movable cover (577), (578), the lower part of which is chamfered and which has a form corresponding to the chamfered surface of the segments (531)-(538), a lower movable cover (643), (644), the form of which is identical with that of the upper cover, and a rim (657), (658) of a cylindrical form with a first screw-shaped ramp (659), (660) in cooperation with a second screw-shaped ramp (641), (642) developed according to the ramp at the outer wall of the allocated feeding cylinder (601), (602), whereby each central body and the upper cover of a mold is built into a block which forms an upper mold support (488), (489) fixedly connected with the driving shaft (358), (359) by an arm (490), (491) in order to effect the rotation of the block out of the carousel into the discharge or removal sector, whereas each lower cover of a mold and the allocated feeding cylinder (601), (602), (603), (604) are positioned on a plate (587), (588) which forms a lower mold support which is connected with a cylinder (593), (594) of each sector of the carousel outside the space of the main press by an arm (589), (590), in order to enable the horizontal swing of the lower mold support outside the carousel into the discharge or removal sector of a working unit.

53. The improvement defined in claim 52, wherein each segment (531)-(538) forming the central body of a mold is connected with a piston rod which is built into a specific cylinder developed in the upper mold support (488), (489), whereby the horizontal movement of the segment (531)-(538) is effected by the movement of the pistons in the allocated cylinder by feeding a pressure medium, such as oil, into the feeding lines and oil discharge lines which are bored into the upper mold supports (488), (489), the arm (491), (492) and the driving shaft (358), (359).

54. The improvement defined in claim 52, wherein each upper and lower cover (577), (578), (643), (644) has abutments (585), (586) which form support areas for the respective abutments of the pressing tools (188), (71) of the main press or the auxiliary press, for the vertical movement of these covers and for the compressing of the material in the mold.

55. The improvement defined in one of the claims 52-53, characterized by two materials are progressively fed into the molds like previously prepared mixtures, meaning a first mixture to form, for instance, the body and tread of the wheels, and a second mixture to form the flanks of the tires, whereby the first and second mixture are each contained in the first and second mixture feeding compartment of the mixture device of the plant.

56. The improvement defined in claim 55, wherein a movable feeding container for the first mixture is formed by a cylinder (689) which is fixedly connected with the lower end of the thread shaft of the upper feed screw press of the main press, and which comprises openings (690), (692)-(695), whereby the feed container is moved from the upper position thereof to a lower mixture feeding position by the feeding device through the container (689) in the feeding cylinder (601), (602), (603), (604) and the molds, and again at the upper feed screw press in the upper position thereof, and a second movable feeding container for the second mixture formed by a cylinder (704) which is fixed at the upper end of the thread shaft (69) of the lower feed screw press of the auxiliary press, and having openings (707), (708), (709), (710), whereby the second feeding container after the feeding phase of the first mixture, is moved from a lower position into an upper positin for the feeding of the second mixture by the feeding device of the plant through the second feeding container into the feeding container (601), (602), (603), (604) and into the molds, second feeding container finally moving into the lower position thereof.

57. The improvement defined in claim 52, wherein in each discharge and removal sector a device is provided which has at least one vertical shaft (732), (733) attached in a swinging and vertically sliding manner on a support whereby the shaft carries at least one pair of arms (429), (474) which simultaneously effects the removal of the finished product out of the mold moved to the discharge location, and the feeding of a new carcass into the mold.

* * * * *